US011626974B2

(12) United States Patent
Zimmerman et al.

(10) Patent No.: US 11,626,974 B2
(45) Date of Patent: *Apr. 11, 2023

(54) SYSTEM AND METHOD FOR SECURELY CONFIGURING A NEW DEVICE WITH NETWORK CREDENTIALS

(71) Applicant: Afero, Inc., Los Altos, CA (US)

(72) Inventors: Scott Zimmerman, Mountain View, CA (US); Joe Britt, Los Altos, CA (US)

(73) Assignee: Afero, Inc., Los Altos, CA (US)

( * ) Notice: Subject to any disclaimer, the term of this patent is extended or adjusted under 35 U.S.C. 154(b) by 603 days.

This patent is subject to a terminal disclaimer.

(21) Appl. No.: 16/814,839

(22) Filed: Mar. 10, 2020

(65) Prior Publication Data

US 2020/0213101 A1     Jul. 2, 2020

Related U.S. Application Data

(63) Continuation of application No. 15/894,586, filed on Feb. 12, 2018, now Pat. No. 10,587,400.

(51) Int. Cl.
*H04L 9/08* (2006.01)
*H04L 9/40* (2022.01)
(Continued)

(52) U.S. Cl.
CPC .......... *H04L 9/0819* (2013.01); *H04L 9/0637* (2013.01); *H04L 9/085* (2013.01);
(Continued)

(58) Field of Classification Search
None
See application file for complete search history.

(56) References Cited

U.S. PATENT DOCUMENTS 9,503,969 B1 * 11/2016 Zakaria ............. H04W 52/0229
9,838,390 B2 * 12/2017 Zakaria ................... H04W 4/24
(Continued)

FOREIGN PATENT DOCUMENTS

WO     2016/111916 A1     7/2016
WO     2016/138431 A1     9/2016

OTHER PUBLICATIONS

International Search Report and Written Opinion, PCT App. No. PCT/US2019/017473, dated Apr. 15, 2019, 8 pages.
(Continued)

*Primary Examiner* — Khang Do
(74) *Attorney, Agent, or Firm* — Nicholson De Vos Webster & Elliott LLP

(57) ABSTRACT

A system, apparatus, and method for sharing network credentials. One embodiment of a method comprises: establishing a Bluetooth connection between a first Internet of Things (IoT) device and a mobile device of a first user having an IoT app installed, the mobile device to couple the first IoT device to an IoT service; receiving a request from a user from the mobile device to configure the first IoT device using network credentials from a second IoT device, the second IoT device registered with an account of the user on the IoT service and configured to connect to a secure network of the user with the network credentials; establishing a communication channel between the first IoT device and the second IoT device through the IoT service and the mobile device to obtain the network credentials; and using the network credentials at the first IoT device to securely connect to the secure network.

24 Claims, 39 Drawing Sheets

(51) Int. Cl.
*H04W 12/08* (2021.01)
*H04L 9/32* (2006.01)
*H04L 9/14* (2006.01)
*H04W 12/04* (2021.01)
*H04L 9/06* (2006.01)

(52) U.S. Cl.
CPC .......... *H04L 9/0838* (2013.01); *H04L 9/0877* (2013.01); *H04L 9/14* (2013.01); *H04L 9/3226* (2013.01); *H04L 9/3247* (2013.01); *H04L 9/3263* (2013.01); *H04L 9/3297* (2013.01); *H04L 63/0428* (2013.01); *H04W 12/04* (2013.01); *H04W 12/08* (2013.01); *H04L 2209/80* (2013.01)

(56) References Cited

U.S. PATENT DOCUMENTS

| | | | | |
|---|---|---|---|---|
| 9,913,143 | B1* | 3/2018 | Roche | H04W 12/04 |
| 9,955,526 | B1* | 4/2018 | Yu | H04W 12/068 |
| 10,083,291 | B2* | 9/2018 | James | H04L 9/3268 |
| 2015/0095989 | A1* | 4/2015 | An | H04L 63/10 726/4 |
| 2016/0036819 | A1 | 2/2016 | Zehavi et al. | |
| 2016/0197934 | A1 | 7/2016 | Muraoka et al. | |
| 2016/0269176 | A1* | 9/2016 | Pang | H04L 9/083 |
| 2016/0294828 | A1 | 10/2016 | Zakaria | |
| 2016/0366102 | A1* | 12/2016 | Smith | H04L 9/0841 |
| 2017/0034284 | A1* | 2/2017 | Smith | H04L 9/0825 |
| 2017/0041147 | A1* | 2/2017 | Krahn | H04L 9/0877 |
| 2017/0055148 | A1* | 2/2017 | Zimmerman | H04L 63/0428 |
| 2017/0202039 | A1* | 7/2017 | Logue | H04W 12/06 |
| 2017/0214573 | A1* | 7/2017 | Linsky | H04L 41/0806 |
| 2017/0353859 | A1* | 12/2017 | Idnani | H04W 12/08 |
| 2017/0359338 | A1 | 12/2017 | Tschofenig et al. | |
| 2018/0007140 | A1* | 1/2018 | Brickell | H04W 12/00 |
| 2018/0159958 | A1* | 6/2018 | Olive | H04L 67/34 |
| 2018/0337785 | A1* | 11/2018 | Sanciangco | H04B 17/318 |
| 2019/0089806 | A1* | 3/2019 | Deshpande | H04W 84/18 |
| 2020/0267635 | A1* | 8/2020 | Cui | H04W 12/50 |

OTHER PUBLICATIONS

Notice of Allowance, U.S. Appl. No. 15/894,586, dated Dec. 6, 2019, 11 pages.

* cited by examiner

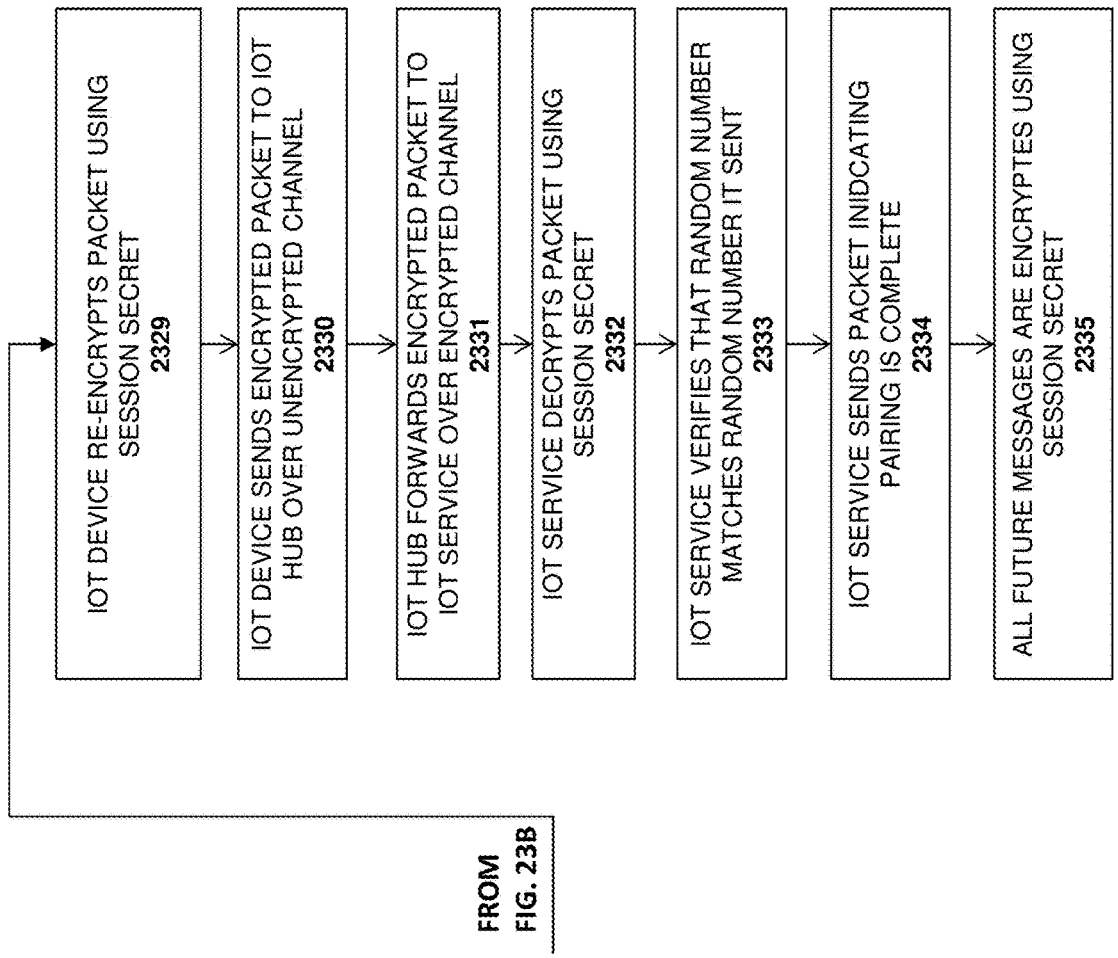

SYSTEM AND METHOD FOR SECURELY CONFIGURING A NEW DEVICE WITH NETWORK CREDENTIALS

BACKGROUND

Field of the Invention

This invention relates generally to the field of computer systems. More particularly, the invention relates to a system and method for securely configuring a new device with network credentials.

Description of the Related Art

The "Internet of Things" refers to the interconnection of uniquely-identifiable embedded devices within the Internet infrastructure. Ultimately, IoT is expected to result in new, wide-ranging types of applications in which virtually any type of physical thing may provide information about itself or its surroundings and/or may be controlled remotely via client devices over the Internet.

When user get new WiFi-enabled device, such as an IoT device that supports WiFi, a process of registration between the new device and the user home network needs to be executed. This process can be painful if the user does not remember the WiFi credentials or if the device is out of the WiFi coverage area. Furthermore, if the device is within the coverage edge of the WiFi network the registration will fail because the low coverage condition will corrupt the process of registration which will result in the access point rejecting the registration of the new device. The problem is more complicated for users who have multiple WiFi networks inside their home or business. In these circumstances, each network will require its own registration process.

Finally, a user cannot establish the registration of the new device without being inside the home or business that hosts the private network. Consequently, original equipment manufacturers (OEMs) are unable to send a device to a user that is ready to connect to their WiFi networks out of the box.

BRIEF DESCRIPTION OF THE DRAWINGS

A better understanding of the present invention can be obtained from the following detailed description in conjunction with the following drawings, in which:

FIGS. 23A-C illustrate a method for secure pairing in accordance with one embodiment of the invention;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention comprises an Internet of Things (IoT) platform which may be utilized by developers to design and build new IoT devices and applications. In particular, one embodiment includes a base hardware/software platform for IoT devices including a predefined networking protocol stack and an IoT hub through which the IoT devices are coupled to the Internet. In addition, one embodiment includes an IoT service through which the IoT hubs and connected IoT devices may be accessed and managed as described below. In addition, one embodiment of the IoT platform includes an IoT app or Web application (e.g., executed on a client device) to access and configured the IoT service, hub and connected devices. Existing online retailers and other Website operators may leverage the IoT platform described herein to readily provide unique IoT functionality to existing user bases.

Figure 1A:
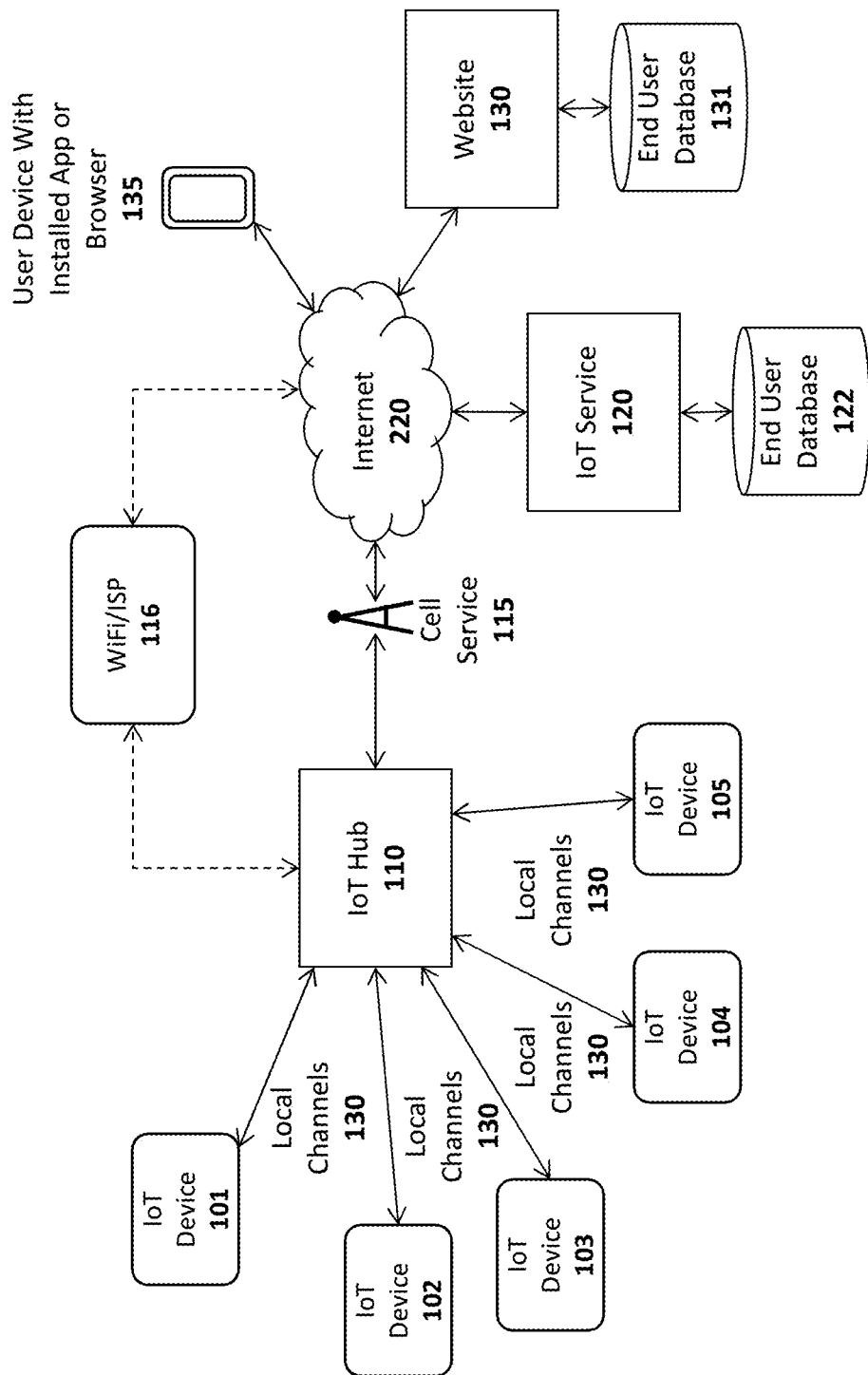
FIGS. 1A-B illustrates different embodiments of an IoT system architecture.

FIG. 1A illustrates an overview of an architectural platform on which embodiments of the invention may be implemented. In particular, the illustrated embodiment includes a plurality of IoT devices 101-105 communicatively coupled over local communication channels 130 to a central IoT hub 110 which is itself communicatively coupled to an IoT service 120 over the Internet 220. Each of the IoT devices 101-105 may initially be paired to the IoT hub 110 (e.g., using the pairing techniques described below) in order to enable each of the local communication channels 130. In one embodiment, the IoT service 120 includes an end user database 122 for maintaining user account information and data collected from each user's IoT devices. For example, if the IoT devices include sensors (e.g., temperature sensors, accelerometers, heat sensors, motion detectore, etc), the database 122 may be continually updated to store the data collected by the IoT devices 101-105. The data stored in the database 122 may then be made accessible to the end user via the IoT app or browser installed on the user's device 135 (or via a desktop or other client computer system) and to web clients (e.g., such as websites 130 subscribing to the IoT service 120).

The IoT devices 101-105 may be equipped with various types of sensors to collect information about themselves and their surroundings and provide the collected information to the IoT service 120, user devices 135 and/or external Websites 130 via the IoT hub 110. Some of the IoT devices 101-105 may perform a specified function in response to control commands sent through the IoT hub 110. Various specific examples of information collected by the IoT devices 101-105 and control commands are provided below. In one embodiment described below, the IoT device 101 is a user input device designed to record user selections and send the user selections to the IoT service 120 and/or Website.

In one embodiment, the IoT hub 110 includes a cellular radio to establish a connection to the Internet 220 via a cellular service 115 such as a 4G (e.g., Mobile WiMAX, LTE) or 5G cellular data service. Alternatively, or in addition, the IoT hub 110 may include a WiFi radio to establish a WiFi connection through a WiFi access point or router 116 which couples the IoT hub 110 to the Internet (e.g., via an Internet Service Provider providing Internet service to the end user). Of course, it should be noted that the underlying principles of the invention are not limited to any particular type of communication channel or protocol.

In one embodiment, the IoT devices 101-105 are ultra low-power devices capable of operating for extended periods of time on battery power (e.g., years). To conserve power, the local communication channels 130 may be implemented using a low-power wireless communication technology such as Bluetooth Low Energy (LE). In this embodiment, each of the IoT devices 101-105 and the IoT hub 110 are equipped with Bluetooth LE radios and protocol stacks.

As mentioned, in one embodiment, the IoT platform includes an IoT app or Web application executed on user devices 135 to allow users to access and configure the connected IoT devices 101-105, IoT hub 110, and/or IoT service 120. In one embodiment, the app or web application may be designed by the operator of a Website 130 to provide IoT functionality to its user base. As illustrated, the Website may maintain a user database 131 containing account records related to each user.

Figure 1B:
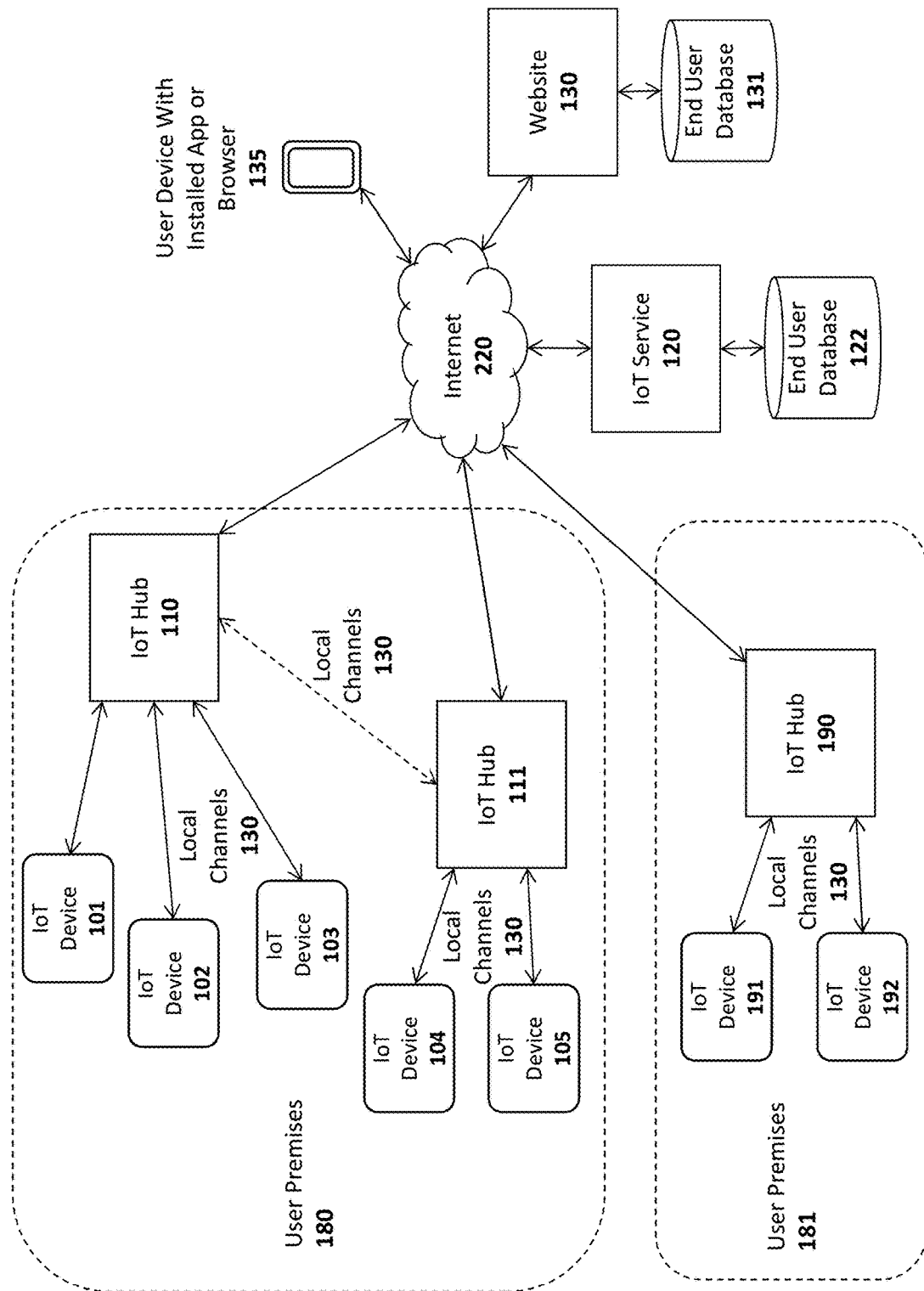

FIG. 1B illustrates additional connection options for a plurality of IoT hubs 110-111, 190 In this embodiment a single user may have multiple hubs 110-111 installed onsite at a single user premises 180 (e.g., the user's home or business). This may be done, for example, to extend the wireless range needed to connect all of the IoT devices 101-105. As indicated, if a user has multiple hubs 110, 111 they may be connected via a local communication channel (e.g., Wifi, Ethernet, Power Line Networking, etc). In one embodiment, each of the hubs 110-111 may establish a direct connection to the IoT service 120 through a cellular 115 or WiFi 116 connection (not explicitly shown in FIG. 1B). Alternatively, or in addition, one of the IoT hubs such as IoT hub 110 may act as a "master" hub which provides connectivity and/or local services to all of the other IoT hubs on the user premises 180, such as IoT hub 111 (as indicated by the dotted line connecting IoT hub 110 and IoT hub 111). For example, the master IoT hub 110 may be the only IoT hub to establish a direct connection to the IoT service 120. In one embodiment, only the "master" IoT hub 110 is equipped with a cellular communication interface to establish the connection to the IoT service 120. As such, all communication between the IoT service 120 and the other IoT hubs 111 will flow through the master IoT hub 110. In this role, the master IoT hub 110 may be provided with additional program code to perform filtering operations on the data exchanged between the other IoT hubs 111 and IoT service 120 (e.g., servicing some data requests locally when possible).

Regardless of how the IoT hubs 110-111 are connected, in one embodiment, the IoT service 120 will logically associate the hubs with the user and combine all of the attached IoT devices 101-105 under a single comprehensive user interface, accessible via a user device with the installed app 135 (and/or a browser-based interface).

In this embodiment, the master IoT hub 110 and one or more slave IoT hubs 111 may connect over a local network which may be a WiFi network 116, an Ethernet network, and/or a using power-line communications (PLC) networking (e.g., where all or portions of the network are run through the user's power lines). In addition, to the IoT hubs 110-111, each of the IoT devices 101-105 may be interconnected with the IoT hubs 110-111 using any type of local network channel such as WiFi, Ethernet, PLC, or Bluetooth LE, to name a few.

FIG. 1B also shows an IoT hub 190 installed at a second user premises 181. A virtually unlimited number of such IoT hubs 190 may be installed and configured to collect data from IoT devices 191-192 at user premises around the world. In one embodiment, the two user premises 180-181 may be configured for the same user. For example, one user premises 180 may be the user's primary home and the other user premises 181 may be the user's vacation home. In such a case, the IoT service 120 will logically associate the IoT hubs 110-111, 190 with the user and combine all of the attached IoT devices 101-105, 191-192 under a single comprehensive user interface, accessible via a user device with the installed app 135 (and/or a browser-based interface).

Figure 2:
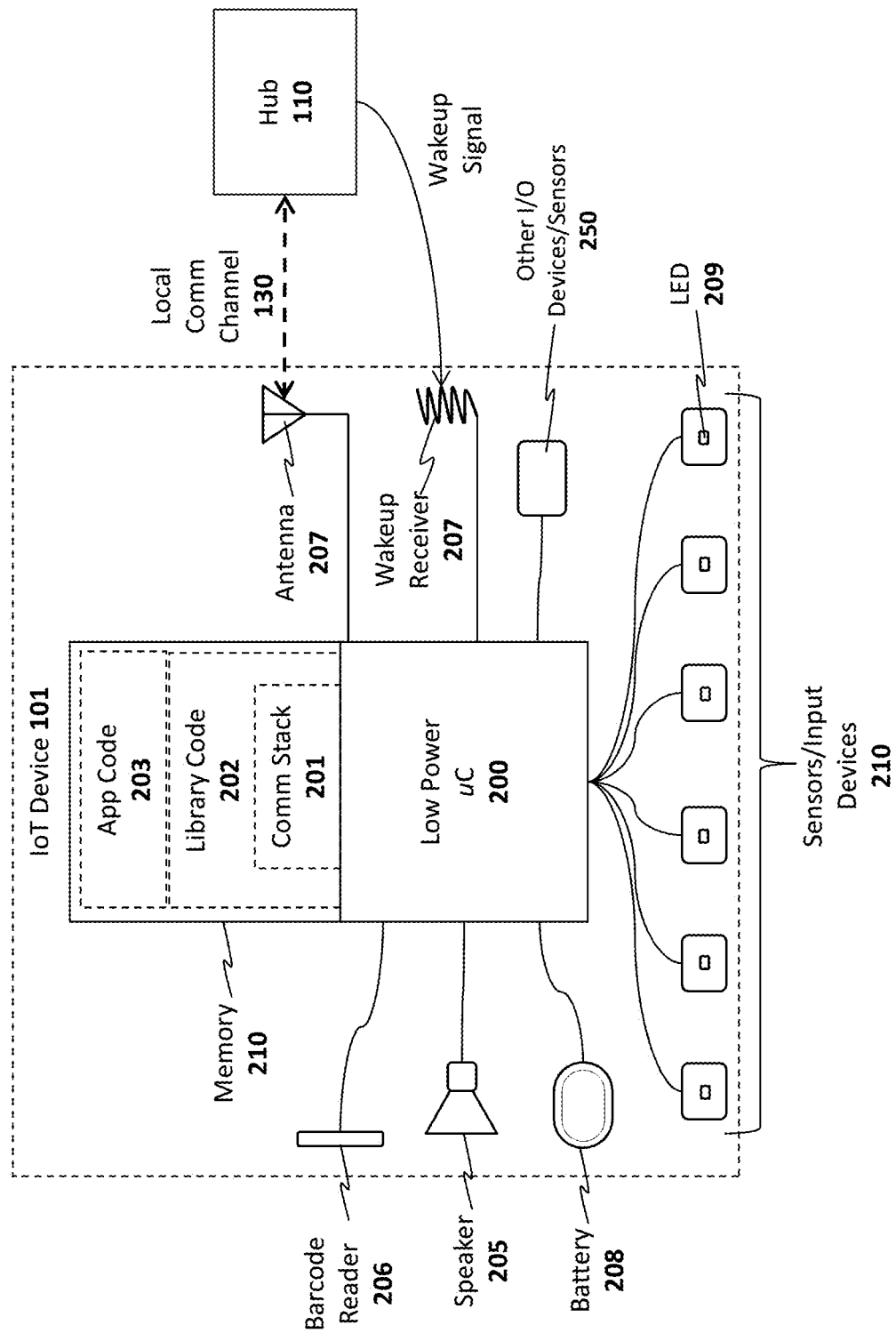
FIG. 2 illustrates an IoT device in accordance with one embodiment of the invention.

As illustrated in FIG. 2, an exemplary embodiment of an IoT device 101 includes a memory 210 for storing program code and data 201-203 and a low power microcontroller 200 for executing the program code and processing the data. The memory 210 may be a volatile memory such as dynamic random access memory (DRAM) or may be a non-volatile memory such as Flash memory. In one embodiment, a non-volatile memory may be used for persistent storage and a volatile memory may be used for execution of the program code and data at runtime. Moreover, the memory 210 may be integrated within the low power microcontroller 200 or may be coupled to the low power microcontroller 200 via a bus or communication fabric. The underlying principles of the invention are not limited to any particular implementation of the memory 210.

As illustrated, the program code may include application program code 203 defining an application-specific set of functions to be performed by the IoT device 201 and library code 202 comprising a set of predefined building blocks which may be utilized by the application developer of the IoT device 101. In one embodiment, the library code 202 comprises a set of basic functions required to implement an IoT device such as a communication protocol stack 201 for enabling communication between each IoT device 101 and the IoT hub 110. As mentioned, in one embodiment, the communication protocol stack 201 comprises a Bluetooth LE protocol stack. In this embodiment, Bluetooth LE radio and antenna 207 may be integrated within the low power microcontroller 200. However, the underlying principles of the invention are not limited to any particular communication protocol.

The particular embodiment shown in FIG. 2 also includes a plurality of input devices or sensors 210 to receive user input and provide the user input to the low power microcontroller, which processes the user input in accordance with the application code 203 and library code 202. In one embodiment, each of the input devices include an LED 209 to provide feedback to the end user.

In addition, the illustrated embodiment includes a battery 208 for supplying power to the low power microcontroller. In one embodiment, a non-chargeable coin cell battery is used. However, in an alternate embodiment, an integrated rechargeable battery may be used (e.g., rechargeable by connecting the IoT device to an AC power supply (not shown)).

A speaker 205 is also provided for generating audio. In one embodiment, the low power microcontroller 299 includes audio decoding logic for decoding a compressed audio stream (e.g., such as an MPEG-4/Advanced Audio Coding (AAC) stream) to generate audio on the speaker 205. Alternatively, the low power microcontroller 200 and/or the application code/data 203 may include digitally sampled snippets of audio to provide verbal feedback to the end user as the user enters selections via the input devices 210.

In one embodiment, one or more other/alternate I/O devices or sensors 250 may be included on the IoT device 101 based on the particular application for which the IoT device 101 is designed. For example, an environmental sensor may be included to measure temperature, pressure, humidity, etc. A security sensor and/or door lock opener may be included if the IoT device is used as a security device. Of course, these examples are provided merely for the purposes of illustration. The underlying principles of the invention are not limited to any particular type of IoT device. In fact, given the highly programmable nature of the low power microcontroller 200 equipped with the library code 202, an application developer may readily develop new application code 203 and new I/O devices 250 to interface with the low power microcontroller for virtually any type of IoT application.

In one embodiment, the low power microcontroller 200 also includes a secure key store for storing encryption keys for encrypting communications and/or generating signatures. Alternatively, the keys may be secured in a subscriber identify module (SIM).

Figure 3:
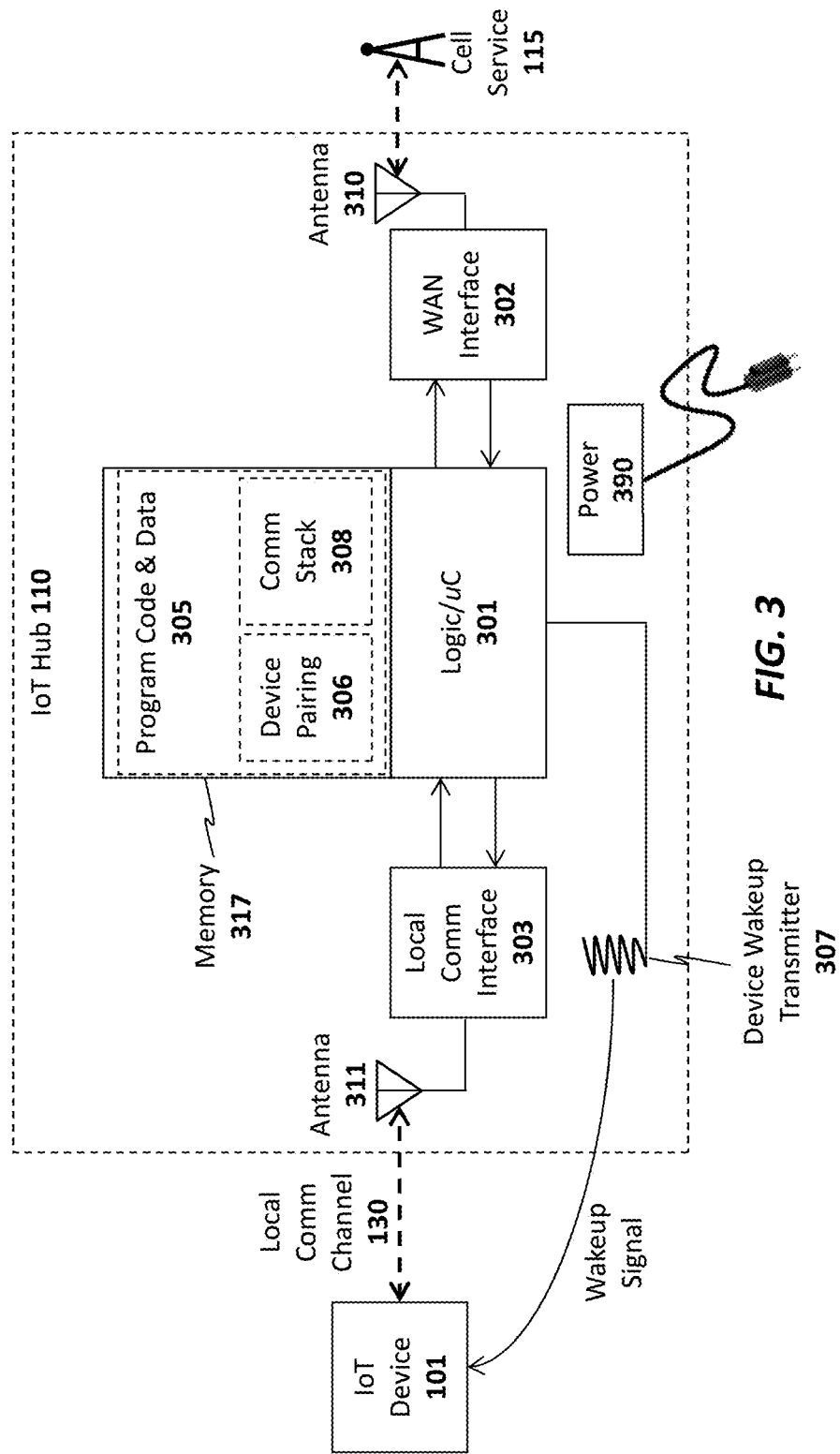
FIG. 3 illustrates an IoT hub in accordance with one embodiment of the invention.

A wakeup receiver 207 is included in one embodiment to wake the IoT device from an ultra low power state in which it is consuming virtually no power. In one embodiment, the wakeup receiver 207 is configured to cause the IoT device 101 to exit this low power state in response to a wakeup signal received from a wakeup transmitter 307 configured on the IoT hub 110 as shown in FIG. 3. In particular, in one embodiment, the transmitter 307 and receiver 207 together form an electrical resonant transformer circuit such as a Tesla coil. In operation, energy is transmitted via radio frequency signals from the transmitter 307 to the receiver 207 when the hub 110 needs to wake the IoT device 101 from a very low power state. Because of the energy transfer, the IoT device 101 may be configured to consume virtually no power when it is in its low power state because it does not need to continually "listen" for a signal from the hub (as is the case with network protocols which allow devices to be awakened via a network signal). Rather, the microcontroller 200 of the IoT device 101 may be configured to wake up after being effectively powered down by using the energy electrically transmitted from the transmitter 307 to the receiver 207.

As illustrated in FIG. 3, the IoT hub 110 also includes a memory 317 for storing program code and data 305 and hardware logic 301 such as a microcontroller for executing the program code and processing the data. A wide area network (WAN) interface 302 and antenna 310 couple the IoT hub 110 to the cellular service 115. Alternatively, as mentioned above, the IoT hub 110 may also include a local network interface (not shown) such as a WiFi interface (and WiFi antenna) or Ethernet interface for establishing a local area network communication channel. In one embodiment, the hardware logic 301 also includes a secure key store for storing encryption keys for encrypting communications and generating/verifying signatures. Alternatively, the keys may be secured in a subscriber identify module (SIM).

A local communication interface 303 and antenna 311 establishes local communication channels with each of the IoT devices 101-105. As mentioned above, in one embodiment, the local communication interface 303/antenna 311 implements the Bluetooth LE standard. However, the underlying principles of the invention are not limited to any particular protocols for establishing the local communication channels with the IoT devices 101-105. Although illustrated as separate units in FIG. 3, the WAN interface 302 and/or local communication interface 303 may be embedded within the same chip as the hardware logic 301.

In one embodiment, the program code and data includes a communication protocol stack 308 which may include separate stacks for communicating over the local communication interface 303 and the WAN interface 302. In addition, device pairing program code and data 306 may be stored in the memory to allow the IoT hub to pair with new IoT devices. In one embodiment, each new IoT device 101-105 is assigned a unique code which is communicated to the IoT hub 110 during the pairing process. For example, the unique code may be embedded in a barcode on the IoT device and may be read by the barcode reader 106 or may be communicated over the local communication channel 130. In an alternate embodiment, the unique ID code is embedded magnetically on the IoT device and the IoT hub has a magnetic sensor such as an radio frequency ID (RFID) or near field communication (NFC) sensor to detect the code when the IoT device 101 is moved within a few inches of the IoT hub 110.

In one embodiment, once the unique ID has been communicated, the IoT hub 110 may verify the unique ID by querying a local database (not shown), performing a hash to verify that the code is acceptable, and/or communicating with the IoT service 120, user device 135 and/or Website 130 to validate the ID code. Once validated, in one embodiment, the IoT hub 110 pairs the IoT device 101 and stores the pairing data in memory 317 (which, as mentioned, may include non-volatile memory). Once pairing is complete, the IoT hub 110 may connect with the IoT device 101 to perform the various IoT functions described herein.

In one embodiment, the organization running the IoT service 120 may provide the IoT hub 110 and a basic hardware/software platform to allow developers to easily design new IoT services. In particular, in addition to the IoT hub 110, developers may be provided with a software development kit (SDK) to update the program code and data 305 executed within the hub 110. In addition, for IoT devices 101, the SDK may include an extensive set of library code 202 designed for the base IoT hardware (e.g., the low power microcontroller 200 and other components shown in FIG. 2) to facilitate the design of various different types of applications 101. In one embodiment, the SDK includes a graphical design interface in which the developer needs only to specify input and outputs for the IoT device. All of the networking code, including the communication stack 201 that allows the IoT device 101 to connect to the hub 110 and the service 120, is already in place for the developer. In addition, in one embodiment, the SDK also includes a library code base to facilitate the design of apps for mobile devices (e.g., iPhone and Android devices).

In one embodiment, the IoT hub 110 manages a continuous bi-directional stream of data between the IoT devices 101-105 and the IoT service 120. In circumstances where updates to/from the IoT devices 101-105 are required in real time (e.g., where a user needs to view the current status of security devices or environmental readings), the IoT hub may maintain an open TCP socket to provide regular updates to the user device 135 and/or external Websites 130. The specific networking protocol used to provide updates may be tweaked based on the needs of the underlying application. For example, in some cases, where may not make sense to have a continuous bi-directional stream, a simple request/response protocol may be used to gather information when needed.

In one embodiment, both the IoT hub 110 and the IoT devices 101-105 are automatically upgradeable over the network. In particular, when a new update is available for the IoT hub 110 it may automatically download and install the update from the IoT service 120. It may first copy the updated code into a local memory, run and verify the update before swapping out the older program code. Similarly, when updates are available for each of the IoT devices 101-105, they may initially be downloaded by the IoT hub 110 and pushed out to each of the IoT devices 101-105. Each IoT device 101-105 may then apply the update in a similar manner as described above for the IoT hub and report back the results of the update to the IoT hub 110. If the update is successful, then the IoT hub 110 may delete the update from its memory and record the latest version of code installed on each IoT device (e.g., so that it may continue to check for new updates for each IoT device).

In one embodiment, the IoT hub 110 is powered via A/C power. In particular, the IoT hub 110 may include a power unit 390 with a transformer for transforming A/C voltage supplied via an A/C power cord to a lower DC voltage.

Figure 4A:
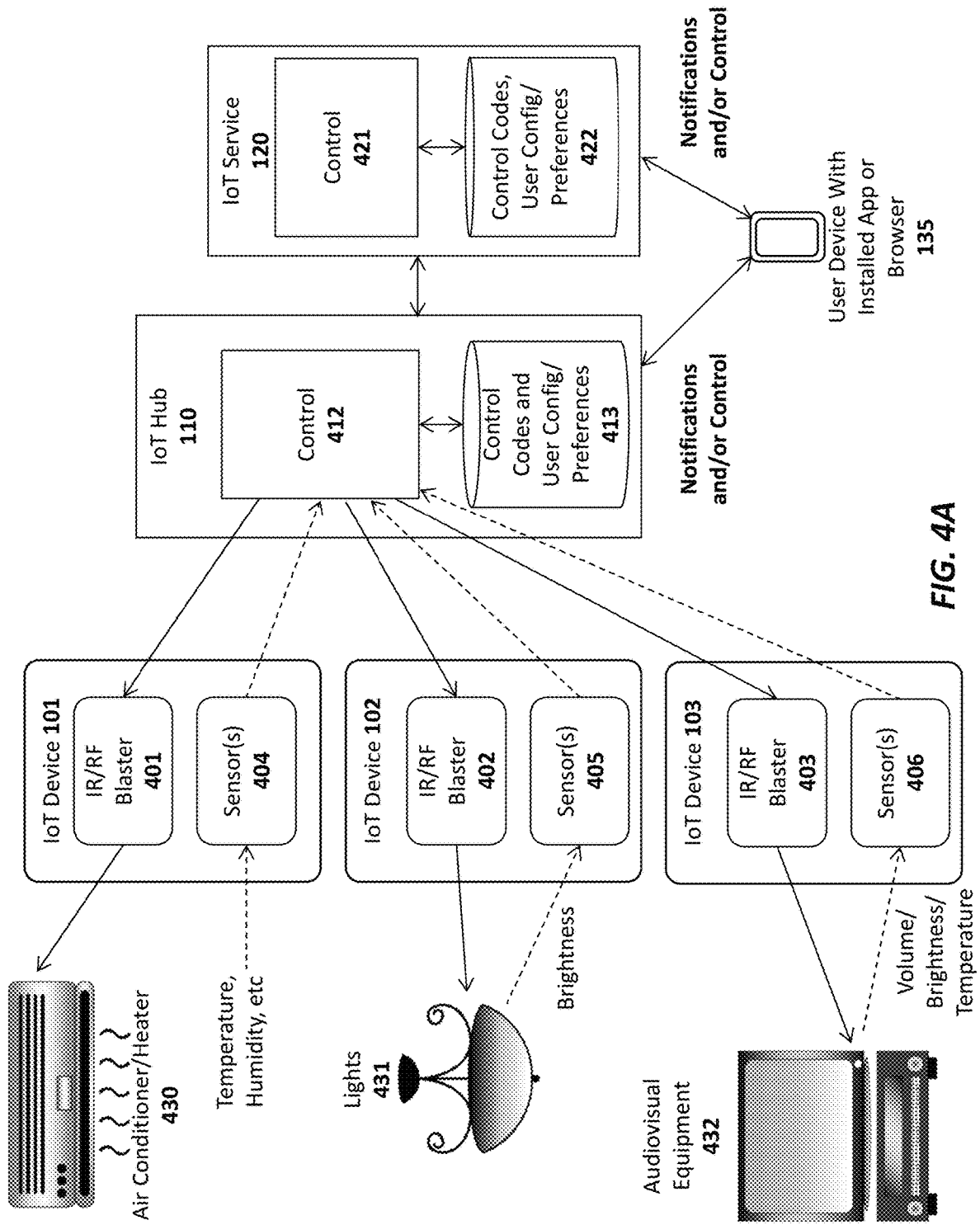
FIGS. 4A-B illustrate embodiments of the invention for controlling and collecting data from IoT devices, and generating notifications.

FIG. 4A illustrates one embodiment of the invention for performing universal remote control operations using the IoT system. In particular, in this embodiment, a set of IoT devices 101-103 are equipped with infrared (IR) and/or radio frequency (RF) blasters 401-403, respectively, for transmitting remote control codes to control various different types of electronics equipment including air conditioners/heaters 430, lighting systems 431, and audiovisual equipment 432 (to name just a few). In the embodiment shown in FIG. 4A, the IoT devices 101-103 are also equipped with sensors 404-406, respectively, for detecting the operation of the devices which they control, as described below.

For example, sensor 404 in IoT device 101 may be a temperature and/or humidity sensor for sensing the current temperature/humidity and responsively controlling the air conditioner/heater 430 based on a current desired temperature. In this embodiment, the air conditioner/heater 430 is one which is designed to be controlled via a remote control device (typically a remote control which itself has a temperature sensor embedded therein). In one embodiment, the user provides the desired temperature to the IoT hub 110 via an app or browser installed on a user device 135. Control logic 412 executed on the IoT hub 110 receives the current temperature/humidity data from the sensor 404 and responsively transmits commands to the IoT device 101 to control the IR/RF blaster 401 in accordance with the desired temperature/humidity. For example, if the temperature is below the desired temperature, then the control logic 412 may transmit a command to the air conditioner/heater via the IR/RF blaster 401 to increase the temperature (e.g., either by turning off the air conditioner or turning on the heater). The command may include the necessary remote control code stored in a database 413 on the IoT hub 110. Alternatively, or in addition, the IoT service 421 may implement control logic 421 to control the electronics equipment 430-432 based on specified user preferences and stored control codes 422.

IoT device 102 in the illustrated example is used to control lighting 431. In particular, sensor 405 in IoT device 102 may photosensor or photodetector configured to detect the current brightness of the light being produced by a light fixture 431 (or other lighting apparatus). The user may specify a desired lighting level (including an indication of ON or OFF) to the IoT hub 110 via the user device 135. In response, the control logic 412 will transmit commands to the IR/RF blaster 402 to control the current brightness level of the lights 431 (e.g., increasing the lighting if the current brightness is too low or decreasing the lighting if the current brightness is too high; or simply turning the lights ON or OFF).

IoT device 103 in the illustrated example is configured to control audiovisual equipment 432 (e.g., a television, A/V receiver, cable/satellite receiver, AppleTV™, etc). Sensor 406 in IoT device 103 may be an audio sensor (e.g., a microphone and associated logic) for detecting a current ambient volume level and/or a photosensor to detect whether a television is on or off based on the light generated by the television (e.g., by measuring the light within a specified spectrum). Alternatively, sensor 406 may include a temperature sensor connected to the audiovisual equipment to detect whether the audio equipment is on or off based on the detected temperature. Once again, in response to user input via the user device 135, the control logic 412 may transmit commands to the audiovisual equipment via the IR blaster 403 of the IoT device 103.

It should be noted that the foregoing are merely illustrative examples of one embodiment of the invention. The underlying principles of the invention are not limited to any particular type of sensors or equipment to be controlled by IoT devices.

In an embodiment in which the IoT devices 101-103 are coupled to the IoT hub 110 via a Bluetooth LE connection, the sensor data and commands are sent over the Bluetooth LE channel. However, the underlying principles of the invention are not limited to Bluetooth LE or any other communication standard.

Figure 4B:
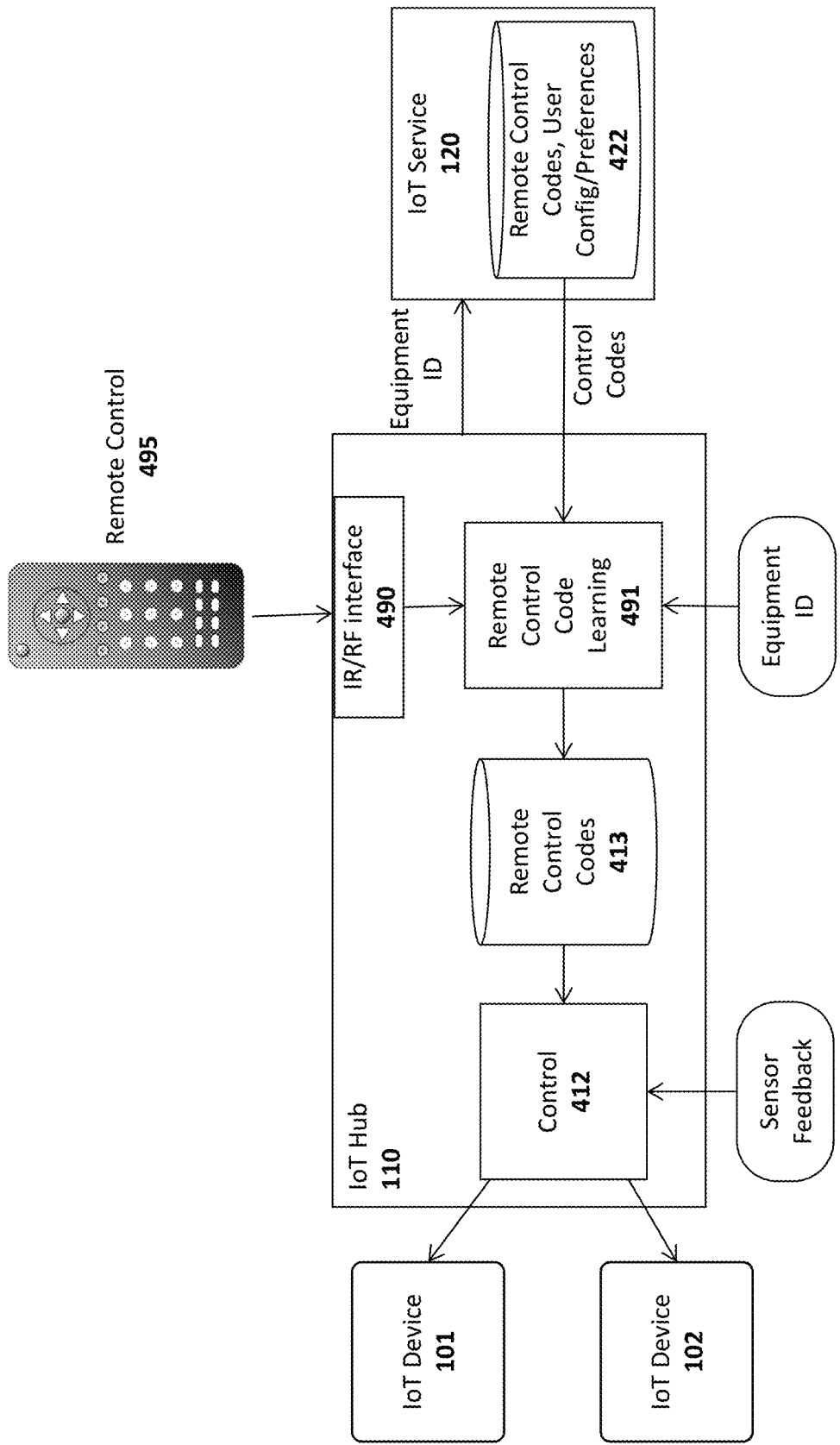

In one embodiment, the control codes required to control each of the pieces of electronics equipment are stored in a database 413 on the IoT hub 110 and/or a database 422 on the IoT service 120. As illustrated in FIG. 4B, the control codes may be provided to the IoT hub 110 from a master database of control codes 422 for different pieces of equipment maintained on the IoT service 120. The end user may specify the types of electronic (or other) equipment to be controlled via the app or browser executed on the user device 135 and, in response, a remote control code learning module 491 on the IoT hub may retrieve the required IR/RF codes from the remote control code database 492 on the IoT service 120 (e.g., identifying each piece of electronic equipment with a unique ID).

In addition, in one embodiment, the IoT hub 110 is equipped with an IR/RF interface 490 to allow the remote control code learning module 491 to "learn" new remote control codes directly from the original remote control 495 provided with the electronic equipment. For example, if control codes for the original remote control provided with the air conditioner 430 is not included in the remote control database, the user may interact with the IoT hub 110 via the app/browser on the user device 135 to teach the IoT hub 110 the various control codes generated by the original remote control (e.g., increase temperature, decrease temperature, etc). Once the remote control codes are learned they may be stored in the control code database 413 on the IoT hub 110 and/or sent back to the IoT service 120 to be included in the central remote control code database 492 (and subsequently used by other users with the same air conditioner unit 430).

In one embodiment, each of the IoT devices 101-103 have an extremely small form factor and may be affixed on or near their respective electronics equipment 430-432 using double-sided tape, a small nail, a magnetic attachment, etc. For control of a piece of equipment such as the air conditioner 430, it would be desirable to place the IoT device 101 sufficiently far away so that the sensor 404 can accurately measure the ambient temperature in the home (e.g., placing the IoT device directly on the air conditioner would result in a temperature measurement which would be too low when the air conditioner was running or too high when the heater was running). In contrast, the IoT device 102 used for controlling lighting may be placed on or near the lighting fixture 431 for the sensor 405 to detect the current lighting level.

In addition to providing general control functions as described, one embodiment of the IoT hub 110 and/or IoT service 120 transmits notifications to the end user related to the current status of each piece of electronics equipment. The notifications, which may be text messages and/or app-specific notifications, may then be displayed on the display of the user's mobile device 135. For example, if the user's air conditioner has been on for an extended period of time but the temperature has not changed, the IoT hub 110 and/or IoT service 120 may send the user a notification that the air conditioner is not functioning properly. If the user is not home (which may be detected via motion sensors or based on the user's current detected location), and the sensors 406 indicate that audiovisual equipment 430 is on or sensors 405 indicate that the lights are on, then a notification may be sent to the user, asking if the user would like to turn off the audiovisual equipment 432 and/or lights 431. The same type of notification may be sent for any equipment type.

Once the user receives a notification, he/she may remotely control the electronics equipment 430-432 via the app or browser on the user device 135. In one embodiment, the user device 135 is a touchscreen device and the app or browser displays an image of a remote control with user-selectable buttons for controlling the equipment 430-432. Upon receiving a notification, the user may open the graphical remote control and turn off or adjust the various different pieces of equipment. If connected via the IoT service 120, the user's selections may be forwarded from the IoT service 120 to the IoT hub 110 which will then control the equipment via the control logic 412. Alternatively, the user input may be sent directly to the IoT hub 110 from the user device 135.

In one embodiment, the user may program the control logic 412 on the IoT hub 110 to perform various automatic control functions with respect to the electronics equipment 430-432. In addition to maintaining a desired temperature, brightness level, and volume level as described above, the control logic 412 may automatically turn off the electronics equipment if certain conditions are detected. For example, if the control logic 412 detects that the user is not home and that the air conditioner is not functioning, it may automatically turn off the air conditioner. Similarly, if the user is not home, and the sensors 406 indicate that audiovisual equipment 430 is on or sensors 405 indicate that the lights are on, then the control logic 412 may automatically transmit commands via the IR/RF blasters 403 and 402, to turn off the audiovisual equipment and lights, respectively.

Figure 5:
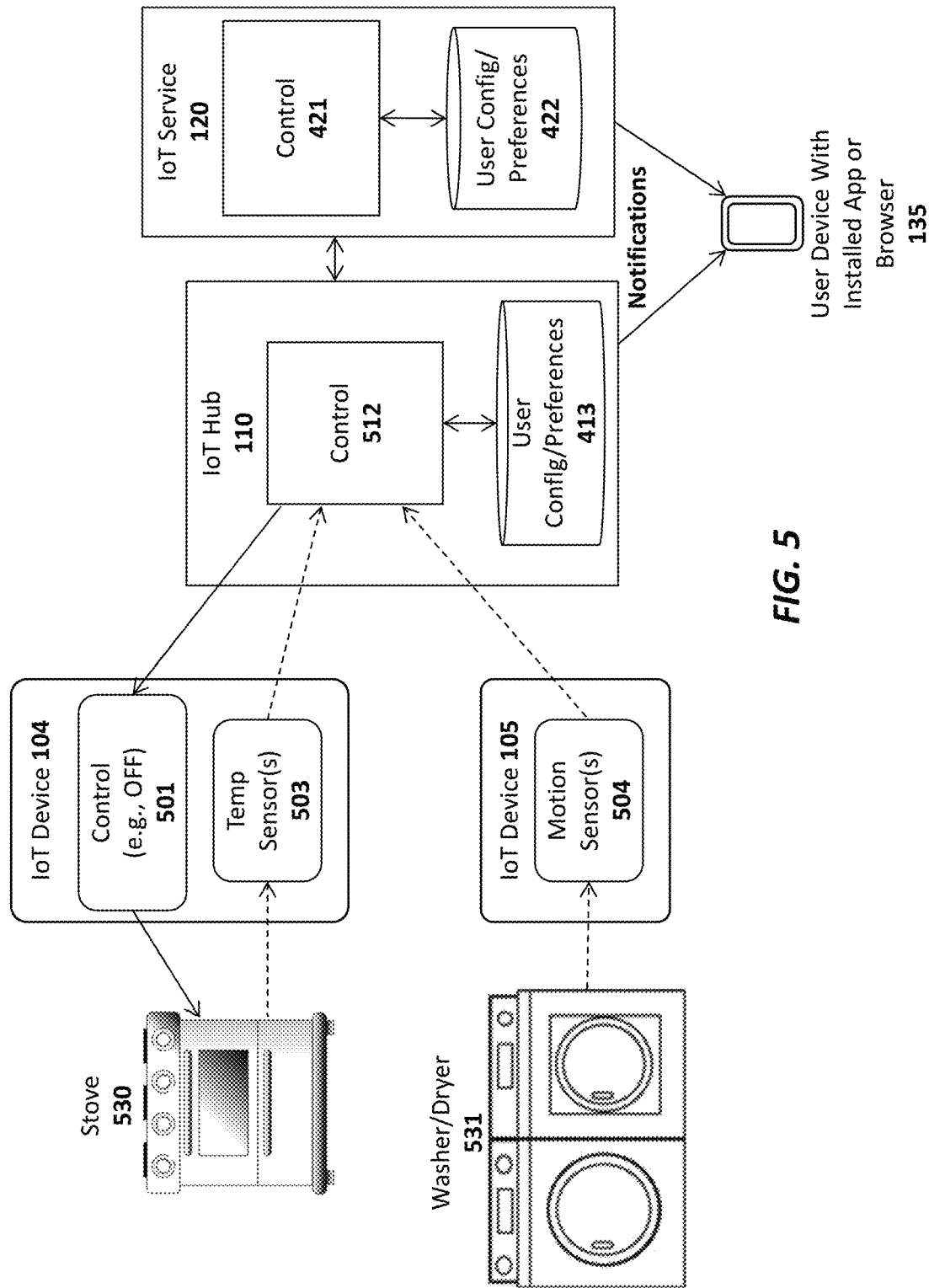
FIG. 5 illustrates embodiments of the invention for collecting data from IoT devices and generating notifications from an IoT hub and/or IoT service.

FIG. 5 illustrates additional embodiments of IoT devices 104-105 equipped with sensors 503-504 for monitoring electronic equipment 530-531. In particular, the IoT device 104 of this embodiment includes a temperature sensor 503 which may be placed on or near a stove 530 to detect when the stove has been left on. In one embodiment, the IoT device 104 transmits the current temperature measured by the temperature sensor 503 to the IoT hub 110 and/or the IoT service 120. If the stove is detected to be on for more than a threshold time period (e.g., based on the measured temperature), then control logic 512 may transmit a notification to the end user's device 135 informing the user that the stove 530 is on. In addition, in one embodiment, the IoT device 104 may include a control module 501 to turn off the stove, either in response to receiving an instruction from the user or automatically (if the control logic 512 is programmed to do so by the user). In one embodiment, the control logic 501 comprises a switch to cut off electricity or gas to the stove 530. However, in other embodiments, the control logic 501 may be integrated within the stove itself.

FIG. 5 also illustrates an IoT device 105 with a motion sensor 504 for detecting the motion of certain types of electronics equipment such as a washer and/or dryer.

Another sensor that may be used is an audio sensor (e.g., microphone and logic) for detecting an ambient volume level. As with the other embodiments described above, this embodiment may transmit notifications to the end user if certain specified conditions are met (e.g., if motion is detected for an extended period of time, indicating that the washer/dryer are not turning off). Although not shown in FIG. 5, IoT device 105 may also be equipped with a control module to turn off the washer/dryer 531 (e.g., by switching off electric/gas), automatically, and/or in response to user input.

In one embodiment, a first IoT device with control logic and a switch may be configured to turn off all power in the user's home and a second IoT device with control logic and a switch may be configured to turn off all gas in the user's home. IoT devices with sensors may then be positioned on or near electronic or gas-powered equipment in the user's home. If the user is notified that a particular piece of equipment has been left on (e.g., the stove 530), the user may then send a command to turn off all electricity or gas in the home to prevent damage. Alternatively, the control logic 512 in the IoT hub 110 and/or the IoT service 120 may be configured to automatically turn off electricity or gas in such situations.

In one embodiment, the IoT hub 110 and IoT service 120 communicate at periodic intervals. If the IoT service 120 detects that the connection to the IoT hub 110 has been lost (e.g., by failing to receive a request or response from the IoT hub for a specified duration), it will communicate this information to the end user's device 135 (e.g., by sending a text message or app-specific notification).

Embodiments for Improved Security

In one embodiment, the low power microcontroller 200 of each IoT device 101 and the low power logic/microcontroller 301 of the IoT hub 110 include a secure key store for storing encryption keys used by the embodiments described below (see, e.g., FIGS. 6-11 and associated text). Alternatively, the keys may be secured in a subscriber identify module (SIM) as discussed below.

Figure 6:
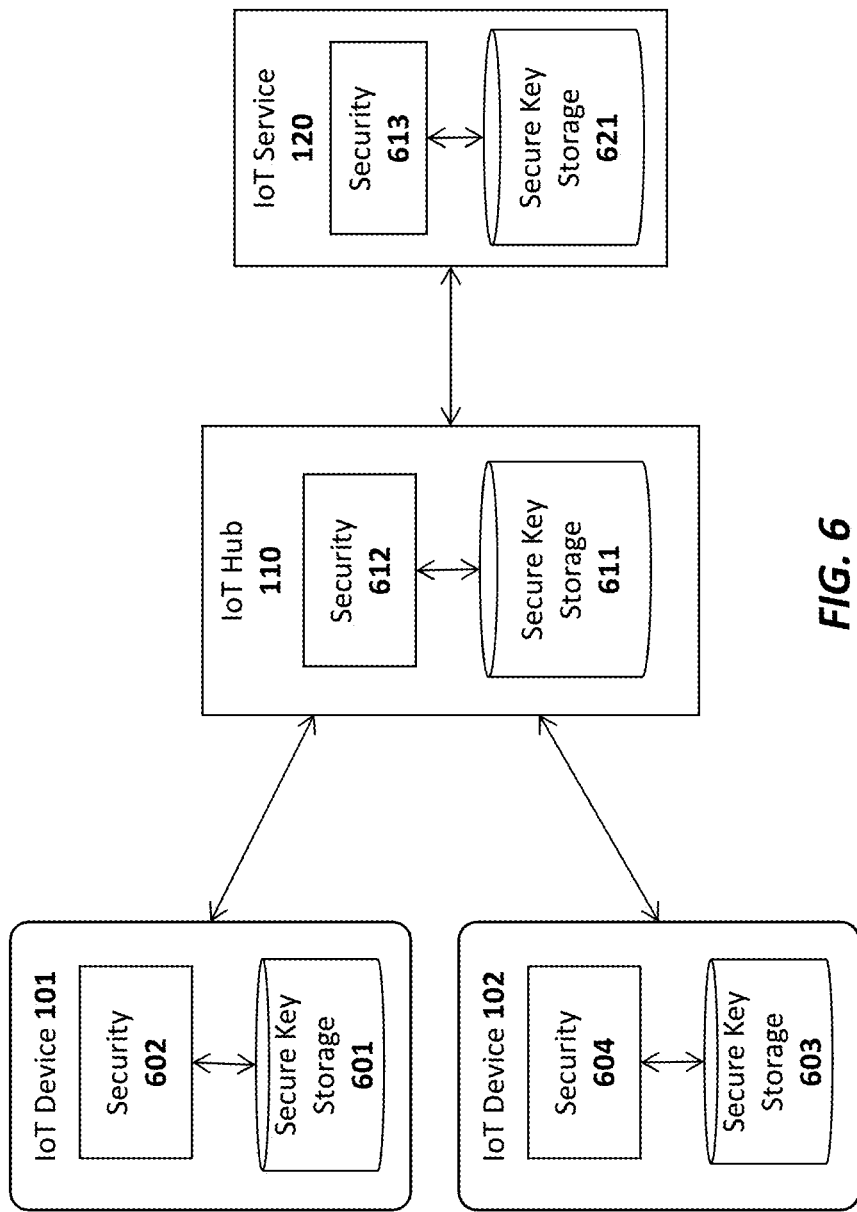
FIG. 6 illustrates embodiments of the invention which implements improved security techniques such as encryption and digital signatures.

FIG. 6 illustrates a high level architecture which uses public key infrastructure (PKI) techniques and/or symmetric key exchange/encryption techniques to encrypt communications between the IoT Service 120, the IoT hub 110 and the IoT devices 101-102.

Embodiments which use public/private key pairs will first be described, followed by embodiments which use symmetric key exchange/encryption techniques. In particular, in an embodiment which uses PKI, a unique public/private key pair is associated with each IoT device 101-102, each IoT hub 110 and the IoT service 120. In one embodiment, when a new IoT hub 110 is set up, its public key is provided to the IoT service 120 and when a new IoT device 101 is set up, it's public key is provided to both the IoT hub 110 and the IoT service 120. Various techniques for securely exchanging the public keys between devices are described below. In one embodiment, all public keys are signed by a master key known to all of the receiving devices (i.e., a form of certificate) so that any receiving device can verify the validity of the public keys by validating the signatures. Thus, these certificates would be exchanged rather than merely exchanging the raw public keys.

As illustrated, in one embodiment, each IoT device 101, 102 includes a secure key storage 601, 603, respectively, for security storing each device's private key. Security logic 602, 1304 then utilizes the securely stored private keys to perform the encryption/decryption operations described herein. Similarly, the IoT hub 110 includes a secure storage 611 for storing the IoT hub private key and the public keys of the IoT devices 101-102 and the IoT service 120; as well as security logic 612 for using the keys to perform encryption/decryption operations. Finally, the IoT service 120 may include a secure storage 621 for security storing its own private key, the public keys of various IoT devices and IoT hubs, and a security logic 613 for using the keys to encrypt/decrypt communication with IoT hubs and devices. In one embodiment, when the IoT hub 110 receives a public key certificate from an IoT device it can verify it (e.g., by validating the signature using the master key as described above), and then extract the public key from within it and store that public key in it's secure key store 611.

By way of example, in one embodiment, when the IoT service 120 needs to transmit a command or data to an IoT device 101 (e.g., a command to unlock a door, a request to read a sensor, data to be processed/displayed by the IoT device, etc) the security logic 613 encrypts the data/command using the public key of the IoT device 101 to generate an encrypted IoT device packet. In one embodiment, it then encrypts the IoT device packet using the public key of the IoT hub 110 to generate an IoT hub packet and transmits the IoT hub packet to the IoT hub 110. In one embodiment, the service 120 signs the encrypted message with it's private key or the master key mentioned above so that the device 101 can verify it is receiving an unaltered message from a trusted source. The device 101 may then validate the signature using the public key corresponding to the private key and/or the master key. As mentioned above, symmetric key exchange/encryption techniques may be used instead of public/private key encryption. In these embodiments, rather than privately storing one key and providing a corresponding public key to other devices, the devices may each be provided with a copy of the same symmetric key to be used for encryption and to validate signatures. One example of a symmetric key algorithm is the Advanced Encryption Standard (AES), although the underlying principles of the invention are not limited to any type of specific symmetric keys.

Using a symmetric key implementation, each device 101 enters into a secure key exchange protocol to exchange a symmetric key with the IoT hub 110. A secure key provisioning protocol such as the Dynamic Symmetric Key Provisioning Protocol (DSKPP) may be used to exchange the keys over a secure communication channel (see, e.g., Request for Comments (RFC) 6063). However, the underlying principles of the invention are not limited to any particular key provisioning protocol.

Once the symmetric keys have been exchanged, they may be used by each device 101 and the IoT hub 110 to encrypt communications. Similarly, the IoT hub 110 and IoT service 120 may perform a secure symmetric key exchange and then use the exchanged symmetric keys to encrypt communications. In one embodiment a new symmetric key is exchanged periodically between the devices 101 and the hub 110 and between the hub 110 and the IoT service 120. In one embodiment, a new symmetric key is exchanged with each new communication session between the devices 101, the hub 110, and the service 120 (e.g., a new key is generated and securely exchanged for each communication session). In one embodiment, if the security module 612 in the IoT hub is trusted, the service 120 could negotiate a session key with the hub security module 1312 and then the security module 612 would negotiate a session key with each device 120. Messages from the service 120 would then be decrypted and verified in the hub security module 612 before being re-encrypted for transmission to the device 101.

In one embodiment, to prevent a compromise on the hub security module 612 a one-time (permanent) installation key may be negotiated between the device 101 and service 120 at installation time. When sending a message to a device 101 the service 120 could first encrypt/MAC with this device installation key, then encrypt/MAC that with the hub's session key. The hub 110 would then verify and extract the encrypted device blob and send that to the device.

In one embodiment of the invention, a counter mechanism is implemented to prevent replay attacks. For example, each successive communication from the device 101 to the hub 110 (or vice versa) may be assigned a continually increasing counter value. Both the hub 110 and device 101 will track this value and verify that the value is correct in each successive communication between the devices. The same techniques may be implemented between the hub 110 and the service 120. Using a counter in this manner would make it more difficult to spoof the communication between each of the devices (because the counter value would be incorrect). However, even without this a shared installation key between the service and device would prevent network (hub) wide attacks to all devices.

In one embodiment, when using public/private key encryption, the IoT hub 110 uses its private key to decrypt the IoT hub packet and generate the encrypted IoT device packet, which it transmits to the associated IoT device 101. The IoT device 101 then uses its private key to decrypt the IoT device packet to generate the command/data originated from the IoT service 120. It may then process the data and/or execute the command. Using symmetric encryption, each device would encrypt and decrypt with the shared symmetric key. If either case, each transmitting device may also sign the message with it's private key so that the receiving device can verify it's authenticity.

A different set of keys may be used to encrypt communication from the IoT device 101 to the IoT hub 110 and to the IoT service 120. For example, using a public/private key arrangement, in one embodiment, the security logic 602 on the IoT device 101 uses the public key of the IoT hub 110 to encrypt data packets sent to the IoT hub 110. The security logic 612 on the IoT hub 110 may then decrypt the data packets using the IoT hub's private key. Similarly, the security logic 602 on the IoT device 101 and/or the security logic 612 on the IoT hub 110 may encrypt data packets sent to the IoT service 120 using the public key of the IoT service 120 (which may then be decrypted by the security logic 613 on the IoT service 120 using the service's private key). Using symmetric keys, the device 101 and hub 110 may share a symmetric key while the hub and service 120 may share a different symmetric key.

While certain specific details are set forth above in the description above, it should be noted that the underlying principles of the invention may be implemented using various different encryption techniques. For example, while some embodiments discussed above use asymmetric public/private key pairs, an alternate embodiment may use symmetric keys securely exchanged between the various IoT devices 101-102, IoT hubs 110, and the IoT service 120. Moreover, in some embodiments, the data/command itself is not encrypted, but a key is used to generate a signature over the data/command (or other data structure). The recipient may then use its key to validate the signature.

Figure 7:
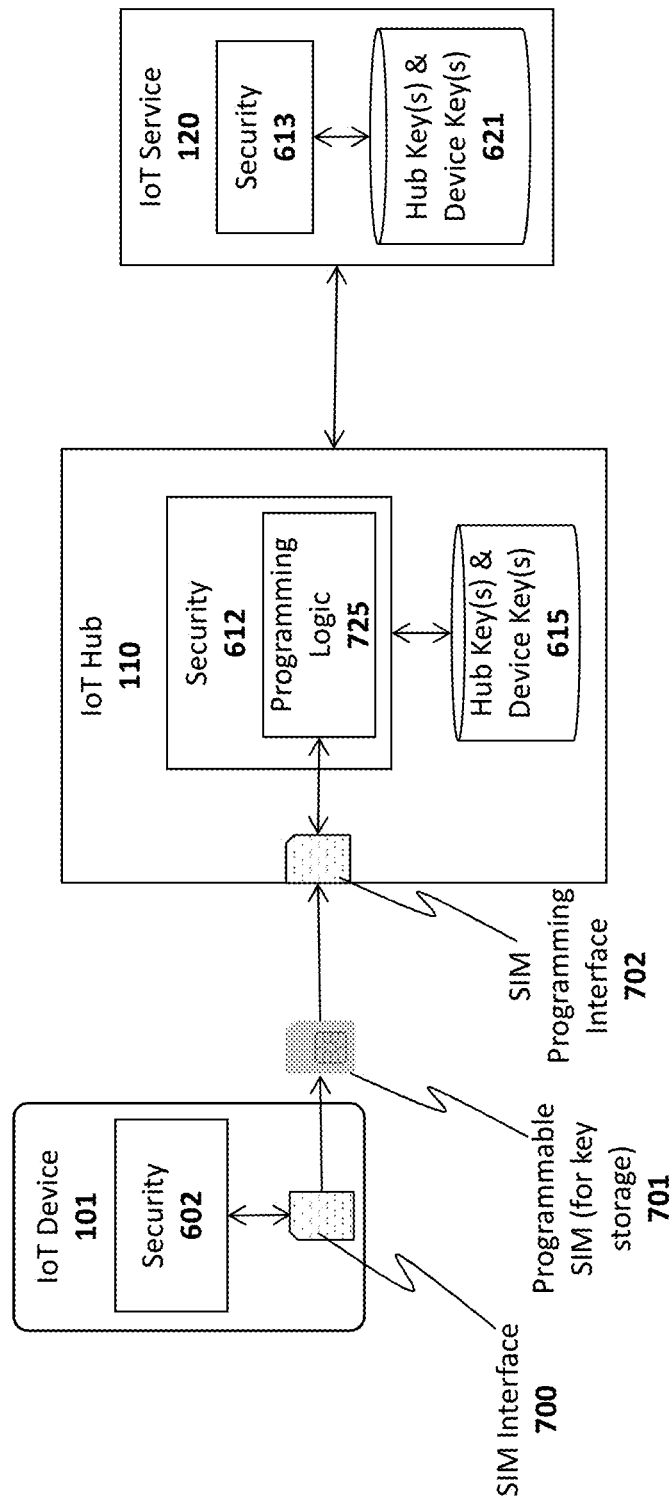
FIG. 7 illustrates one embodiment of an architecture in which a subscriber identity module (SIM) is used to store keys on IoT devices.

As illustrated in FIG. 7, in one embodiment, the secure key storage on each IoT device 101 is implemented using a programmable subscriber identity module (SIM) 701. In this embodiment, the IoT device 101 may initially be provided to the end user with an un-programmed SIM card 701 seated within a SIM interface 700 on the IoT device 101. In order to program the SIM with a set of one or more encryption keys, the user takes the programmable SIM card 701 out of the SIM interface 500 and inserts it into a SIM programming interface 702 on the IoT hub 110. Programming logic 725 on the IoT hub then securely programs the SIM card 701 to register/pair the IoT device 101 with the IoT hub 110 and IoT service 120. In one embodiment, a public/private key pair may be randomly generated by the programming logic 725 and the public key of the pair may then be stored in the IoT hub's secure storage device 411 while the private key may be stored within the programmable SIM 701. In addition, the programming logic 525 may store the public keys of the IoT hub 110, the IoT service 120, and/or any other IoT devices 101 on the SIM card 601 (to be used by the security logic 1302 on the IoT device 101 to encrypt outgoing data). Once the SIM 701 is programmed, the new IoT device 101 may be provisioned with the IoT Service 120 using the SIM as a secure identifier (e.g., using existing techniques for registering a device using a SIM). Following provisioning, both the IoT hub 110 and the IoT service 120 will securely store a copy of the IoT device's public key to be used when encrypting communication with the IoT device 101.

The techniques described above with respect to FIG. 7 provide enormous flexibility when providing new IoT devices to end users. Rather than requiring a user to directly register each SIM with a particular service provider upon sale/purchase (as is currently done), the SIM may be programmed directly by the end user via the IoT hub 110 and the results of the programming may be securely communicated to the IoT service 120. Consequently, new IoT devices 101 may be sold to end users from online or local retailers and later securely provisioned with the IoT service 120.

While the registration and encryption techniques are described above within the specific context of a SIM (Subscriber Identity Module), the underlying principles of the invention are not limited to a "SIM" device. Rather, the underlying principles of the invention may be implemented using any type of device having secure storage for storing a set of encryption keys. Moreover, while the embodiments above include a removable SIM device, in one embodiment, the SIM device is not removable but the IoT device itself may be inserted within the programming interface 702 of the IoT hub 110.

In one embodiment, rather than requiring the user to program the SIM (or other device), the SIM is pre-programmed into the IoT device 101, prior to distribution to the end user. In this embodiment, when the user sets up the IoT device 101, various techniques described herein may be used to securely exchange encryption keys between the IoT hub 110/IoT service 120 and the new IoT device 101.

Figure 8A:
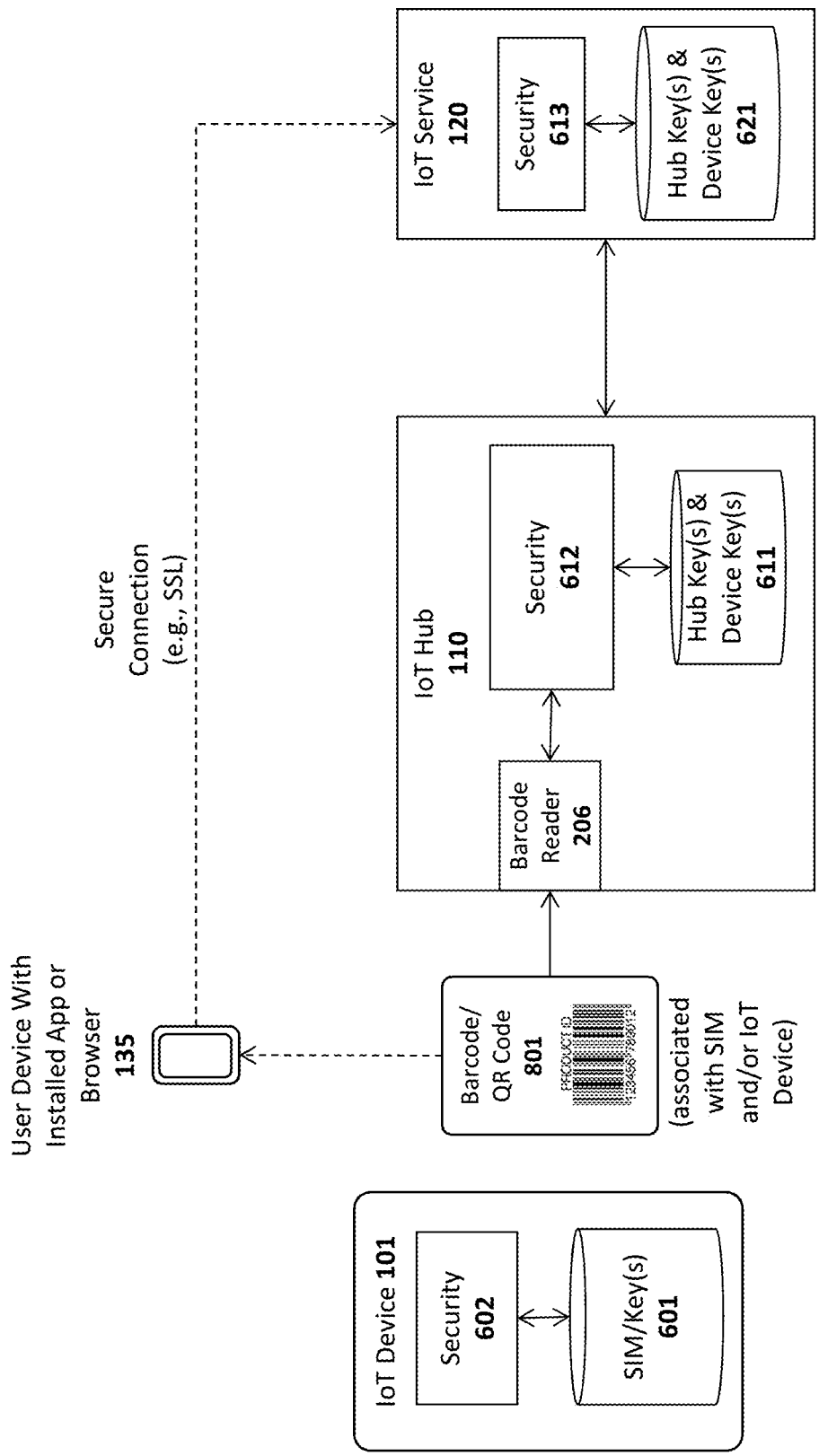
FIG. 8A illustrates one embodiment in which IoT devices are registered using barcodes or QR codes.

For example, as illustrated in FIG. 8A each IoT device 101 or SIM 401 may be packaged with a barcode or QR code 701 uniquely identifying the IoT device 101 and/or SIM 701. In one embodiment, the barcode or QR code 801 comprises an encoded representation of the public key for the IoT device 101 or SIM 1001. Alternatively, the barcode or QR code 801 may be used by the IoT hub 110 and/or IoT service 120 to identify or generate the public key (e.g., used as a pointer to the public key which is already stored in secure storage). The barcode or QR code 601 may be printed on a separate card (as shown in FIG. 8A) or may be printed directly on the IoT device itself. Regardless of where the barcode is printed, in one embodiment, the IoT hub 110 is equipped with a barcode reader 206 for reading the barcode and providing the resulting data to the security logic 1012 on the IoT hub 110 and/or the security logic 1013 on the IoT service 120. The security logic 1012 on the IoT hub 110 may then store the public key for the IoT device within its secure key storage 1011 and the security logic 1013 on the IoT service 120 may store the public key within its secure storage 1021 (to be used for subsequent encrypted communication).

In one embodiment, the data contained in the barcode or QR code 801 may also be captured via a user device 135 (e.g., such as an iPhone or Android device) with an installed IoT app or browser-based applet designed by the IoT service provider. Once captured, the barcode data may be securely communicated to the IoT service 120 over a secure connection (e.g., such as a secure sockets layer (SSL) connection). The barcode data may also be provided from the client device 135 to the IoT hub 110 over a secure local connection (e.g., over a local WiFi or Bluetooth LE connection).

The security logic 1002 on the IoT device 101 and the security logic 1012 on the IoT hub 110 may be implemented using hardware, software, firmware or any combination thereof. For example, in one embodiment, the security logic 1002, 1012 is implemented within the chips used for establishing the local communication channel 130 between the IoT device 101 and the IoT hub 110 (e.g., the Bluetooth LE chip if the local channel 130 is Bluetooth LE). Regardless of the specific location of the security logic 1002, 1012, in one embodiment, the security logic 1002, 1012 is designed to establish a secure execution environment for executing certain types of program code. This may be implemented, for example, by using TrustZone technology (available on some ARM processors) and/or Trusted Execution Technology (designed by Intel). Of course, the underlying principles of the invention are not limited to any particular type of secure execution technology.

In one embodiment, the barcode or QR code 701 may be used to pair each IoT device 101 with the IoT hub 110. For example, rather than using the standard wireless pairing process currently used to pair Bluetooth LE devices, a pairing code embedded within the barcode or QR code 701 may be provided to the IoT hub 110 to pair the IoT hub with the corresponding IoT device.

Figure 8B:
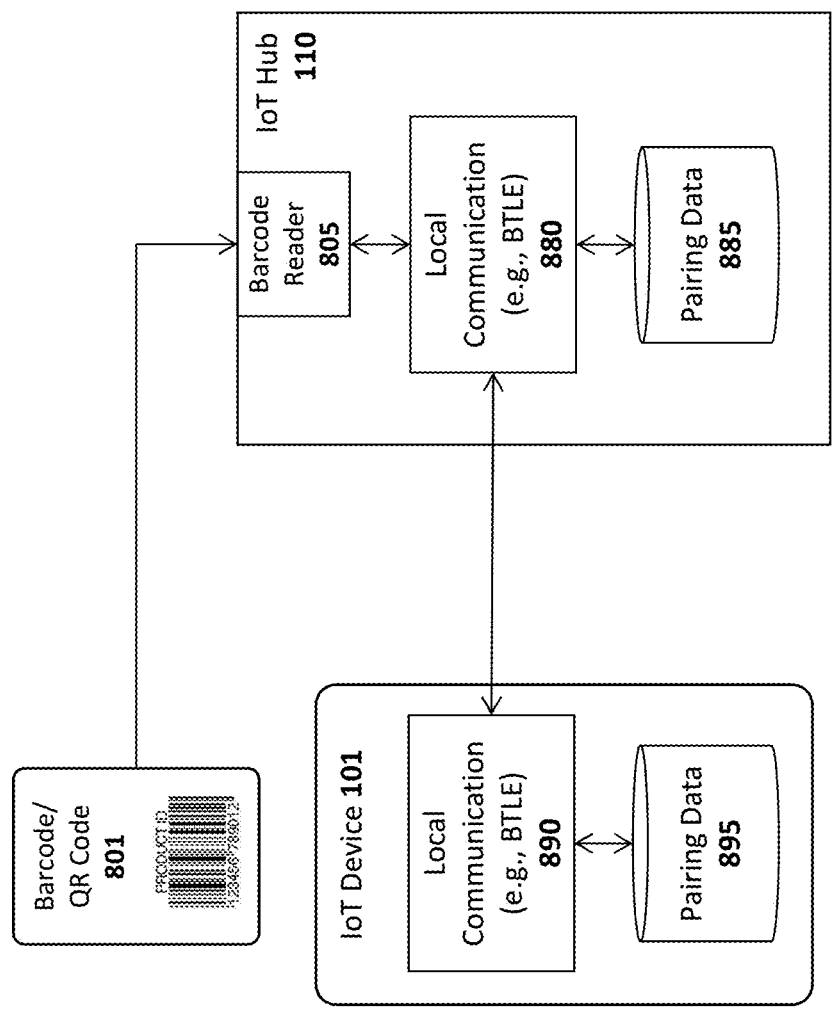
FIG. 8B illustrates one embodiment in which pairing is performed using barcodes or QR codes.

FIG. 8B illustrates one embodiment in which the barcode reader 206 on the IoT hub 110 captures the barcode/QR code 801 associated with the IoT device 101. As mentioned, the barcode/QR code 801 may be printed directly on the IoT device 101 or may be printed on a separate card provided with the IoT device 101. In either case, the barcode reader 206 reads the pairing code from the barcode/QR code 801 and provides the pairing code to the local communication module 880. In one embodiment, the local communication module 880 is a Bluetooth LE chip and associated software, although the underlying principles of the invention are not limited to any particular protocol standard. Once the pairing code is received, it is stored in a secure storage containing pairing data 885 and the IoT device 101 and IoT hub 110 are automatically paired. Each time the IoT hub is paired with a new IoT device in this manner, the pairing data for that pairing is stored within the secure storage 685. In one embodiment, once the local communication module 880 of the IoT hub 110 receives the pairing code, it may use the code as a key to encrypt communications over the local wireless channel with the IoT device 101.

Similarly, on the IoT device 101 side, the local communication module 890 stores pairing data within a local secure storage device 895 indicating the pairing with the IoT hub. The pairing data 895 may include the pre-programmed pairing code identified in the barcode/QR code 801. The pairing data 895 may also include pairing data received from the local communication module 880 on the IoT hub 110 required for establishing a secure local communication channel (e.g., an additional key to encrypt communication with the IoT hub 110).

Thus, the barcode/QR code 801 may be used to perform local pairing in a far more secure manner than current wireless pairing protocols because the pairing code is not transmitted over the air. In addition, in one embodiment, the same barcode/QR code 801 used for pairing may be used to identify encryption keys to build a secure connection from the IoT device 101 to the IoT hub 110 and from the IoT hub 110 to the IoT service 120.

Figure 9:
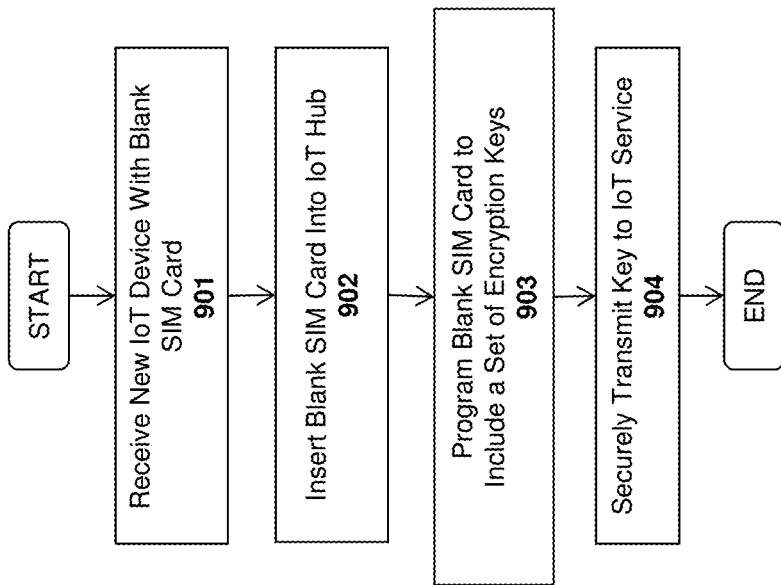
FIG. 9 illustrates one embodiment of a method for programming a SIM using an IoT hub.

A method for programming a SIM card in accordance with one embodiment of the invention is illustrated in FIG. 9. The method may be implemented within the system architecture described above, but is not limited to any particular system architecture.

At 901, a user receives a new IoT device with a blank SIM card and, at 802, the user inserts the blank SIM card into an IoT hub. At 903, the user programs the blank SIM card with a set of one or more encryption keys. For example, as mentioned above, in one embodiment, the IoT hub may randomly generate a public/private key pair and store the private key on the SIM card and the public key in its local secure storage. In addition, at 904, at least the public key is transmitted to the IoT service so that it may be used to identify the IoT device and establish encrypted communication with the IoT device. As mentioned above, in one embodiment, a programmable device other than a "SIM" card may be used to perform the same functions as the SIM card in the method shown in FIG. 9.

Figure 10:
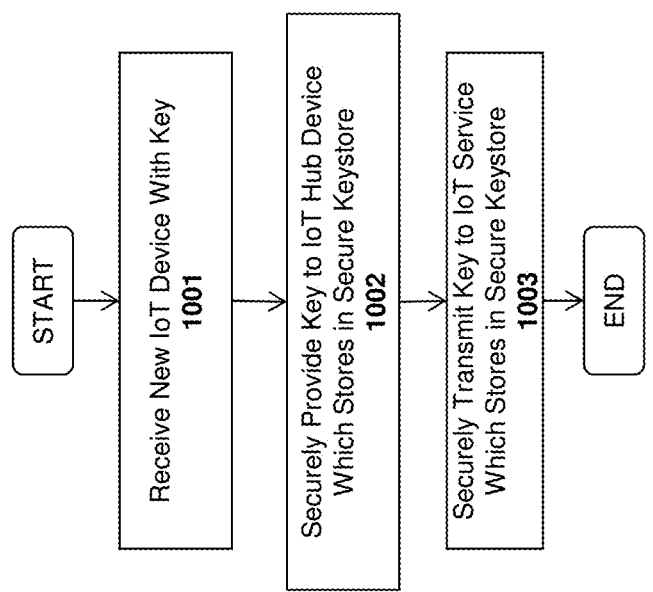
FIG. 10 illustrates one embodiment of a method for registering an IoT device with an IoT hub and IoT service.

A method for integrating a new IoT device into a network is illustrated in FIG. 10. The method may be implemented within the system architecture described above, but is not limited to any particular system architecture.

At 1001, a user receives a new IoT device to which an encryption key has been pre-assigned. At 1002, the key is securely provided to the IoT hub. As mentioned above, in one embodiment, this involves reading a barcode associated with the IoT device to identify the public key of a public/private key pair assigned to the device. The barcode may be read directly by the IoT hub or captured via a mobile device via an app or bowser. In an alternate embodiment, a secure communication channel such as a Bluetooth LE channel, a near field communication (NFC) channel or a secure WiFi channel may be established between the IoT device and the IoT hub to exchange the key. Regardless of how the key is transmitted, once received, it is stored in the secure keystore of the IoT hub device. As mentioned above, various secure execution technologies may be used on the IoT hub to store and protect the key such as Secure Enclaves, Trusted Execution Technology (TXT), and/or Trustzone. In addition, at 1003, the key is securely transmitted to the IoT service which stores the key in its own secure keystore. It may then use the key to encrypt communication with the IoT device. One again, the exchange may be implemented using a certificate/signed key. Within the hub 110 it is particularly important to prevent modification/addition/ removal of the stored keys.

Figure 11:
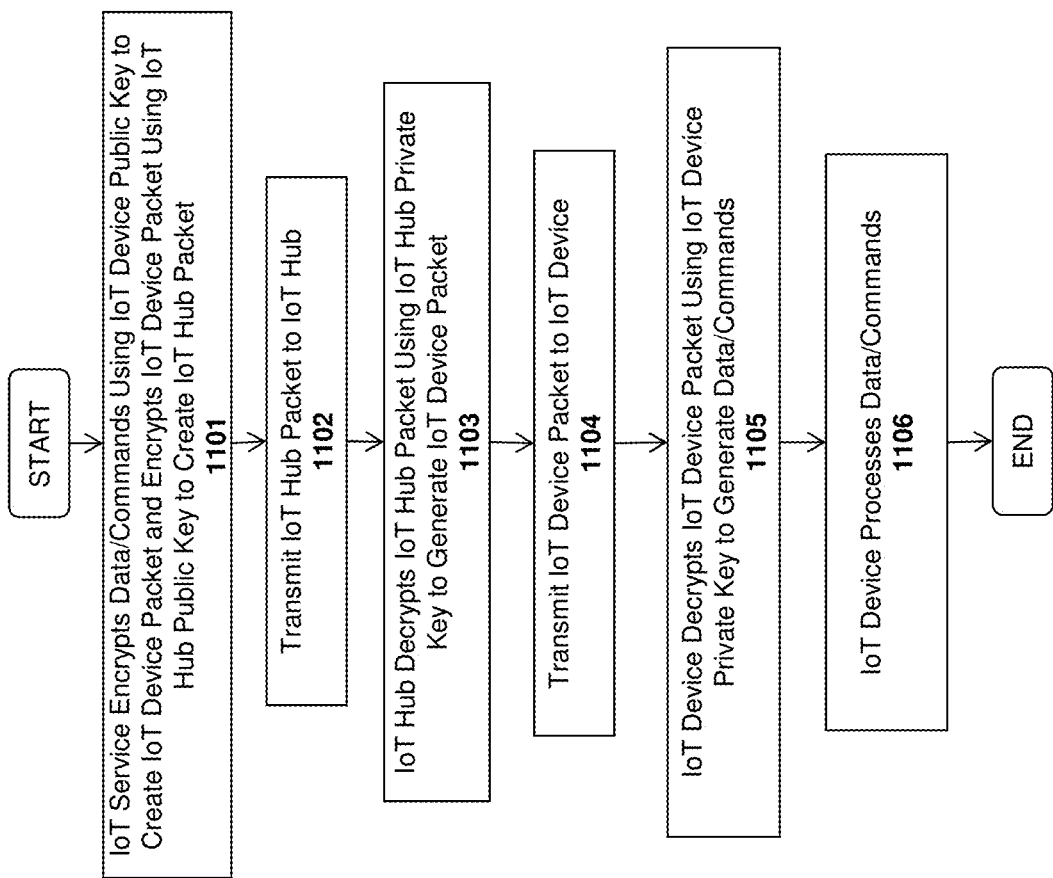
FIG. 11 illustrates one embodiment of a method for encrypting data to be transmitted to an IoT device.

A method for securely communicating commands/data to an IoT device using public/private keys is illustrated in FIG. 11. The method may be implemented within the system architecture described above, but is not limited to any particular system architecture.

At 1101, the IoT service encrypts the data/commands using the IoT device public key to create an IoT device packet. It then encrypts the IoT device packet using IoT hub's public key to create the IoT hub packet (e.g., creating an IoT hub wrapper around the IoT device packet). At 1102, the IoT service transmits the IoT hub packet to the IoT hub. At 1103, the IoT hub decrypts the IoT hub packet using the IoT hub's private key to generate the IoT device packet. At 1104 it then transmits the IoT device packet to the IoT device which, at 1105, decrypts the IoT device packet using the IoT device private key to generate the data/commands. At 1106, the IoT device processes the data/commands.

In an embodiment which uses symmetric keys, a symmetric key exchange may be negotiated between each of the devices (e.g., each device and the hub and between the hub and the service). Once the key exchange is complete, each transmitting device encrypts and/or signs each transmission using the symmetric key before transmitting data to the receiving device.

Embodiments for Automatic Wireless Network Authentication

In order to connect the IoT hub to a local wireless network such as a WiFi network, the user must provide network credentials such as a network security key or password. Other layers of authentication may also be required such as a user ID/password combination. In one embodiment, once the IoT hub successfully connects to the local wireless network using the network credentials provided by the user, it securely transmits the network credentials to a secure storage location such as the IoT service 120. When a user subsequently receives a new IoT device, the IoT device may be configured to transmit a request for network credentials to the IoT hub. in response, the IoT hub may forward the request to the IoT service 120 which may perform a lookup in a credentials database using, for example, the identity of the IoT device, the user, and/or the access point to which connection is needed to identify the relevant network credentials. If the network credentials can be identified, they are transmitted back to the IoT device, which then uses the network credentials to seamlessly connect to the local wireless network.

Figure 12:
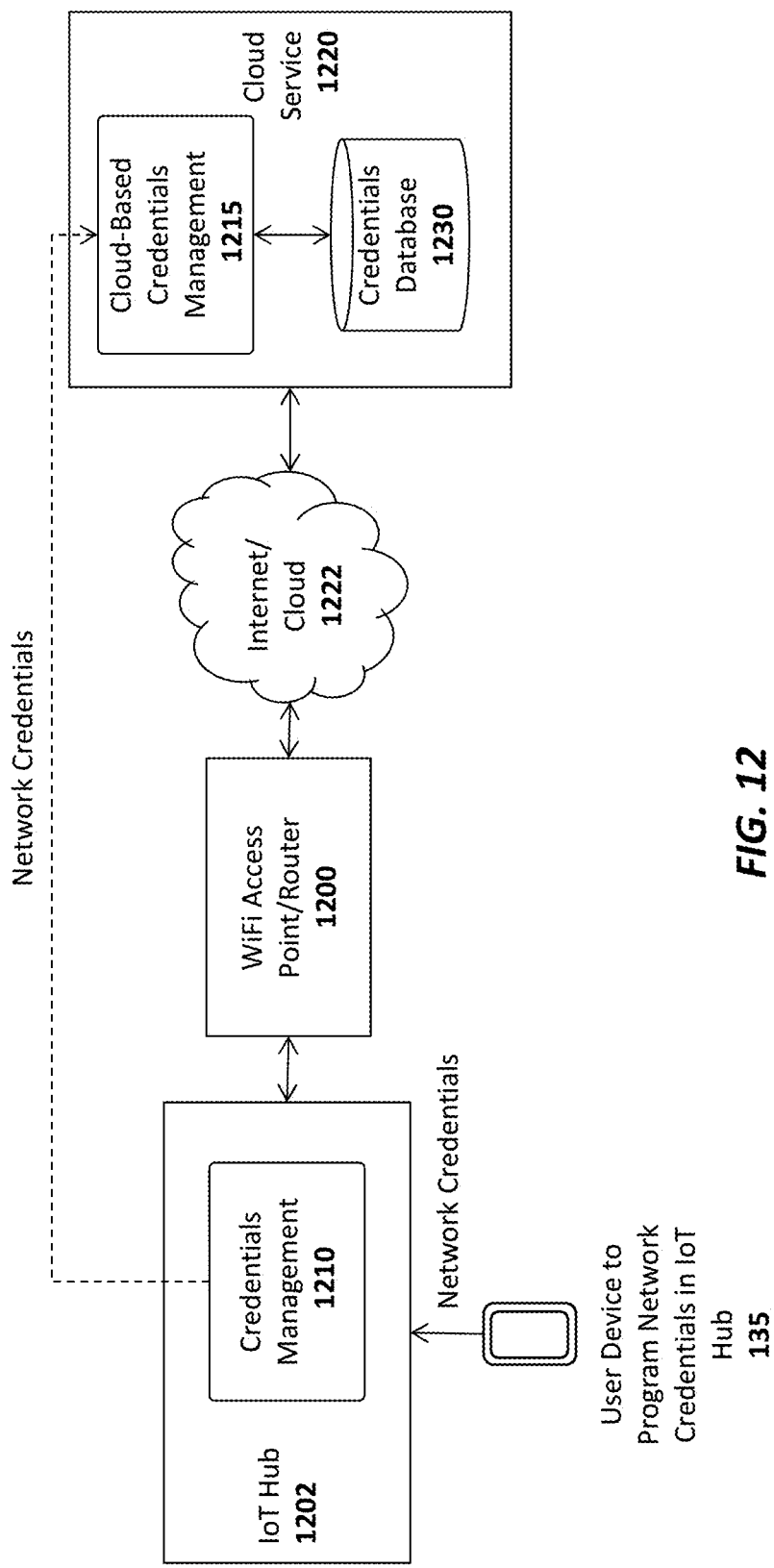
FIG. 12 illustrates one embodiment of an architecture for collecting and storing network credentials.

FIG. 12 illustrates an exemplary system architecture in which a credentials management module 1210 on the IoT hub 1202 implements the credential processing techniques described herein. As illustrated, the user may provide network credentials such as a network security key or password to the IoT hub 1202 via a user device 135 (which may be a mobile smartphone device, wearable data processing device, laptop computer, or desktop computer). The user device 135 initially connects to the IoT hub 1202 through a wired connection or a short range wireless connection such as BTLE and the user provides the credentials via an app or browser configured to connect with the IoT hub 1202.

In one embodiment, the network credentials comprise a security key such as a Wi-Fi Protected Access (WPA) or Wi-Fi Protected Access II (WPA2). In this embodiment, the network credentials may be in the form of a pre-shared key (PSK) for WPA-Personal implementations or may rely on more advanced authentication techniques such as those used by WPA-Enterprise (which may utilize a RADIUS authentication server and various forms of the Extensible Authentication Protocol (EAP)).

Regardless of the specific authentication/encryption techniques used, once the user has provided the necessary network credentials, the IoT hub 1202 uses the credentials to establish a secure wireless connection to the WiFi access point/router 1200 which then provides connectivity to a cloud service 1220 over the Internet 1222. In one embodiment, the credentials management module 1210 on the IoT hub 1210 establishes a connection with a credentials management module 1215 on the cloud service 1220 (e.g., which may be the IoT service 120 or an external web site 130 described above).

In one embodiment, one or more of the key-based s techniques described above may be employed to ensure that the connection between the credentials management module 1210 on the IoT hub 1202 and the credentials management module 1215 on the cloud service 1220 is secure (e.g., using a symmetric or asymmetric key to encrypt all network traffic). Once a secure connection has been established, the credentials management module 1210 on the IoT hub 1202 transmits a copy of the network credentials to the credentials management module 1215 on the cloud service, which stores a copy of the credentials in a secure credentials database 1230. The credentials database 1230 may include data uniquely identifying the IoT hub 1202, data uniquely identifying the user account associated with the IoT hub 1202, and/or data uniquely identifying the WiFi access point/router 1200 (to ensure that the network credentials are associated with the correct user and WiFi access point/router).

Figure 13:
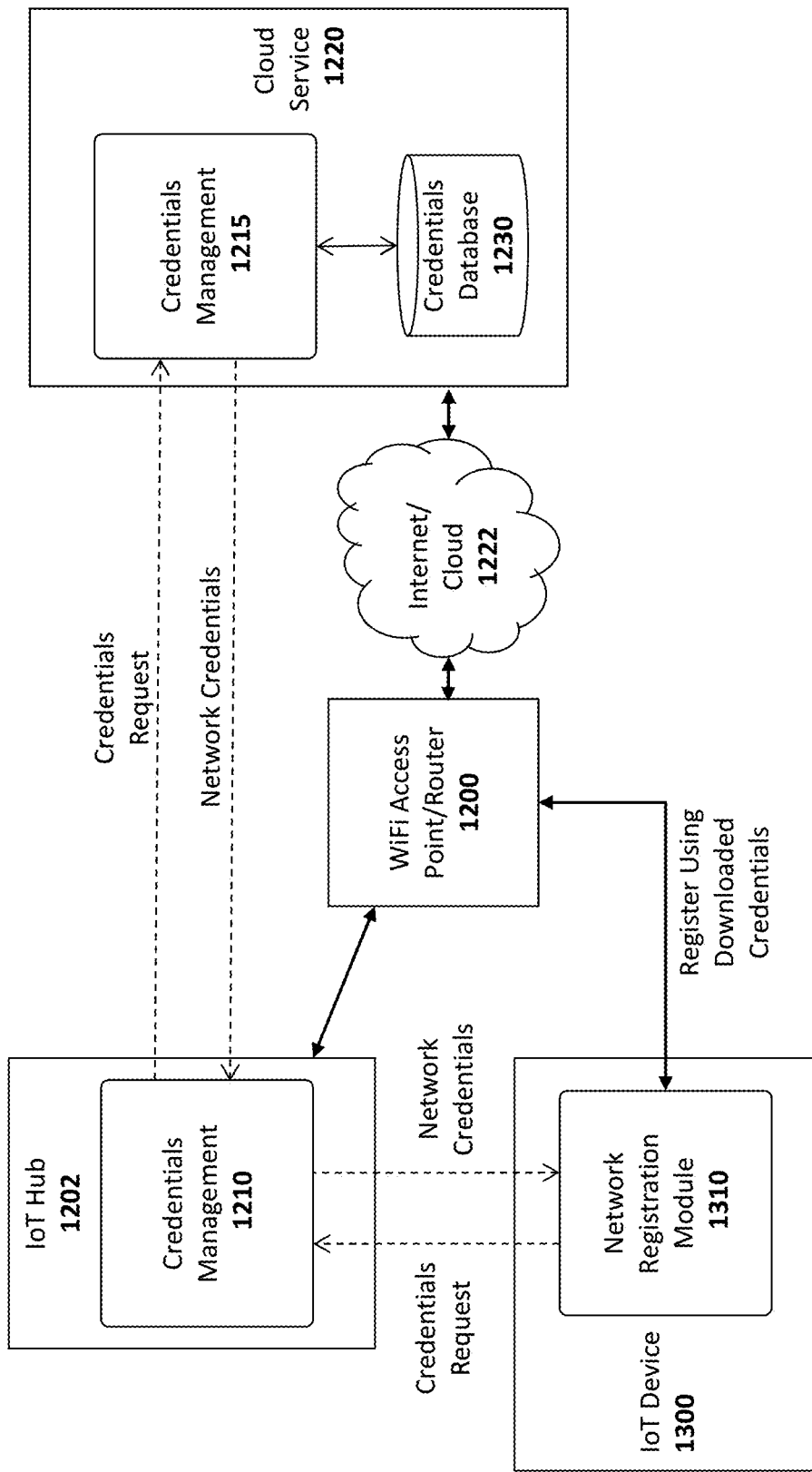
FIG. 13 illustrates one embodiment of an architecture for registering a user with a wireless access point.

As illustrated in FIG. 13, after the network credentials have been stored in the credentials database 1230, when the user purchases a new IoT device 1300, the IoT device will enable its local wireless interface (e.g., BTLE) and search for any enabled devices within coverage (e.g., the IoT Hub 1202, other IoT devices, or the user's mobile device). In the specific embodiment shown in FIG. 13, the IoT device 1300 has detected and connected to an IoT hub 1202. In one embodiment, once the connection is established, a network registration module 1310 transmits a network credentials request to the credentials management module 1210 on the IoT hub 1202. The credentials request may include data identifying the WiFI access point/router 1200 to which the IoT device 1300 would like to connect (e.g., the SSID, MAC address or other data uniquely identifying the WiFi access point/router 1200) as well as data uniquely identifying the IoT device 1300.

The credentials management module 1210 then securely transmits a credentials management request to the credentials management module 1215 on the cloud service 1220, which uses the data uniquely identifying the user, the IoT device 1300, and/or the WiFi access point/router 1200 to perform a lookup in the credentials database 1230. Once again, any of the key-based security techniques may be used to ensure the connection between the IoT hub and cloud service is secure. If credentials are located based on the data provided in the request, the credentials management module 1215 securely transmits the network credentials back to the credentials management module 1210 on the IoT hub 1202, which then provides the network credentials to the network registration module 1310 of the IoT device 1300. The IoT device 1300 then uses the network credentials to automatically establish a secure connection to the WiFi access point/router 1200. The end result is that the user is not required to manually configure the new IoT device 1300 to connect with the WiFi access point/router 1200. Rather, because the network credentials have already been associated with the user's account on the cloud service 1220 they may be automatically provided to the IoT device 1300 which will then seamlessly connect to the network.

As mentioned above, while FIG. 13 illustrates the IoT device 1300 connecting through an IoT hub 1202, the IoT device 1300 may connect through another IoT device if the Iot hub 1202 is not within range. The other IoT device (which is connected to the IoT hub) may then couple the new IoT device to the credentials management module 1210 on the IoT hub 1202. Similarly, if both the IoT hub and another IoT are unavailable (e.g., out of range), the IoT device 1300 may be configured to connect with the user's mobile device 135, which may include a browser/app to connect with the credentials management module 1215 on the cloud service (either directly or through the IoT hub 1202).

In one embodiment, the network registration module 1310 on the IoT hub 1300 is configured to search first for an IoT hub 1202, then for another IoT device, and then for a user mobile device. It will then connect to the first one of the above devices to offer a connection. The above connections may be formed using any type of local communication protocol including, but not limited to BTLE.

In one embodiment, the network credentials may be stored locally in a secure storage device accessible by the IoT hub 1202 or contained within the IoT hub 1202 (in addition to or in lieu of storing the network credentials remotely on the cloud service 1220). Consequently, in this embodiment, the network credentials may be provided without the need for a remote query to the cloud service 1220.

The term "cloud service" and "IoT cloud service" may refer to any service on the Internet capable of storing and providing network credentials for IoT devices as described herein (e.g., such as the IoT service and external services referenced above). In one embodiment, the cloud service 1220 is owned and operated by the same entity that provides the IoT hub and IoT devices to the end user. In another embodiment, at least some of the IoT devices may be designed and sold by OEMs which coordinate with the cloud service (e.g., via an agreed-upon business arrangement) to ensure that the techniques described herein may be implemented using the cloud service 1220.

Figure 14:
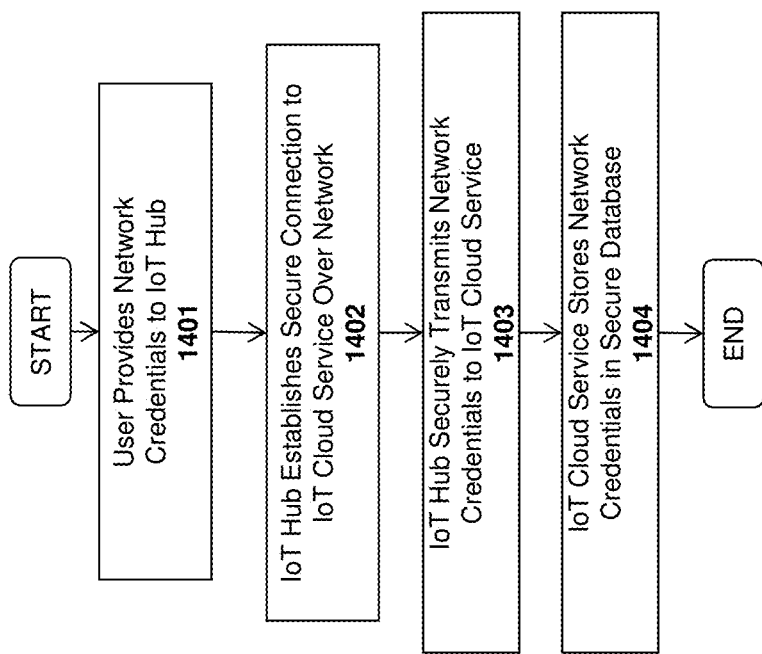
FIG. 14 illustrates one embodiment of a method for collecting and storing network credentials.

A method for collecting and storing network credentials in accordance with one embodiment of the invention is illustrated in FIG. 14. The method may be implemented within the context of the system architectures described above, but is not limited to any particular architecture.

At 1401, the user provides network credentials to the IoT hub. The credentials may be provided, for example, through a network setup wizard executed within a browser or app installed on the user's data processing device, which may connect to the IoT hub through a wired or local wireless connection (e.g., BTLE). Once the network credentials are provided, at 1402 the IoT hub establishes a secure connection to the IoT cloud service over the Internet and, at 1403, securely transmits the network credentials to the IoT cloud service. At 1404, the IoT Cloud Service stores the network credentials in its database, associating the credentials with the user's account on the IoT cloud service and/or with the particular WiFi access point/router for which the network credentials are being used.

Figure 15:
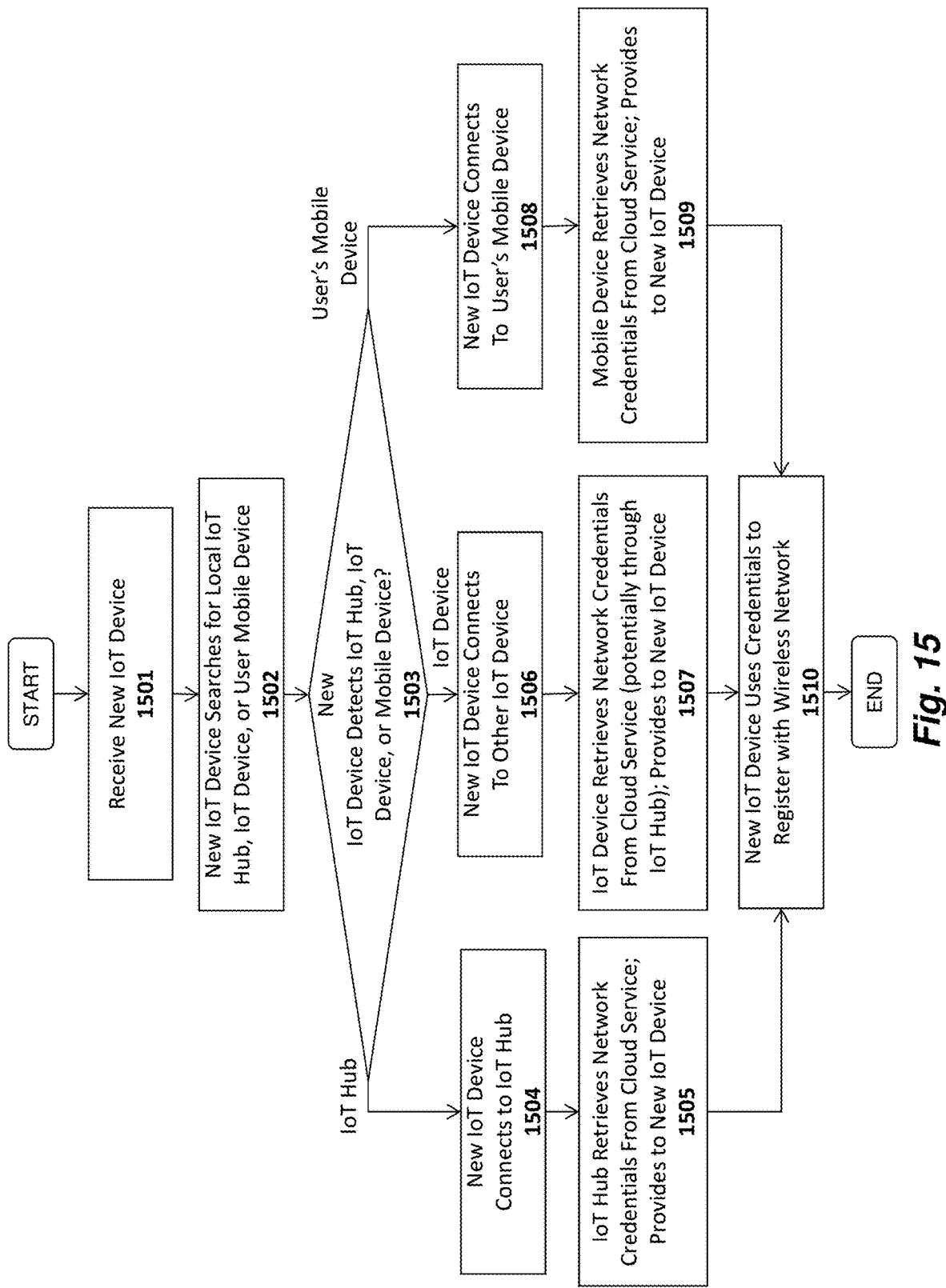
FIG. 15 illustrates one embodiment of a method for registering a new device using stored credentials.

FIG. 15 illustrates a method in accordance with one embodiment of the invention for seamlessly updating a new IoT device using stored network credentials. The method may be implemented within the context of the system architectures described above, but is not limited to any particular architecture.

At 1501, the user receives a new IoT device. The IoT device may have been ordered from the IoT cloud service and/or from an OEM who has a relationship with the IoT cloud service. In either case, the new IoT device is associated with the an account of the user who received the new IoT device.

At 1502, when the new IoT device is powered on, it initially searches for a local IoT hub. As mentioned, the search may be performed using a local wireless protocol such as BTLE. If it cannot locate an IoT hub (e.g., because it is out of range), it may then search for another IoT device and/or a mobile device of the end user (with an app or browser installed thereon to enable a connection to the IoT cloud service).

At 1503 a determination is made as to whether the new IoT device has detected the presence of an IoT hub, another IoT device, or the user's mobile device. If an IoT hub is detected, then at 1504, the new IoT device connects to the IoT hub and, at 1505, the IoT hub retrieves the network credentials from the cloud service on behalf of the new IoT device and provides the credentials to the new IoT device. At 1510, the new IoT device uses the network credentials to register with the wireless network.

If the new IoT device detected another IoT device, then at 1506 it connects to the other IoT device and, at 1507, the IoT device retrieves the network credentials from the IoT cloud service and provides them to the new IoT device. In one embodiment, this may be accomplished through the IoT hub (i.e., if the other device is connected to the IoT hub). Once again, at 1510, the new IoT device uses the network credentials to register with the wireless network.

If the new IoT device detects the user's mobile device, then at 1508, it connects to the mobile device. In one embodiment, the connection is managed by an app such as a connection wizard or browser-executable code on the user's mobile device. At 1509, the IoT device retrieves the network credentials from the IoT cloud service and provides them to the new IoT device. In one embodiment, this may be accomplished through the IoT hub (i.e., if the other device is connected to the IoT hub). At 1510, the new IoT device uses the network credentials to register with the wireless network.

As mentioned, in one embodiment, the network registration module 1310 executed on the new mobile device utilizes a connection priority scheme to determine the order of devices that it should search for when powered on. In one embodiment, it will initially search for an IoT hub and, if one cannot be found, will search for other IoT devices. If none or available, it will then attempt to connect to the user's mobile device. Alternatively, the new IoT device may simply connect to the first device it locates and/or may connect to the device for which it sees the highest signal strength (i.e., RSSI value). Various other connection techniques may be programmed into the network registration module 1310 while still complying with the underlying principles of the invention.

Apparatus and Method for Establishing Secure
Communication Channels in an Internet of Things
(IoT) System In one embodiment of the invention, encryption and decryption of data is performed between the IoT service 120 and each IoT device 101, regardless of the intermediate devices used to support the communication channel (e.g., such as the user's mobile device 611 and/or the IoT hub 110). One embodiment which communicates via an IoT hub 110 is illustrated in FIG. 16A and another embodiment which does not require an IoT hub is illustrated in FIG. 16B.

Figure 16A:
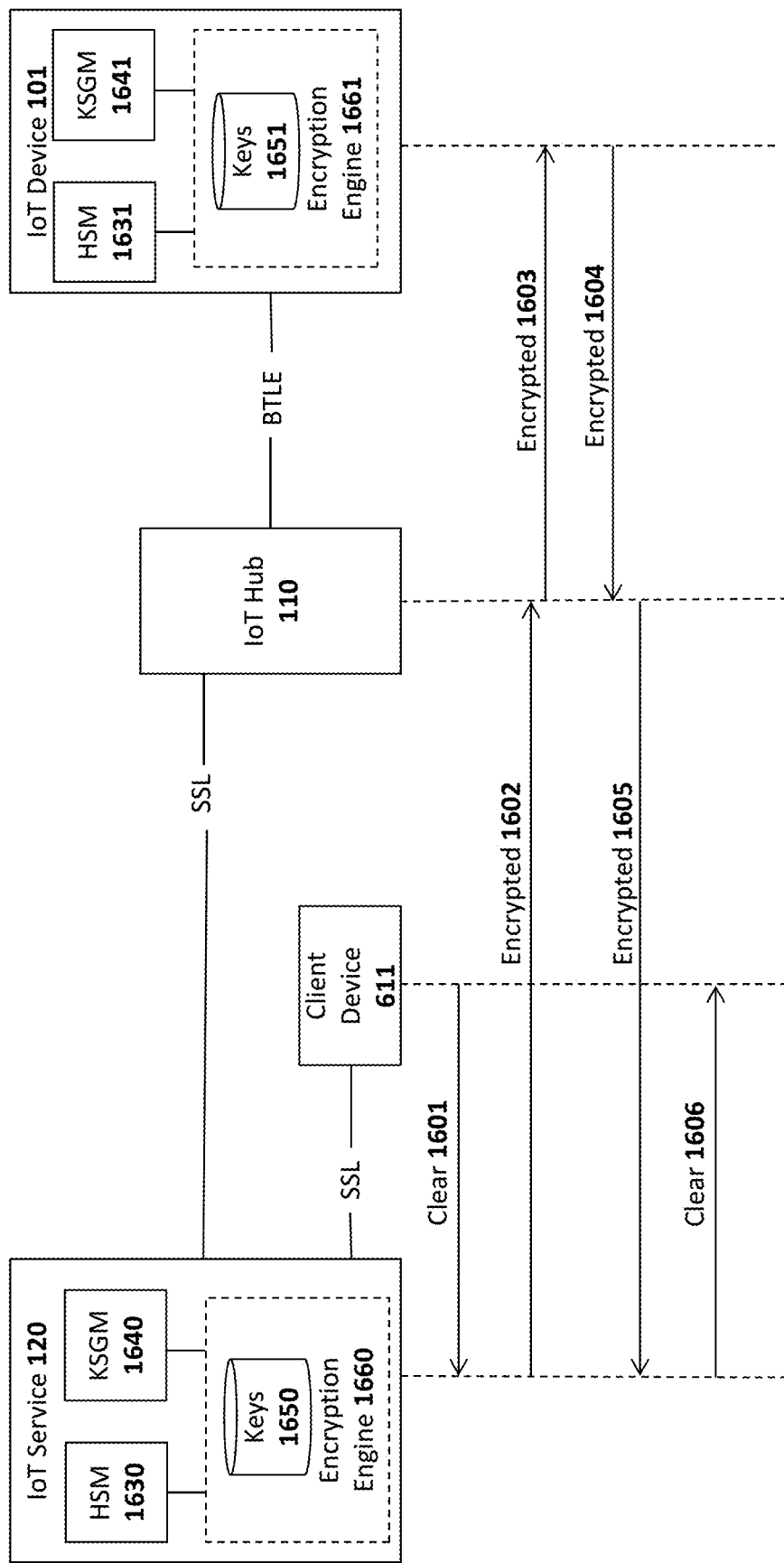
FIGS. 16A-B illustrate different embodiments of the invention for encrypting data between an IoT service and an IoT device.
Figure 16B:
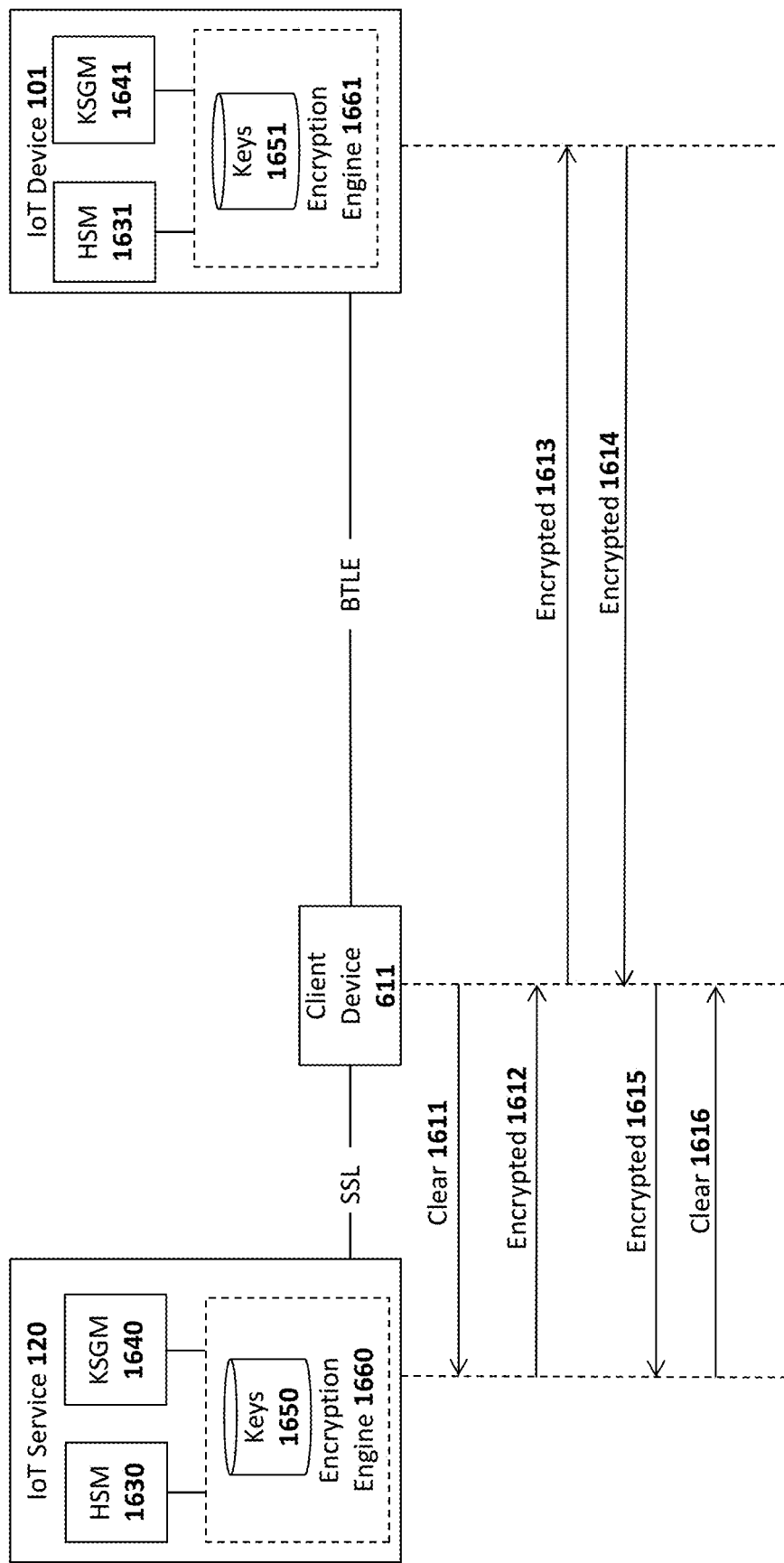

Turning first to FIG. 16A, the IoT service 120 includes an encryption engine 1660 which manages a set of "service session keys" 1650 and each IoT device 101 includes an encryption engine 1661 which manages a set of "device session keys" 1651 for encrypting/decrypting communication between the IoT device 101 and IoT service 120. The encryption engines may rely on different hardware modules when performing the security/encryption techniques described herein including a hardware security module 1630-1631 for (among other things) generating a session public/private key pair and preventing access to the private session key of the pair and a key stream generation module 1640-1641 for generating a key stream using a derived secret. In one embodiment, the service session keys 1650 and the device session keys 1651 comprise related public/private key pairs. For example, in one embodiment, the device session keys 1651 on the IoT device 101 include a public key of the IoT service 120 and a private key of the IoT device 101. As discussed in detail below, in one embodiment, to establish a secure communication session, the public/private session key pairs, 1650 and 1651, are used by each encryption engine, 1660 and 1661, respectively, to generate the same secret which is then used by the SKGMs 1640-1641 to generate a key stream to encrypt and decrypt communication between the IoT service 120 and the IoT device 101. Additional details associated with generation and use of the secret in accordance with one embodiment of the invention are provided below.

In FIG. 16A, once the secret has been generated using the keys 1650-1651, the client will always send messages to the IoT device 101 through the IoT service 120, as indicated by Clear transaction 1611. "Clear" as used herein is meant to indicate that the underlying message is not encrypted using the encryption techniques described herein. However, as illustrated, in one embodiment, a secure sockets layer (SSL) channel or other secure channel (e.g., an Internet Protocol Security (IPSEC) channel) is established between the client device 611 and IoT service 120 to protect the communication. The encryption engine 1660 on the IoT service 120 then encrypts the message using the generated secret and transmits the encrypted message to the IoT hub 110 at 1602. Rather than using the secret to encrypt the message directly, in one embodiment, the secret and a counter value are used to generate a key stream, which is used to encrypt each message packet. Details of this embodiment are described below with respect to FIG. 17.

As illustrated, an SSL connection or other secure channel may be established between the IoT service 120 and the IoT hub 110. The IoT hub 110 (which does not have the ability to decrypt the message in one embodiment) transmits the encrypted message to the IoT device at 1603 (e.g., over a Bluetooth Low Energy (BTLE) communication channel). The encryption engine 1661 on the IoT device 101 may then decrypt the message using the secret and process the message contents. In an embodiment which uses the secret to generate a key stream, the encryption engine 1661 may generate the key stream using the secret and a counter value and then use the key stream for decryption of the message packet.

The message itself may comprise any form of communication between the IoT service 120 and IoT device 101. For example, the message may comprise a command packet instructing the IoT device 101 to perform a particular function such as taking a measurement and reporting the result back to the client device 611 or may include configuration data to configure the operation of the IoT device 101.

If a response is required, the encryption engine 1661 on the IoT device 101 uses the secret or a derived key stream to encrypt the response and transmits the encrypted response to the IoT hub 110 at 1604, which forwards the response to the IoT service 120 at 1605. The encryption engine 1660 on the IoT service 120 then decrypts the response using the secret or a derived key stream and transmits the decrypted response to the client device 611 at 1606 (e.g., over the SSL or other secure communication channel).

FIG. 16B illustrates an embodiment which does not require an IoT hub. Rather, in this embodiment, communication between the IoT device 101 and IoT service 120 occurs through the client device 611 (e.g., as in the embodiments described above with respect to FIGS. 6-9B). In this embodiment, to transmit a message to the IoT device 101 the client device 611 transmits an unencrypted version of the message to the IoT service 120 at 1611. The encryption engine 1660 encrypts the message using the secret or the derived key stream and transmits the encrypted message back to the client device 611 at 1612. The client device 611 then forwards the encrypted message to the IoT device 101 at 1613, and the encryption engine 1661 decrypts the message using the secret or the derived key stream. The IoT device 101 may then process the message as described herein. If a response is required, the encryption engine 1661 encrypts the response using the secret and transmits the encrypted response to the client device 611 at 1614, which forwards the encrypted response to the IoT service 120 at 1615. The encryption engine 1660 then decrypts the response and transmits the decrypted response to the client device 611 at 1616.

Figure 17:
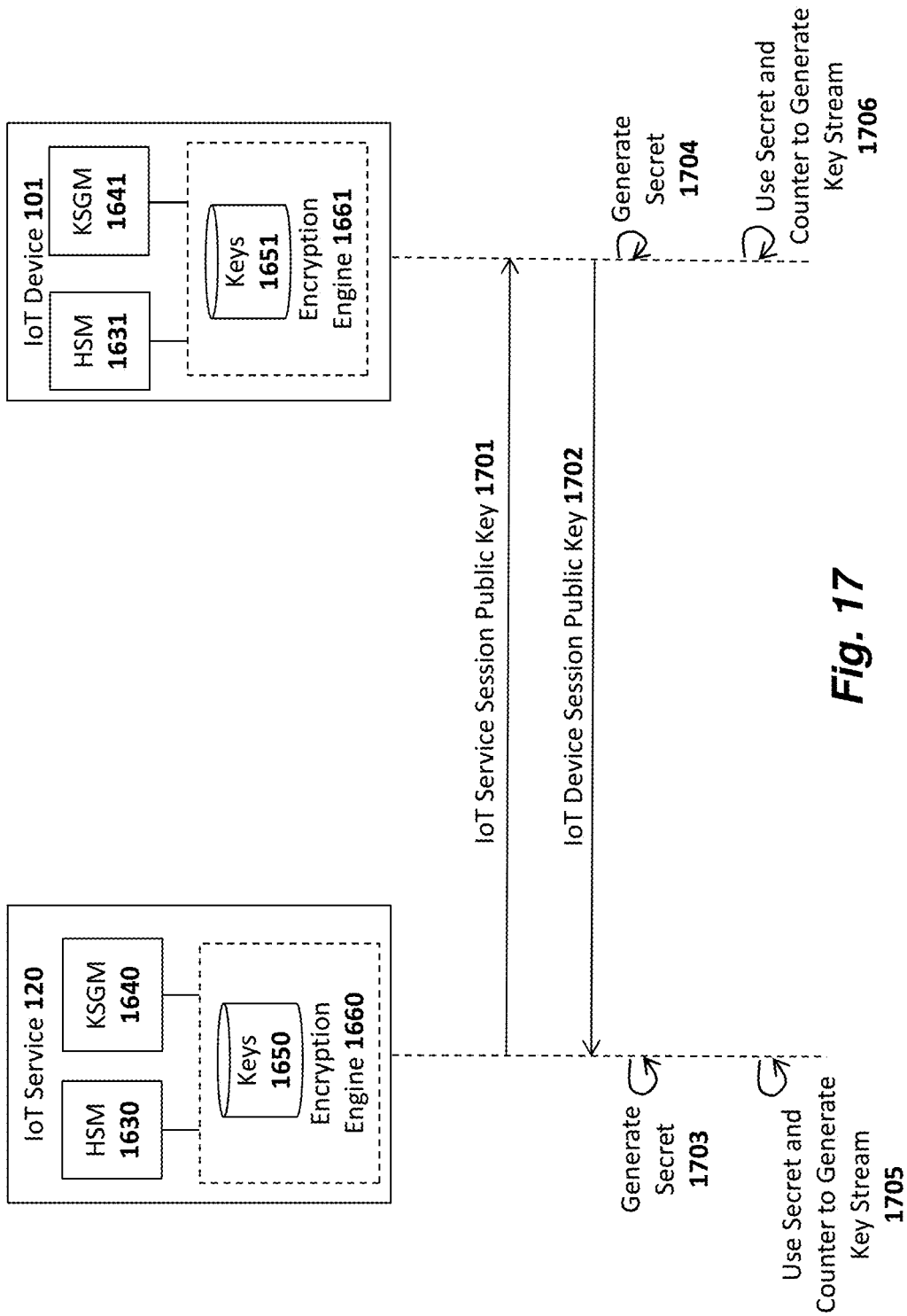
FIG. 17 illustrates embodiments of the invention for performing a secure key exchange, generating a common secret, and using the secret to generate a key stream.

FIG. 17 illustrates a key exchange and key stream generation which may initially be performed between the IoT service 120 and the IoT device 101. In one embodiment, this key exchange may be performed each time the IoT service 120 and IoT device 101 establish a new communication session. Alternatively, the key exchange may be performed and the exchanged session keys may be used for a specified period of time (e.g., a day, a week, etc). While no intermediate devices are shown in FIG. 17 for simplicity, communication may occur through the IoT hub 110 and/or the client device 611.

In one embodiment, the encryption engine 1660 of the IoT service 120 sends a command to the HSM 1630 (e.g., which may be such as a CloudHSM offered by Amazon®) to generate a session public/private key pair. The HSM 1630 may subsequently prevent access to the private session key of the pair. Similarly, the encryption engine on the IoT device 101 may transmit a command to the HSM 1631 (e.g., such as an Atecc508 HSM from Atmel Corporation®) which generates a session public/private key pair and prevents access to the session private key of the pair. Of course, the underlying principles of the invention are not limited to any specific type of encryption engine or manufacturer.

In one embodiment, the IoT service 120 transmits its session public key generated using the HSM 1630 to the IoT device 101 at 1701. The IoT device uses its HSM 1631 to generate its own session public/private key pair and, at 1702, transmits its public key of the pair to the IoT service 120. In one embodiment, the encryption engines 1660-1661 use an Elliptic curve Diffie-Hellman (ECDH) protocol, which is an anonymous key agreement that allows two parties with an elliptic curve public-private key pair, to establish a shared secret. In one embodiment, using these techniques, at 1703, the encryption engine 1660 of the IoT service 120 generates the secret using the IoT device session public key and its own session private key. Similarly, at 1704, the encryption engine 1661 of the IoT device 101 independently generates the same secret using the IoT service 120 session public key and its own session private key. More specifically, in one embodiment, the encryption engine 1660 on the IoT service 120 generates the secret according to the formula secret=IoT device session pub key*IoT service session private key, where '*' means that the IoT device session public key is point-multiplied by the IoT service session private key. The encryption engine 1661 on the IoT device 101 generates the secret according to the formula secret=IoT service session pub key*IoT device session private key, where the IoT service session public key is point multiplied by the IoT device session private key. In the end, the IoT service 120 and IoT device 101 have both generated the same secret to be used to encrypt communication as described below. In one embodiment, the encryption engines 1660-1661 rely on a hardware module such as the KSGMs 1640-1641 respectively to perform the above operations for generating the secret.

Once the secret has been determined, it may be used by the encryption engines 1660 and 1661 to encrypt and decrypt data directly. Alternatively, in one embodiment, the encryption engines 1660-1661 send commands to the KSGMs 1640-1641 to generate a new key stream using the secret to encrypt/decrypt each data packet (i.e., a new key stream data structure is generated for each packet). In particular, one embodiment of the key stream generation module 1640-1641 implements a Galois/Counter Mode (GCM) in which a counter value is incremented for each data packet and is used in combination with the secret to generate the key stream. Thus, to transmit a data packet to the IoT service 120, the encryption engine 1661 of the IoT device 101 uses the secret and the current counter value to cause the KSGMs 1640-1641 to generate a new key stream and increment the counter value for generating the next key stream. The newly-generated key stream is then used to encrypt the data packet prior to transmission to the IoT service 120. In one embodiment, the key stream is XORed with the data to generate the encrypted data packet. In one embodiment, the IoT device 101 transmits the counter value with the encrypted data packet to the IoT service 120. The encryption engine 1660 on the IoT service then communicates with the KSGM 1640 which uses the received counter value and the secret to generate the key stream (which should be the same key stream because the same secret and counter value are used) and uses the generated key stream to decrypt the data packet.

In one embodiment, data packets transmitted from the IoT service 120 to the IoT device 101 are encrypted in the same manner. Specifically, a counter is incremented for each data packet and used along with the secret to generate a new key stream. The key stream is then used to encrypt the data (e.g., performing an XOR of the data and the key stream) and the encrypted data packet is transmitted with the counter value to the IoT device 101. The encryption engine 1661 on the IoT device 101 then communicates with the KSGM 1641 which uses the counter value and the secret to generate the same key stream which is used to decrypt the data packet. Thus, in this embodiment, the encryption engines 1660-1661 use their own counter values to generate a key stream to encrypt data and use the counter values received with the encrypted data packets to generate a key stream to decrypt the data.

In one embodiment, each encryption engine 1660-1661 keeps track of the last counter value it received from the other and includes sequencing logic to detect whether a counter value is received out of sequence or if the same counter value is received more than once. If a counter value is received out of sequence, or if the same counter value is received more than once, this may indicate that a replay attack is being attempted. In response, the encryption engines 1660-1661 may disconnect from the communication channel and/or may generate a security alert.

Figure 18:
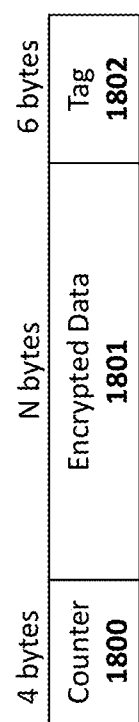
FIG. 18 illustrates a packet structure in accordance with one embodiment of the invention.

FIG. 18 illustrates an exemplary encrypted data packet employed in one embodiment of the invention comprising a 4-byte counter value 1800, a variable-sized encrypted data field 1801, and a 6-byte tag 1802. In one embodiment, the tag 1802 comprises a checksum value to validate the decrypted data (once it has been decrypted).

As mentioned, in one embodiment, the session public/private key pairs 1650-1651 exchanged between the IoT service 120 and IoT device 101 may be generated periodically and/or in response to the initiation of each new communication session.

One embodiment of the invention implements additional techniques for authenticating sessions between the IoT service 120 and IoT device 101. In particular, in one embodiment, hierarchy of public/private key pairs is used including a master key pair, a set of factory key pairs, and a set of IoT service key pairs, and a set of IoT device key pairs. In one embodiment, the master key pair comprises a root of trust for all of the other key pairs and is maintained in a single, highly secure location (e.g., under the control of the organization implementing the IoT systems described herein). The master private key may be used to generate signatures over (and thereby authenticate) various other key pairs such as the factory key pairs. The signatures may then be verified using the master public key. In one embodiment, each factory which manufactures IoT devices is assigned its own factory key pair which may then be used to authenticate IoT service keys and IoT device keys. For example, in one embodiment, a factory private key is used to generate a signature over IoT service public keys and IoT device public keys. These signature may then be verified using the corresponding factory public key. Note that these IoT service/device public keys are not the same as the "session" public/private keys described above with respect to FIGS. 16A-B. The session public/private keys described above are temporary (i.e., generated for a service/device session) while the IoT service/device key pairs are permanent (i.e., generated at the factory).

With the foregoing relationships between master keys, factory keys, service/device keys in mind, one embodiment of the invention performs the following operations to provide additional layers of authentication and security between the IoT service 120 and IoT device 101:

A. In one embodiment, the IoT service 120 initially generates a message containing the following:
  1. The IoT service's unique ID:
     The IoT service's serial number;
     a Timestamp;
     The ID of the factory key used to sign this unique ID;
     a Class of the unique ID (i.e., a service);
     IoT service's public key
     The signature over the unique ID.
  2. The Factory Certificate including:
     A timestamp
     The ID of the master key used to sign the certificate
     The factory public key
     The signature of the Factory Certificate
  3. IoT service session public key (as described above with respect to FIGS. 16A-B)
  4. IoT service session public key signature (e.g., signed with the IoT service's private key)

B. In one embodiment, the message is sent to the IoT device on the negotiation channel (described below). The IoT device parses the message and:
  1. Verifies the signature of the factory certificate (only if present in the message payload)
  2. Verifies the signature of the unique ID using the key identified by the unique ID
  3. Verifies the IoT service session public key signature using the IoT service's public key from the unique ID
  4. Saves the IoT service's public key as well as the IoT service's session public key
  5. Generates the IoT device session key pair
C. The IoT device then generates a message containing the following:
  1. IoT device's unique ID
     IoT device serial number
     Timestamp
     ID of factory key used to sign this unique ID
     Class of unique ID (i.e., IoT device)
     IoT device's public key
     Signature of unique ID
  2. IoT device's session public key
  3. Signature of (IoT device session public key+IoT service session public key) signed with IoT device's key
D. This message is sent back to the IoT service. The IoT service parses the message and:
  1. Verifies the signature of the unique ID using the factory public key
  2. Verifies the signature of the session public keys using the IoT device's public key
  3. Saves the IoT device's session public key
E. The IoT service then generates a message containing a signature of (IoT device session public key+IoT service session public key) signed with the IoT service's key.
F The IoT device parses the message and:
  1. Verifies the signature of the session public keys using the IoT service's public key
  2. Generates the key stream from the IoT device session private key and the IoT service's session public key
  3. The IoT device then sends a "messaging available" message.
G. The IoT service then does the following:
  1. Generates the key stream from the IoT service session private key and the IoT device's session public key
  2. Creates a new message on the messaging channel which contains the following:
     Generates and stores a random 2 byte value
     Set attribute message with the boomerang attribute Id (discussed below) and the random value
H. The IoT device receives the message and:
  1. Attempts to decrypt the message
  2. Emits an Update with the same value on the indicated attribute Id
I. The IoT service recognizes the message payload contains a boomerang attribute update and:
  1. Sets its paired state to true
  2. Sends a pairing complete message on the negotiator channel
J. IoT device receives the message and sets his paired state to true While the above techniques are described with respect to an "IoT service" and an "IoT device," the underlying principles of the invention may be implemented to establish a secure communication channel between any two devices including user client devices, servers, and Internet services.

The above techniques are highly secure because the private keys are never shared over the air (in contrast to current Bluetooth pairing techniques in which a secret is transmitted from one party to the other). An attacker listening to the entire conversation will only have the public keys, which are insufficient to generate the shared secret. These techniques also prevent a man-in-the-middle attack by exchanging signed public keys. In addition, because GCM and separate counters are used on each device, any kind of "replay attack" (where a man in the middle captures the data and sends it again) is prevented. Some embodiments also prevent replay attacks by using asymmetrical counters.

Techniques for Exchanging Data and Commands without Formally Pairing Devices

GATT is an acronym for the Generic Attribute Profile, and it defines the way that two Bluetooth Low Energy (BTLE) devices transfer data back and forth. It makes use of a generic data protocol called the Attribute Protocol (ATT), which is used to store Services, Characteristics and related data in a simple lookup table using 16-bit Characteristic IDs for each entry in the table. Note that while the "characteristics" are sometimes referred to as "attributes."

On Bluetooth devices, the most commonly used characteristic is the devices "name" (having characteristic ID 10752 (0x2A00)). For example, a Bluetooth device may identify other Bluetooth devices within its vicinity by reading the "Name" characteristic published by those other Bluetooth devices using GATT. Thus, Bluetooth device have the inherent ability to exchange data without formally pairing/bonding the devices (note that "paring" and "bonding" are sometimes used interchangeably; the remainder of this discussion will use the term "pairing").

One embodiment of the invention takes advantage of this capability to communicate with BTLE-enabled IoT devices without formally pairing with these devices. Pairing with each individual IoT device would extremely inefficient because of the amount of time required to pair with each device and because only one paired connection may be established at a time.

Figure 19:
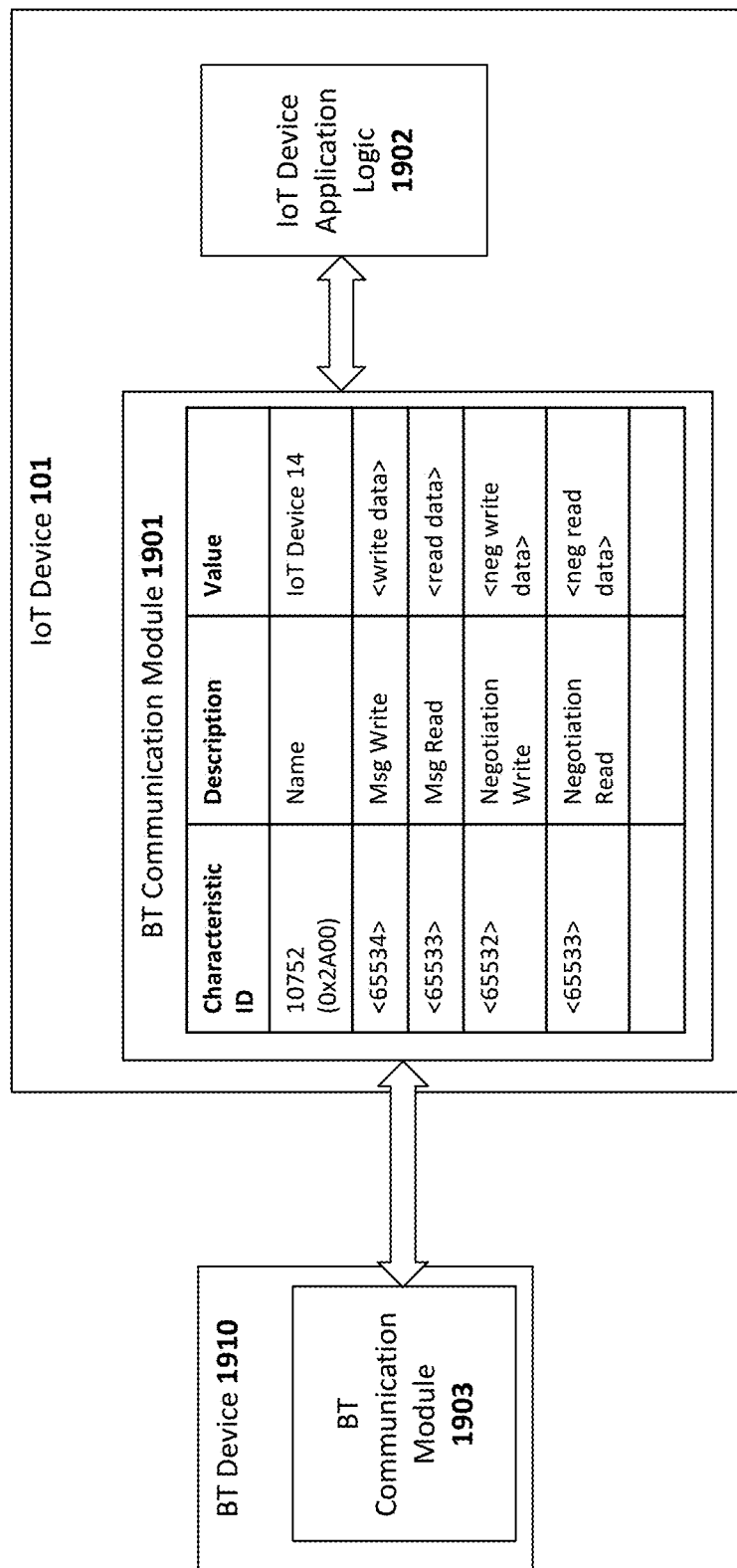
FIG. 19 illustrates techniques employed in one embodiment for writing and reading data to/from an IoT device without formally pairing with the IoT device.

FIG. 19 illustrates one particular embodiment in which a Bluetooth (BT) device 1910 establishes a network socket abstraction with a BT communication module 1901 of an IoT device 101 without formally establishing a paired BT connection. The BT device 1910 may be included in an IoT hub 110 and/or a client device 611 such as shown in FIG. 16A. As illustrated, the BT communication module 1901 maintains a data structure containing a list of characteristic IDs, names associated with those characteristic IDs and values for those characteristic IDs. The value for each characteristic may be stored within a 20-byte buffer identified by the characteristic ID in accordance with the current BT standard. However, the underlying principles of the invention are not limited to any particular buffer size.

In the example in FIG. 19, the "Name" characteristic is a BT-defined characteristic which is assigned a specific value of "IoT Device 14." One embodiment of the invention specifies a first set of additional characteristics to be used for negotiating a secure communication channel with the BT device 1910 and a second set of additional characteristics to be used for encrypted communication with the BT device 1910. In particular, a "negotiation write" characteristic, identified by characteristic ID <65532> in the illustrated example, may be used to transmit outgoing negotiation messages and the "negotiation read" characteristic, identified by characteristic ID <65533> may be used to receive incoming negotiation messages. The "negotiation messages" may include messages used by the BT device 1910 and the BT communication module 1901 to establish a secure communication channel as described herein. By way of example, in FIG. 17, the IoT device 101 may receive the IoT service session public key 1701 via the "negotiation read" characteristic <65533>. The key 1701 may be transmitted from the IoT service 120 to a BTLE-enabled IoT hub 110 or client device 611 which may then use GATT to write the key 1701 to the negotiation read value buffer identified by characteristic ID <65533>. IoT device application logic 1902 may then read the key 1701 from the value buffer identified by characteristic ID <65533> and process it as described above (e.g., using it to generate a secret and using the secret to generate a key stream, etc).

If the key 1701 is greater than 20 bytes (the maximum buffer size in some current implementations), then it may be written in 20-byte portions. For example, the first 20 bytes may be written by the BT communication module 1903 to characteristic ID <65533> and read by the IoT device application logic 1902, which may then write an acknowledgement message to the negotiation write value buffer identified by characteristic ID <65532>. Using GATT, the BT communication module 1903 may read this acknowledgement from characteristic ID <65532> and responsively write the next 20 bytes of the key 1701 to the negotiation read value buffer identified by characteristic ID <65533>. In this manner, a network socket abstraction defined by characteristic IDs <65532> and <65533> is established for exchanging negotiation messages used to establish a secure communication channel.

In one embodiment, once the secure communication channel is established, a second network socket abstraction is established using characteristic ID <65534> (for transmitting encrypted data packets from IoT device 101) and characteristic ID <65533> (for receiving encrypted data packets by IoT device). That is, when BT communication module 1903 has an encrypted data packet to transmit (e.g., such as encrypted message 1603 in FIG. 16A), it starts writing the encrypted data packet, 20 bytes at a time, using the message read value buffer identified by characteristic ID <65533>. The IoT device application logic 1902 will then read the encrypted data packet, 20 bytes at a time, from the read value buffer, sending acknowledgement messages to the BT communication module 1903 as needed via the write value buffer identified by characteristic ID <65532>.

In one embodiment, the commands of GET, SET, and UPDATE described below are used to exchange data and commands between the two BT communication modules 1901 and 1903. For example, the BT communication module 1903 may send a packet identifying characteristic ID <65533> and containing the SET command to write into the value field/buffer identified by characteristic ID <65533> which may then be read by the IoT device application logic 1902. To retrieve data from the IoT device 101, the BT communication module 1903 may transmit a GET command directed to the value field/buffer identified by characteristic ID <65534>. In response to the GET command, the BT communication module 1901 may transmit an UPDATE packet to the BT communication module 1903 containing the data from the value field/buffer identified by characteristic ID <65534>. In addition, UPDATE packets may be transmitted automatically, in response to changes in a particular attribute on the IoT device 101. For example, if the IoT device is associated with a lighting system and the user turns on the lights, then an UPDATE packet may be sent to reflect the change to the on/off attribute associated with the lighting application.

Figure 20:
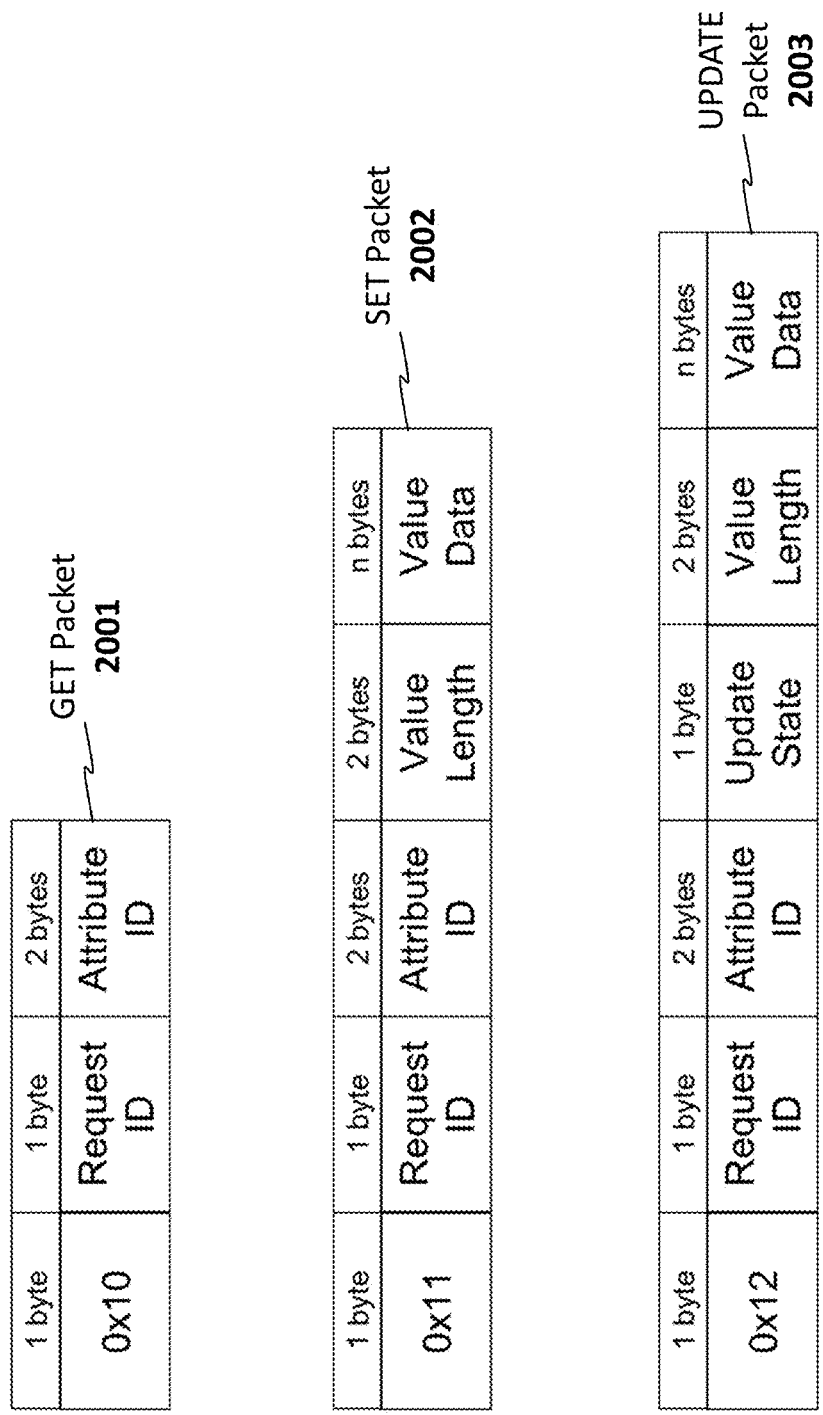
FIG. 20 illustrates an exemplary set of command packets employed in one embodiment of the invention.

FIG. 20 illustrates exemplary packet formats used for GET, SET, and UPDATE in accordance with one embodiment of the invention. In one embodiment, these packets are transmitted over the message write <65534> and message read <65533> channels following negotiation. In the GET packet 2001, a first 1-byte field includes a value (0x10) which identifies the packet as a GET packet. A second 1-byte field includes a request ID, which uniquely identifies the current GET command (i.e., identifies the current transaction with which the GET command is associated). For example, each instance of a GET command transmitted from a service or device may be assigned a different request ID. This may be done, for example, by incrementing a counter and using the counter value as the request ID. However, the underlying principles of the invention are not limited to any particular manner for setting the request ID.

A 2-byte attribute ID identifies the application-specific attribute to which the packet is directed. For example, if the GET command is being sent to IoT device 101 illustrated in FIG. 19, the attribute ID may be used to identify the particular application-specific value being requested. Returning to the above example, the GET command may be directed to an application-specific attribute ID such as power status of a lighting system, which comprises a value identifying whether the lights are powered on or off (e.g., 1=on, 0=off). If the IoT device 101 is a security apparatus associated with a door, then the value field may identify the current status of the door (e.g., 1=opened, 0=closed). In response to the GET command, a response may be transmitting containing the current value identified by the attribute ID.

The SET packet 2002 and UPDATE packet 2003 illustrated in FIG. 20 also include a first 1-byte field identifying the type of packet (i.e., SET and UPDATE), a second 1-byte field containing a request ID, and a 2-byte attribute ID field identifying an application-defined attribute. In addition, the SET packet includes a 2-byte length value identifying the length of data contained in an n-byte value data field. The value data field may include a command to be executed on the IoT device and/or configuration data to configure the operation of the IoT device in some manner (e.g., to set a desired parameter, to power down the IoT device, etc). For example, if the IoT device 101 controls the speed of a fan, the value field may reflect the current fan speed.

The UPDATE packet 2003 may be transmitted to provide an update of the results of the SET command. The UPDATE packet 2003 includes a 2-byte length value field to identify the length of the n-byte value data field which may include data related to the results of the SET command. In addition, a 1-byte update state field may identify the current state of the variable being updated. For example, if the SET command attempted to turn off a light controlled by the IoT device, the update state field may indicate whether the light was successfully turned off.

Figure 21:
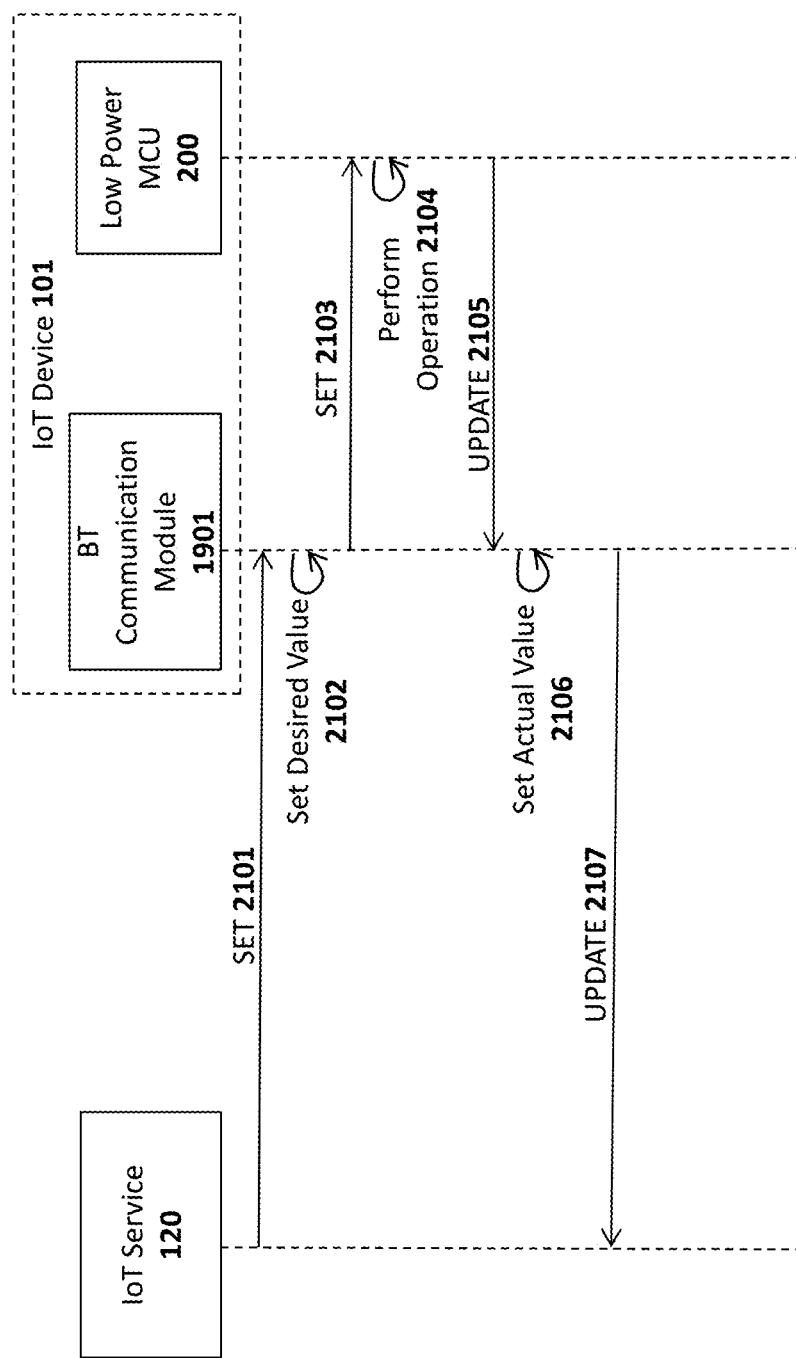
FIG. 21 illustrates an exemplary sequence of transactions using command packets.

FIG. 21 illustrates an exemplary sequence of transactions between the IoT service 120 and an IoT device 101 involving the SET and UPDATE commands. Intermediary devices such as the IoT hub and the user's mobile device are not shown to avoid obscuring the underlying principles of the invention. At 2101, the SET command 2101 is transmitted form the IoT service to the IoT device 101 and received by the BT communication module 1901 which responsively updates the GATT value buffer identified by the characteristic ID at 2102. The SET command is read from the value buffer by the low power microcontroller (MCU) 200 at 2103 (or by program code being executed on the low power MCU such as IoT device application logic 1902 shown in FIG. 19).

At 2104, the MCU 200 or program code performs an operation in response to the SET command. For example, the SET command may include an attribute ID specifying a new configuration parameter such as a new temperature or may include a state value such as on/off (to cause the IoT device to enter into an "on" or a low power state). Thus, at 2104, the new value is set in the IoT device and an UPDATE command is returned at 2105 and the actual value is updated in a GATT value field at 2106. In some cases, the actual value will be equal to the desired value. In other cases, the updated value may be different (i.e., because it may take time for the IoT device 101 to update certain types of values). Finally, at 2107, the UPDATE command is transmitted back to the IoT service 120 containing the actual value from the GATT value field.

Figure 22:
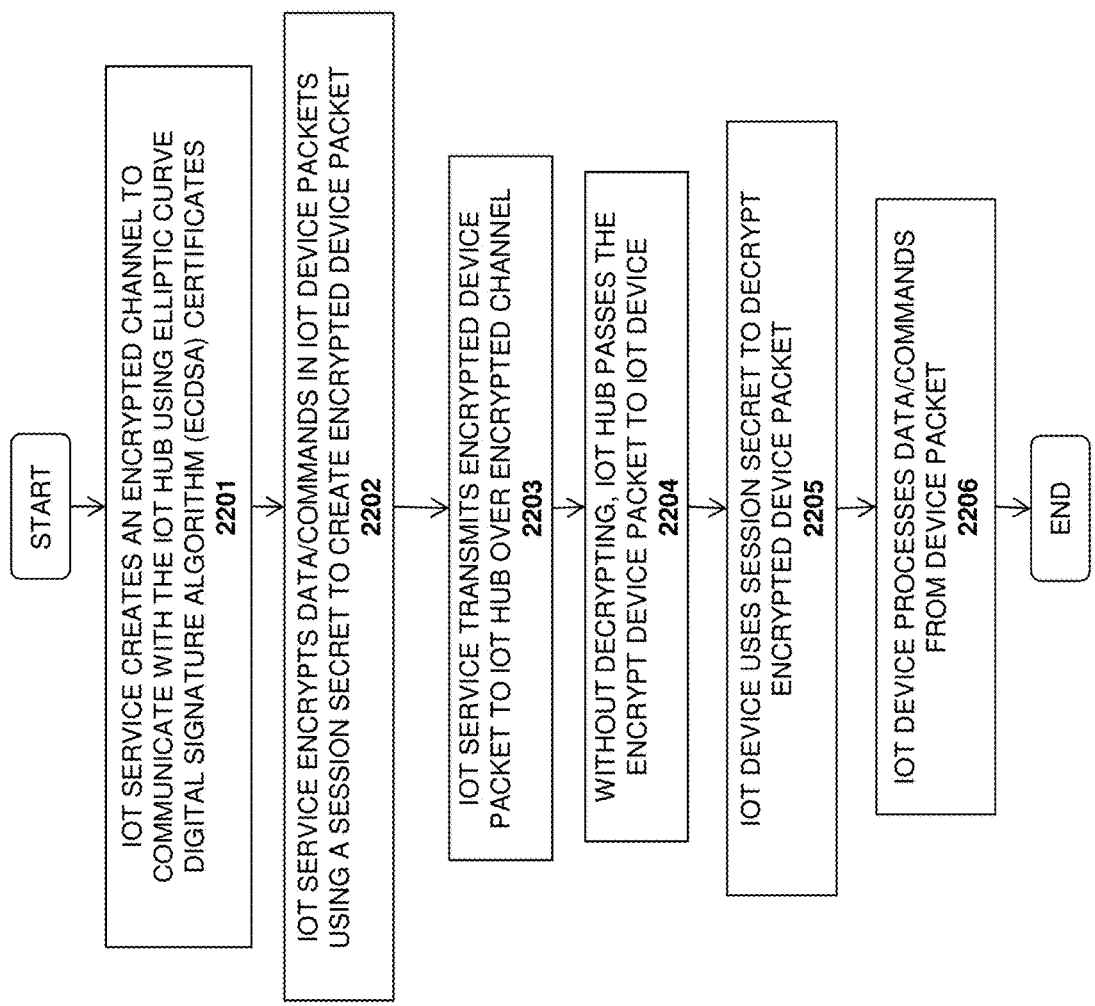
FIG. 22 illustrates a method in accordance with one embodiment of the invention.

FIG. 22 illustrates a method for implementing a secure communication channel between an IoT service and an IoT device in accordance with one embodiment of the invention. The method may be implemented within the context of the network architectures described above but is not limited to any specific architecture.

At 2201, the IoT service creates an encrypted channel to communicate with the IoT hub using elliptic curve digital signature algorithm (ECDSA) certificates. At 2202, the IoT service encrypts data/commands in IoT device packets using the a session secret to create an encrypted device packet. As mentioned above, the session secret may be independently generated by the IoT device and the IoT service. At 2203, the IoT service transmits the encrypted device packet to the IoT hub over the encrypted channel. At 2204, without decrypting, the IoT hub passes the encrypted device packet to the IoT device. At 22-5, the IoT device uses the session secret to decrypt the encrypted device packet. As mentioned, in one embodiment this may be accomplished by using the secret and a counter value (provided with the encrypted device packet) to generate a key stream and then using the key stream to decrypt the packet. At 2206, the IoT device then extracts and processes the data and/or commands contained within the device packet.

Thus, using the above techniques, bi-directional, secure network socket abstractions may be established between two BT-enabled devices without formally pairing the BT devices using standard pairing techniques. While these techniques are described above with respect to an IoT device 101 communicating with an IoT service 120, the underlying principles of the invention may be implemented to negotiate and establish a secure communication channel between any two BT-enabled devices.

Figure 23A:
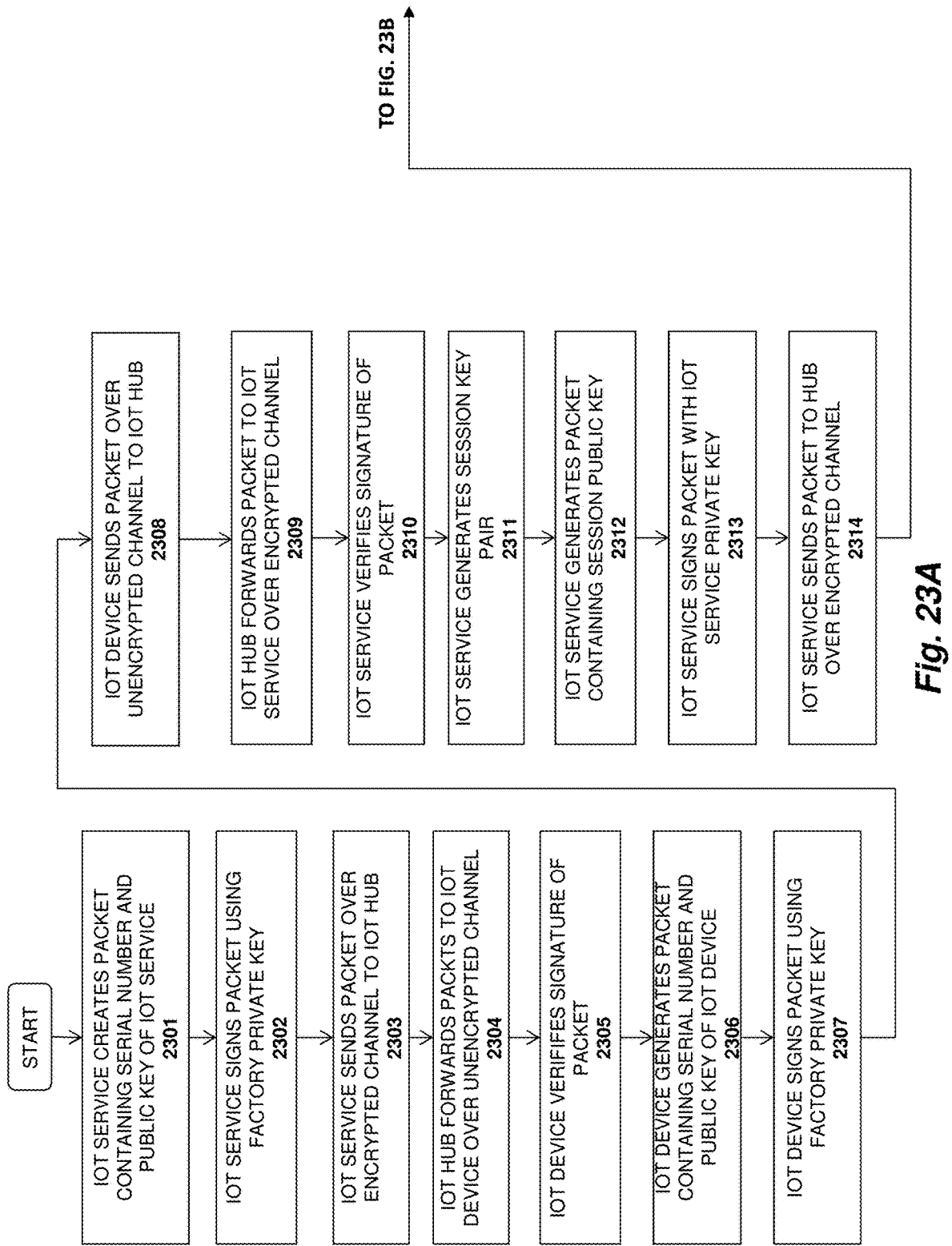
Figure 23B:
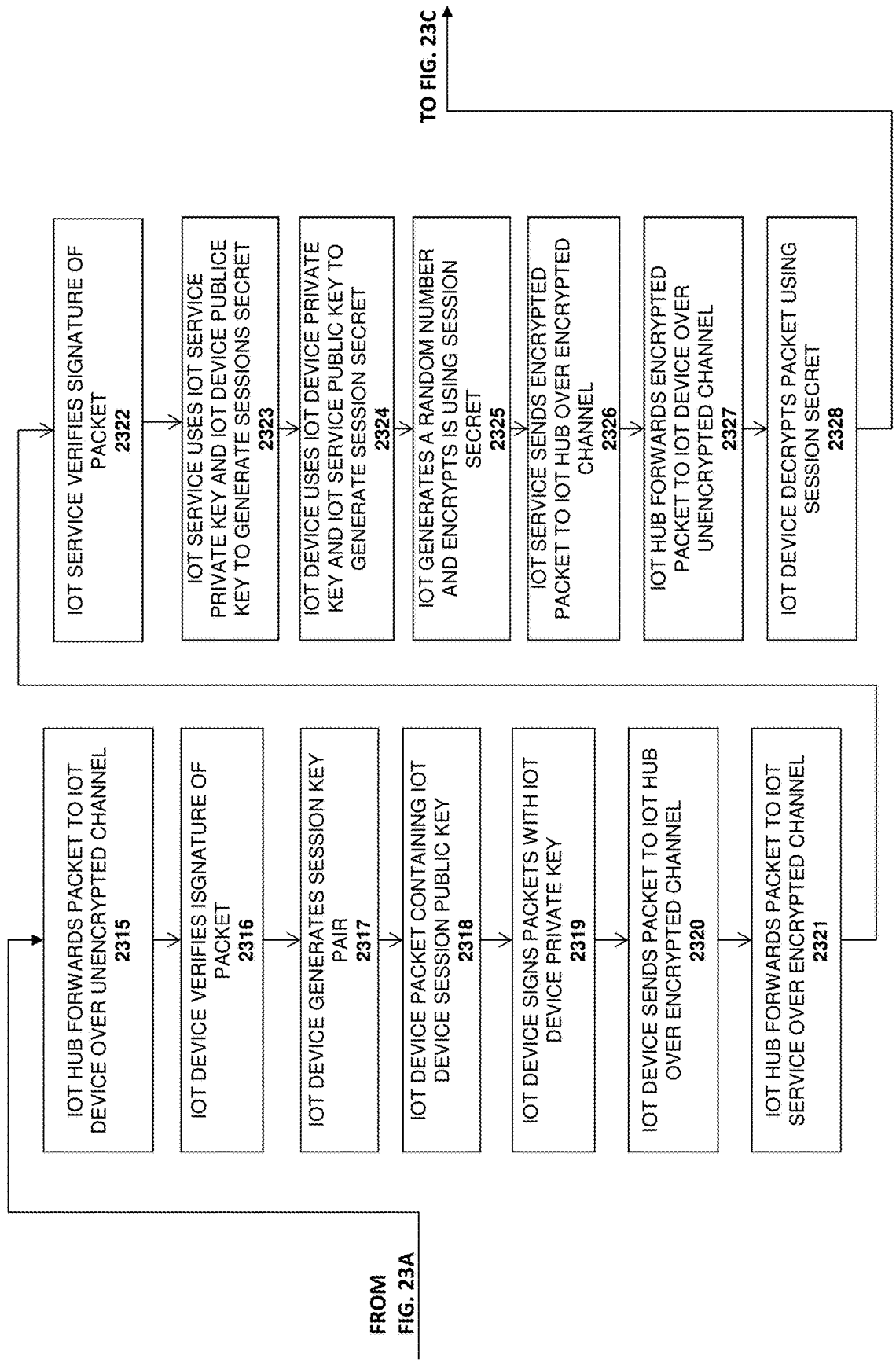

FIGS. 23A-C illustrate a detailed method for pairing devices in accordance with one embodiment of the invention. The method may be implemented within the context of the system architectures described above, but is not limited to any specific system architectures.

At 2301, the IoT Service creates a packet containing serial number and public key of the IoT Service. At 2302, the IoT Service signs the packet using the factory private key. At 2303, the IoT Service sends the packet over an encrypted channel to the IoT hub and at 2304 the IoT hub forwards the packet to IoT device over an unencrypted channel. At 2305, the IoT device verifies the signature of packet and, at 2306, the IoT device generates a packet containing the serial number and public key of the IoT Device. At 2307, the IoT device signs the packet using the factory private key and at 2308, the IoT device sends the packet over the unencrypted channel to the IoT hub.

At 2309, the IoT hub forwards the packet to the IoT service over an encrypted channel and at 2310, the IoT Service verifies the signature of the packet. At 2311, the IoT Service generates a session key pair, and at 2312 the IoT Service generates a packet containing the session public key. The IoT Service then signs the packet with IoT Service private key at 2313 and, at 2314, the IoT Service sends the packet to the IoT hub over the encrypted channel.

Turning to FIG. 23B, the IoT hub forwards the packet to the IoT device over the unencrypted channel at 2315 and, at 2316, the IoT device verifies the signature of packet. At 2317 the IoT device generates session key pair (e.g., using the techniques described above), and, at 2318, an IoT device packet is generated containing the IoT device session public key. At 2319, the IoT device signs the IoT device packet with IoT device private key. At 2320, the IoT device sends the packet to the IoT hub over the unencrypted channel and, at 2321, the IoT hub forwards the packet to the IoT service over an encrypted channel.

At 2322, the IoT service verifies the signature of the packet (e.g., using the IoT device public key) and, at 2323, the IoT service uses the IoT service private key and the IoT device public key to generate the session secret (as described in detail above). At 2324, the IoT device uses the IoT device private key and IoT service public key to generate the session secret (again, as described above) and, at 2325, the IoT device generates a random number and encrypts it using the session secret. At 2326, the IoT service sends the encrypted packet to IoT hub over the encrypted channel. At 2327, the IoT hub forwards the encrypted packet to the IoT device over the unencrypted channel. At 2328, the IoT device decrypts the packet using the session secret.

Turning to FIG. 23C, the IoT device re-encrypts the packet using the session secret at 2329 and, at 2330, the IoT device sends the encrypted packet to the IoT hub over the unencrypted channel. At 2331, the IoT hub forwards the encrypted packet to the IoT service over the encrypted channel. The IoT service decrypts the packet using the session secret at 2332. At 2333 the IoT service verifies that the random number matches the random number it sent. The IoT service then sends a packet indicating that pairing is complete at 2334 and all subsequent messages are encrypted using the session secret at 2335.

Apparatus and Method for Sharing WiFi Security Data in an IoT System

As mentioned, certain IoT devices and IoT hubs may be configured to establish communication channels over WiFi networks. When establishing such a connection over a secure WiFi network, a configuration must be performed to provide the WiFi key to the IoT device/hub. The embodiments of the invention described below include techniques for connecting an IoT hub to a secure WiFi channel by sharing security data such as a WiFi key, thereby simplifying the configuration process.

Figure 24:
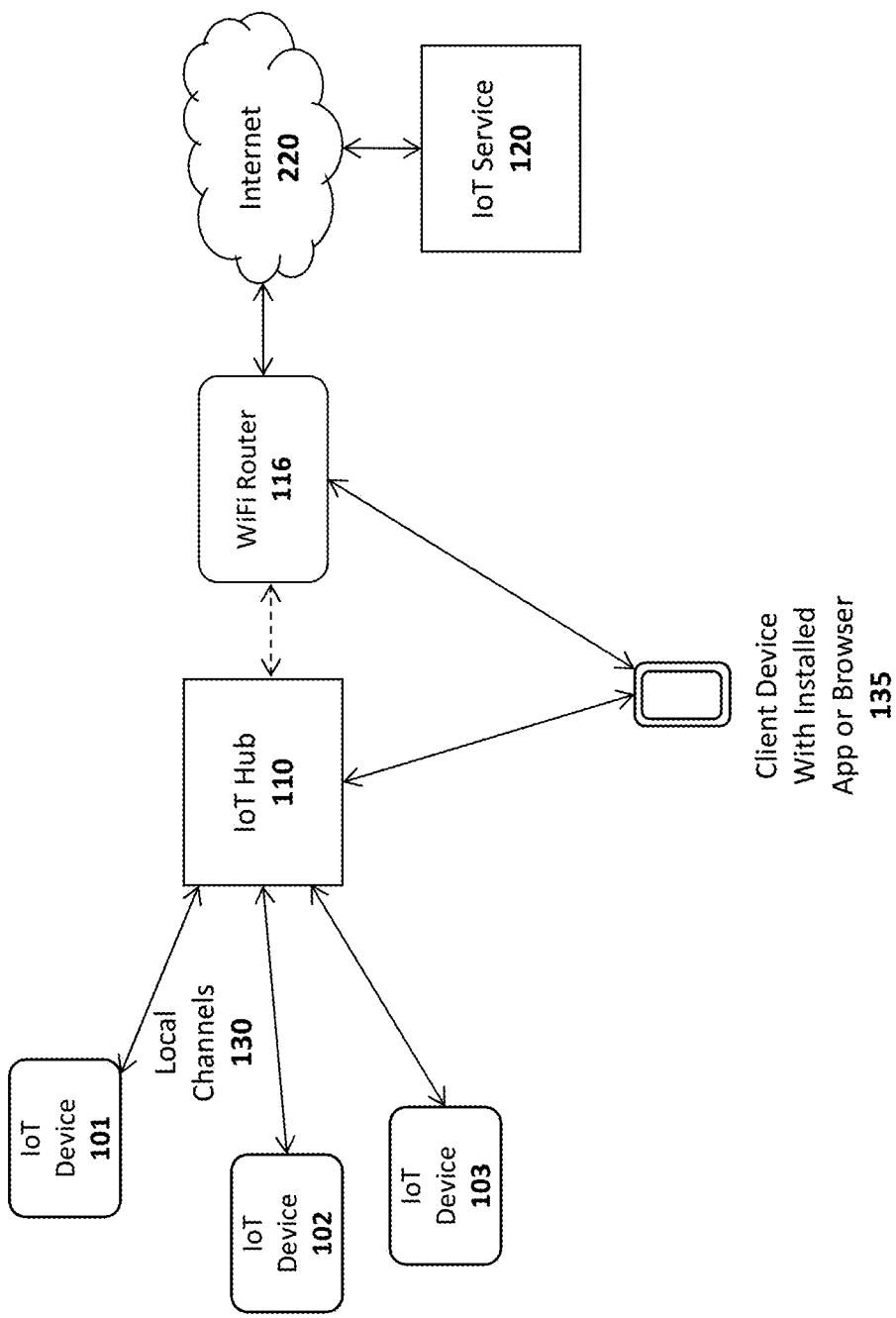
FIG. 24 illustrates one embodiment of a system for configuring an IoT hub with WiFi security data.

As illustrated in FIG. 24, one embodiment of the invention is implemented within the context of an IoT hub 110 designed to connect a plurality of IoT devices 101-103 to an IoT service 120 over the Internet 220 (as in prior embodiments described above). In one embodiment, the security techniques described above are used to securely provide the IoT hub 110 with a WiFi key and other data such as the SSID of for a local WiFi router 116. In one embodiment, to configure the IoT hub 110, an app on the client device 135 temporarily performs the functions of an IoT hub to communicatively couple the IoT hub 110 to the IoT service. The IoT hub 110 and IoT service 120 then establish a secure communication channel to provide the WiFi security data to the IoT hub as described below.

Figure 25:
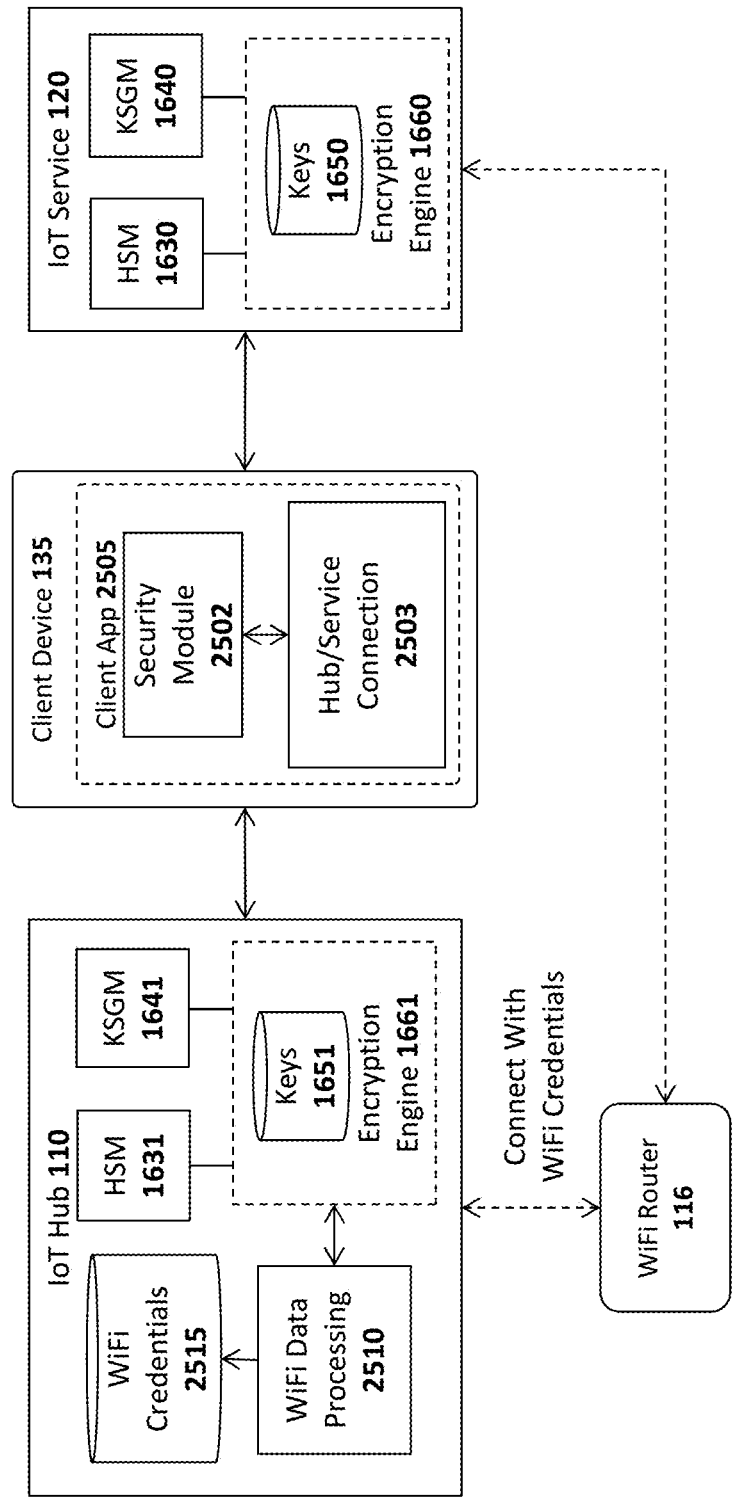
FIG. 25 illustrates a system architecture employed in one embodiment of the invention.

In particular, FIG. 25 illustrates how the IoT hub 110 and IoT service 120 include the various security components described above for establishing a secure communication channel, including encryption engines 1660-1661, secure key stores 1650-1651, KSGM modules 1640-1641, and HSM modules 1630-1631. These components operate substantially as described above to securely connect the IoT hub 110 to the IoT service 120. In one embodiment, a client app 2505 (or other program code) executed on the client device 135 includes hub/service connection logic 2503 for establishing a communication channel between the IoT hub 110 and the IoT service 120 and a security module 2502 for generating and sharing a secret used to encrypt the WiFi security data, as described below. In one embodiment, the client device 130 forms a BTLE connection with the IoT hub 110 and a WiFi or cellular data connection with the IoT service 120 to establish the connection between the IoT hub 110 and the IoT service 120.

As mentioned, in one embodiment, after the BTLE connection is formed between the IoT hub 110 and the client device 135 and the WiFi/cellular connection is formed between the client device 135 and the IoT service 120, the IoT service 120 authenticates with the IoT hub using the ECDH key exchange techniques described above. In this embodiment, the hub/service connection logic 2503 on the client device 135 performs the same or similar functions as the IoT hub described above (e.g., forming a two way communication channel to pass the data traffic between the IoT hub 110 and the IoT service 120).

In one embodiment, a security module 2502 of the client app 2505 generates a secret to be used for encryption and sends it to the IoT hub over the BTLE communication channel. In one embodiment, the secret comprises a 32 byte random number (e.g., generated in a similar manner as the keystream described above). The secret may be sent in the clear in this embodiment because an attacker will not have access to the underlying data to use it on (e.g., the WiFi key and associated data).

The client app 2505 then retrieves the WiFi key and other WiFi data (e.g., such as the SSID), encrypts it using the secret, and sends it to the IoT service 120. In one embodiment, the client app 2505 requests this information directly from the user (e.g., asking the user to enter the key via a GUI). In another embodiment, the client app 2505 retrieves it from a local secure storage following authentication by the end user. The IoT service 120 cannot read the WiFi key and other data because it does not have the secret generated by the security module 2502.

In one embodiment, the IoT service 120 then encrypts the (already encrypted) key and other data and sends the twice-encrypted key/data to the IoT hub 110 via the hub/service connection logic 2503. The client app 2505 of this embodiment cannot read this traffic because only the IoT service 120 and the IoT hub 110 have the session secret (see, e.g., FIGS. 16A-23C and associated text). Thus, upon receipt of the twice-encrypted key and other data, the IoT hub 110 decrypts the twice-encrypted key/data using the session secret to generate the encrypted key/data (the version encrypted using the secret generated by the security module 2502).

In one embodiment, WiFi data processing logic 2510 on the IoT hub then uses the secret provided by the security module 2502 to decrypt the encrypted key and other data, resulting in a fully-decrypted WiFi key and associated data. It may then use the WiFi key and data (e.g., the SSID of the WiFi router 116) to establish a secure communication channel with the local WiFi router 116. It may then use this connection to connect with the IoT service 120.

Figure 26:
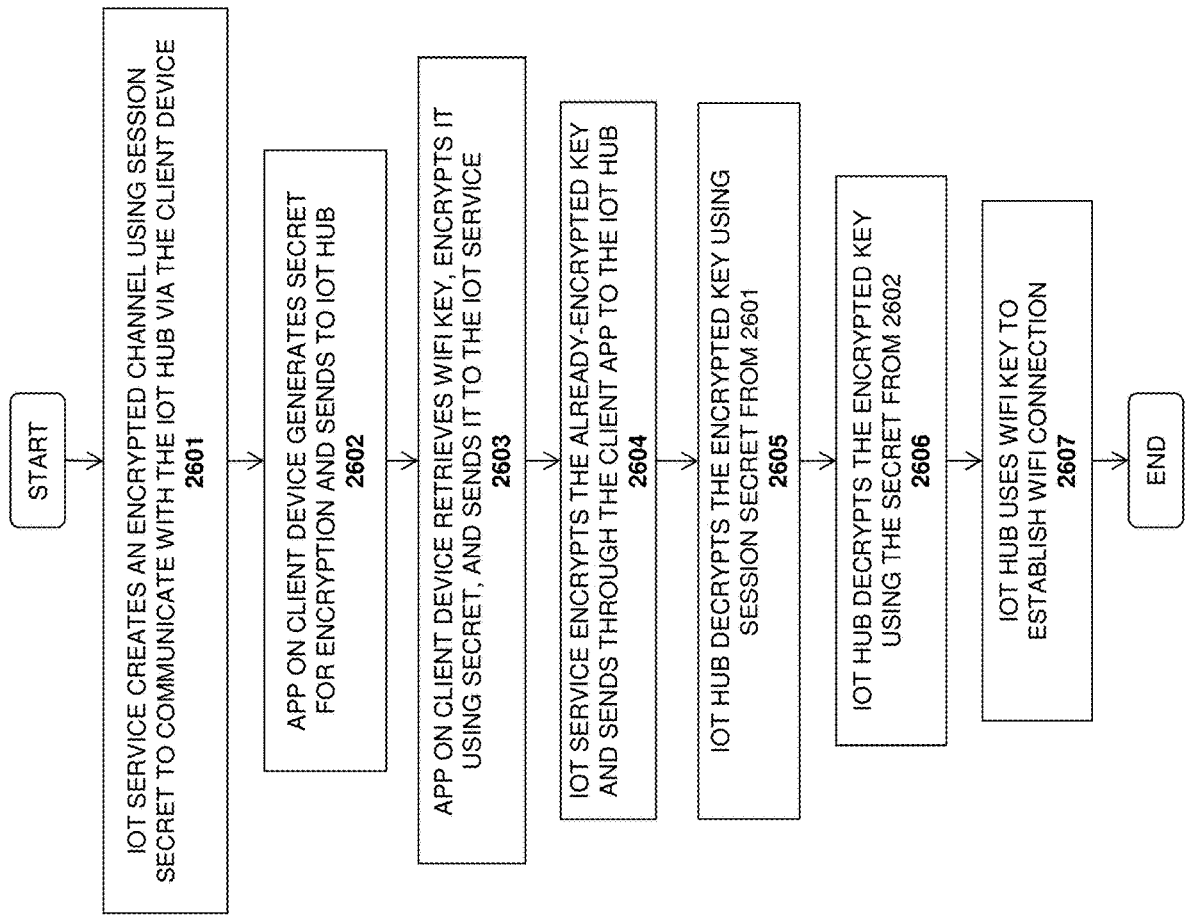
FIG. 26 illustrates a method in accordance with one embodiment of the invention.

A method in accordance with one embodiment of the invention is illustrated in FIG. 26. The method may be implemented within the context of the system architectures described above, but is not limited to any particular architectures.

At 2601, the IoT service creates an encrypted communication channel using a session secret to communicate with the IoT hub via a client device. At 2602, the app on the client device generates a secret to be used for encryption and sends the secret to the IoT hub. At 2603, the app on the client device retrieves the WiFi key, encrypts it using the secret, and sends it to the IoT service. As mentioned, retrieving the WiFi key may involve the user manually entering the key or reading the key from a secure storage on the client device.

At 2604, the IoT service encrypts the already-encrypted key to generate a twice-encrypted key and sends it to the IoT hub via the client device app. At 2605, the IoT hub decrypts the twice-encrypted key using the session secret used to form the secure communication channel between the IoT hub and the IoT service. The resulting encrypted key is the version which was encrypted using the secret generated by the app on the client device. At 2606, the IoT hub decrypts the encrypted key using the secret provided by the app, resulting in an unencrypted key. Finally, at 2607, the IoT hub uses the unencrypted WiFi key to establish a secure WiFi connection, which it uses to connect to the IoT service.

Figure 27:
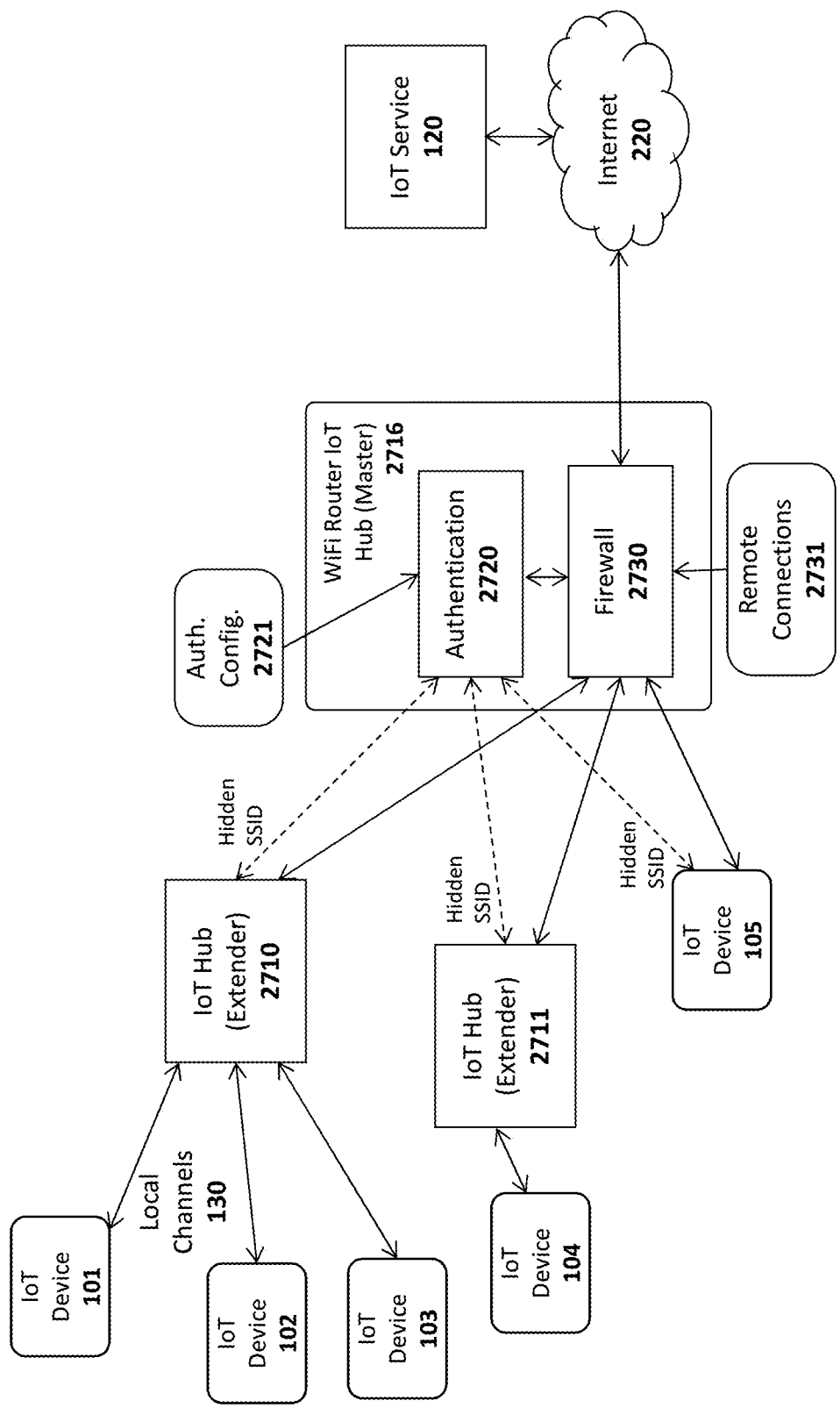
FIG. 27 illustrates one embodiment of a master IoT hub comprising a WiFi router, with authentication logic and a firewall.

System and Method for Automatic Wireless Network Authentication in an Internet of Things (IoT) System One embodiment of the invention implements techniques to securely and automatically connect new IoT devices and IoT hubs to a WiFi router. This embodiment will initially be described with respect to FIG. 27 which includes a master IoT hub 2716 which forms local wireless connections to one or more extender IoT hubs 2710-2711 and/or IoT devices 105. As used herein, an "extender" IoT hub is one which extends the wireless range of the master IoT hub 2716 to connect IoT devices 101-104 to the IoT system (e.g., IoT devices which are out of range of the master IoT hub 2716). For example, the IoT devices 101-104 may form BTLE connections with the IoT extender hubs 2710-2711 (using the various techniques described herein) and the extender IoT hubs 2710-2711 form WiFi connections to the master IoT hub 2716. As illustrated, the master IoT hub 2716 may also form local wireless connections (e.g., BTLE or WiFi connections) directly to certain IoT devices 105 within range.

In addition to performing all of the functions of an IoT hub, one embodiment of the master IoT hub 2716 is also a WiFi router which connects the various IoT devices 101-105 and IoT extender hubs 2710-2711 to the IoT service 120 over the Internet 220. In one embodiment, the master IoT hub 2716 includes an authentication module 2720 to authenticate the various IoT devices 101-105 and extender IoT hubs 2710-2711 on the local network. Specifically, in one embodiment, the authentication module 2720 uses a hidden service set identifier (SSID) with a known common name which is pre-programmed into the various IoT devices 101-105 and extender IoT hubs 2710-2711. For example, an SSID such as "_afero" may be used by the authentication module 2720 and each IoT device 101-104 and extender IoT hub 2710-2711 may be pre-programmed with this SSID so that these hubs/devices may automatically connect with the master IoT hub 2716. In addition, the authentication logic 2720 may require a security passphrase such as WPA2 passphrase. In one embodiment, each IoT device 101-105 and extender IoT hub 2710-2711 is also pre-programmed with this passphrase to automatically connect to the master IoT hub 2716 during user installation.

In one embodiment, a firewall 2730 is implemented on the master IoT hub 2716 to prevent all incoming connection requests and outgoing connection requests except those to a small set of servers within the IoT service 120 (or other external services) having known host names. In this embodiment, the IoT devices 101-105 may use the IoT service 120 through the master IoT hub 2716 but are not permitted to connect to any servers other than those programmed in the master IoT hub 2716. In this manner, the IoT devices 101-104 may be securely configured and connected to the IoT service 120 by an end user.

In addition, for an additional layer of security, the authentication module 2720 or firewall 2730 may be programmed with a whitelist identifying all IoT devices 101-105 and extender IoT hubs 2710-2711 which are permitted to connect to the master IoT hub 2716. In one embodiment, the medium access control (MAC) address of each authorized IoT device 101-105 and extender IoT hub 2710-2711 are included in the whitelist. Only those IoT devices and extender IoT hubs which are on the whitelist are permitted to connect through the master IoT hub 2716. The IoT service 120 may periodically update the whitelist as new IoT devices 101-105 and extender IoT hubs 2710-2711 are provided to end users.

In one embodiment, an existing WiFi router may be configured to perform the various functions described herein. For example, the firewall 2730 of a WiFi router may be programmed to block all incoming and outgoing connections other than those from servers of the IoT service 120. In addition, the firewall 2730 may be configured to only allow connections from IoT devices and IoT extender hubs with MAC addresses on a whitelist (which, as described above, may be updated periodically or dynamically from the IoT service 120). In addition, the WiFi router may be programmed with a hidden SSID and passphrase pre-configured on the IoT devices 101-105 and IoT extender hubs 2710-2711.

Figure 28:
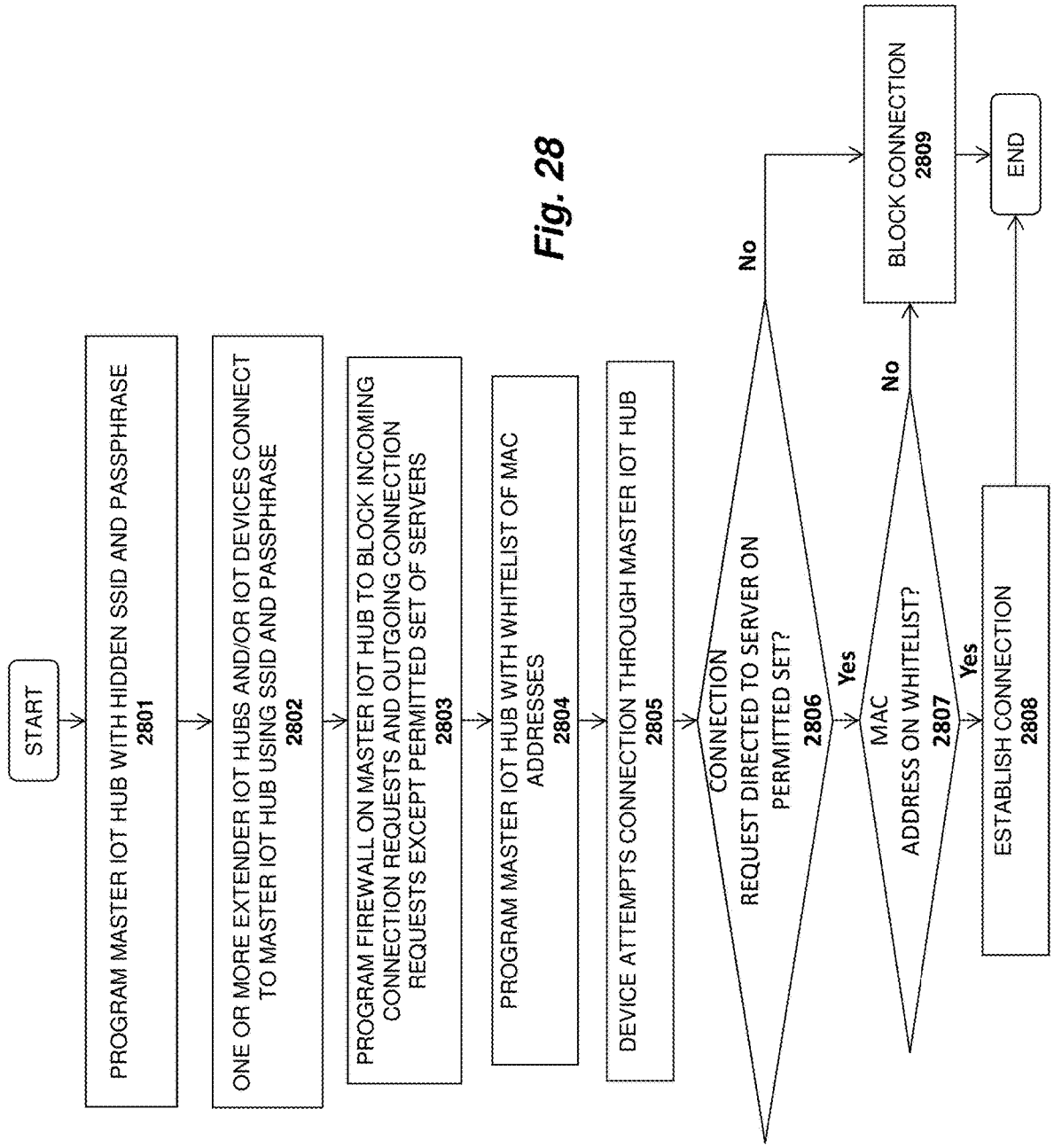
FIG. 28 illustrates a method in accordance with one embodiment of the invention.

A method in accordance with one embodiment of the invention is illustrated in FIG. 28. The method may be implemented on the system architectures described above but is not limited to any particular system architecture.

At 2801, the master IoT hub is programmed with a hidden SSID and passphrase. At 2802, one or more extender IoT hubs and/or IoT devices connect to the master IoT hub using the SSID and passphrase. At 2803, the firewall on the master IoT hub is programmed to block any incoming connection requests and outgoing connection requests other than those for a specified set of servers (e.g., servers within the IoT service). At 2804, the IoT hub is programmed with a whitelist of MAC addresses of IoT devices and/or extender IoT hubs. At 2805, an IoT device and/or extender IoT hub attempts to connect through the master IoT hub. If the connection request is not directed to an authorized server (e.g., within the IoT service), determined at 2807, then the connection attempt is blocked at 2809. If the server is authorized, then at 2807, a determination is made as to whether the MAC address of the IoT device or extender IoT hub is included in the whitelist. If not, then the connection is blocked at 2809. If so, then the connection is established at 2808.

Association IDs and Attribute Classes

Figure 29:
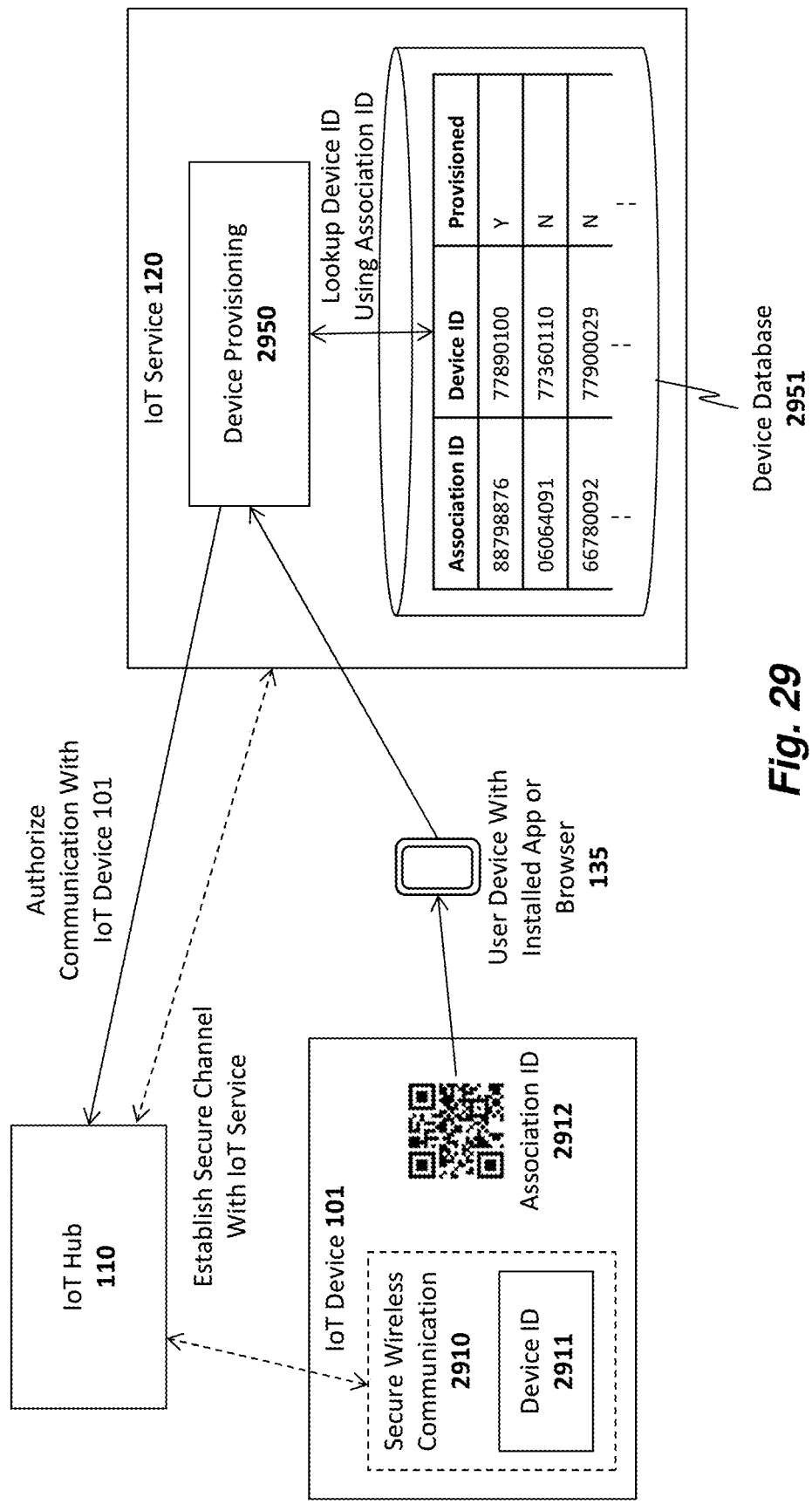
FIG. 29 illustrates one embodiment of the invention using an association ID.

In one embodiment, to address this concern, an "association ID" is associated with each device ID and used during the provisioning process to ensure that the device ID is never transmitted in the clear. As illustrated in FIG. 29, in this embodiment, the association ID 2912 is included in the barcode/QR code printed on the IoT device 101 while the device ID 2911 is maintained securely within the secure wireless communication module 2910 which implements the techniques described above to ensure secure communication with the IoT service 120. In one embodiment, the association ID 2912 is an 8 byte ID like the device ID and is unique per IoT device. When a new IoT device 101 is provisioned in the system, the user scans the barcode/QR code containing the association ID 2912 with a user device 135 having an IoT app or application installed thereon. Alternatively, or in addition, the IoT hub 110 may be used to capture the barcode/QR code including the association ID.

In either case, the association ID is transmitted to a device provisioning module 2950 on the IoT service 120 which performs a lookup in a device database 2951 which includes an association between each association ID and each device ID. The device provisioning module 2950 uses the association ID 2912 to identify the device ID 2911 and then uses the device ID to provision the new IoT device 101 in the system. In particular, once the device ID has been determined from the device database 2951, the device provisioning module 2950 transmits a command to the IoT hubs 110 (which may include the user device 135) authorizing the IoT hubs 110 to communicate with the IoT device 101 using the device ID 2911.

In one embodiment, the association ID 2912 is generated at a factory when the IoT device 101 is manufactured (i.e., when the secure wireless communication module 2910 is provisioned). Both the device ID 2911 and the association ID 2912 may then be provided to the IoT service and stored within the device database 2951. As illustrated, the device database 2951 may include an indication specifying whether each device has been provisioned. By way of example, this may be a binary value with a first value (e.g., 1) indicating that the IoT device 101 is provisioned and a second value (e.g., 0) indicating that the IoT device is not provisioned. Once the system has provisioned/registered the IoT device 101, the device ID may be used because the communication between the IoT service 120 and IoT device 101 is protected using the security techniques described above.

In one embodiment, when a user sells an IoT device, the user may release the device ID by logging in to the IoT service 120 and releasing the IoT device from the user's account. The new user may then provision the IoT device and associate the IoT device with his/her account using the device provisioning techniques described herein.

Figure 30:
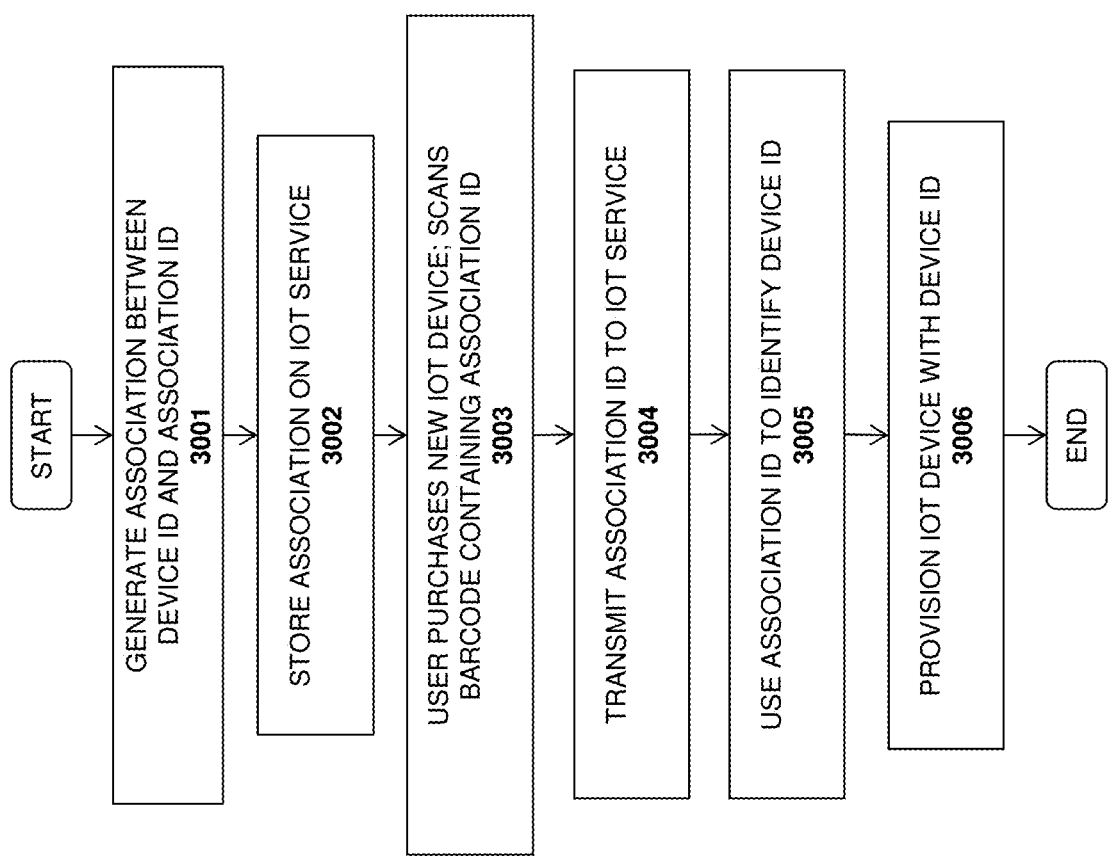
FIG. 30 illustrates a method in accordance with one embodiment of the invention.

A method in accordance with one embodiment of the invention is illustrated in FIG. 30. The method may be implemented within the context of the system architectures described above, but is not limited to any particular system architecture.

At 3001, an association is generated between a device ID and an association ID of an IoT device (e.g., at the factory at which the IoT device is manufactured). The association ID may be embedded within a barcode/QR code which is stamped on the IoT device. At 3002, the association between the device ID and association ID is stored on the IoT service. At 3003, the user purchases the new IoT device and scans the barcode/QR code containing the association ID (e.g., via the user's mobile device with an app or application installed thereon or via an IoT hub with a barcode reader).

At 3004, the association ID is transmitted to the IoT service and, at 3005, the association ID is used to identify the device ID. At 3006, the IoT device is provisioned using the device ID. For example, the IoT device database may be updated to indicate that this particular device ID has been provisioned and the IoT service may communicate the device ID to IoT hubs, instructing the IoT hubs to communicate with the new IoT device.

Figure 31:
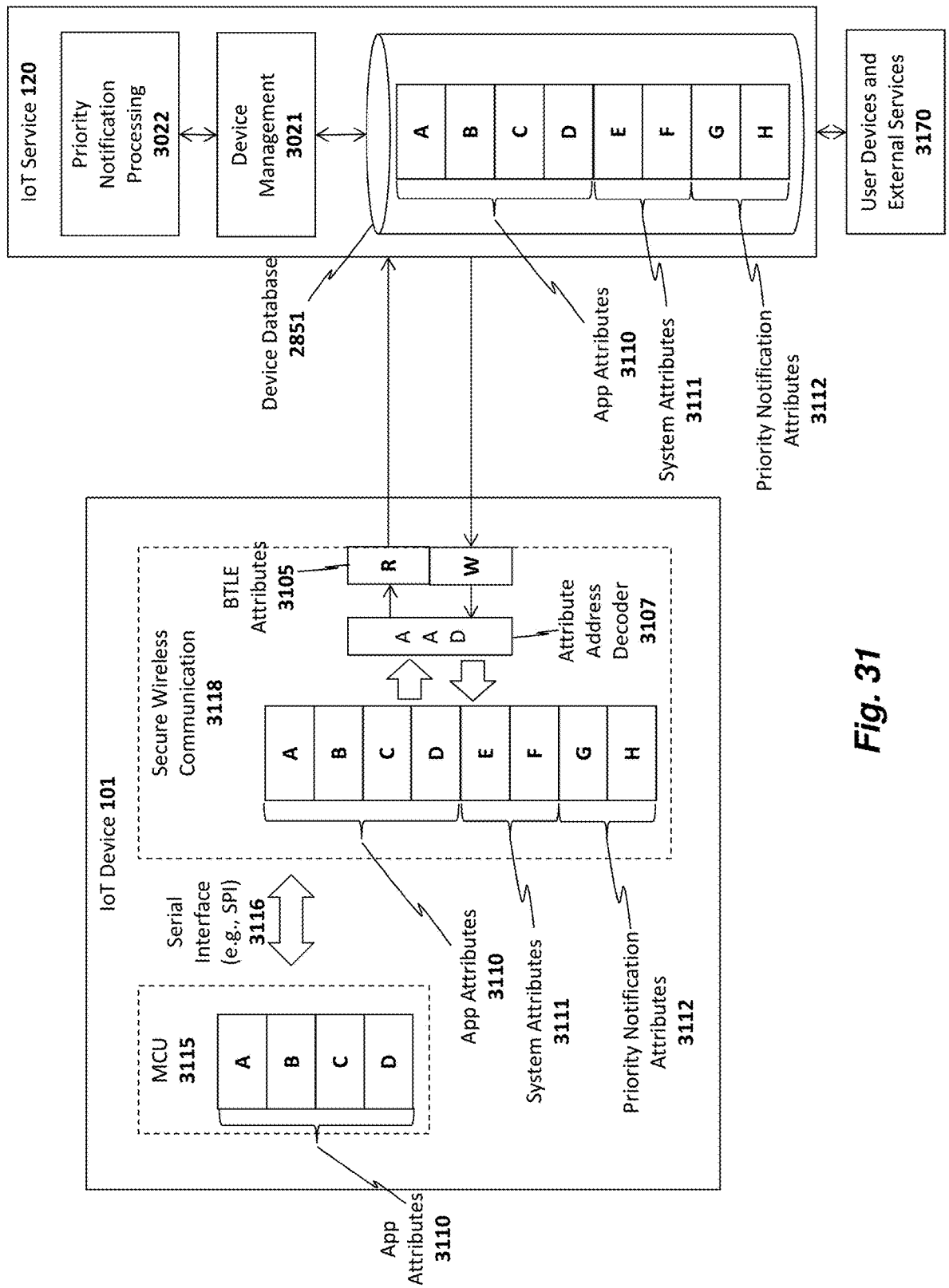
FIG. 31 illustrates one embodiment with different types of attributes.

FIG. 31 illustrates one embodiment of an IoT device which includes a secure wireless communication module 3118 which communicates with a microcontroller unit (MCU) 3115 over a serial interface 3116 such as an Serial Peripheral Interface (SPI) bus. The secure wireless communication module 3118 manages the secure communication with the IoT service 120 using the techniques described above and the MCU 3115 executes program code to perform an application-specific function of the IoT device 101.

In one embodiment, various different classes of attributes are used to manage the data collected by the IoT device and the system configuration related to the IoT device. In particular, in the example shown in FIG. 31, the attributes include application attributes 3110, system attributes 3111, and priority notification attributes 3112. In one embodiment, the application attributes 3110 comprise attributes related to the application-specific function performed by the IoT device 101. For example, if the IoT device comprises a security sensor, then the application attributes 3110 may include a binary value indicating whether a door or window has been opened. If the IoT device comprises a temperature sensor, then the application attributes 3110 may include a value indicating a current temperature. A virtually unlimited number of other application-specific attributes may be defined. In one embodiment, the MCU 3115 executes application-specific program code and is only provided with access to the application-specific attributes 3110. For example, an application developer may purchase the IoT device 101 with the secure wireless communication module 3118 and design application program code to be executed by the MCU 3115. Consequently, the application developer will need to have access to application attributes but will not need to have access to the other types of attributes described below.

In one embodiment, the system attributes 3111 are used for defining operational and configuration attributes for the IoT device 101 and the IoT system. For example, the system attributes may include network configuration settings (e.g., such as the flow control parameters discussed above), the device ID, software versions, advertising interval selection, security implementation features (as described above) and various other low level variables required to allow the IoT device 101 to securely communicate with the IoT service.

In one embodiment, a set of priority notification attributes 3112 are defined based on a level of importance or severity associated with those attributes. For example, if a particular attribute is associated with a hazardous condition such as a temperature value reaching a threshold (e.g., when the user accidentally leaves the stove on or when a heat sensor in the user's home triggers) then this attribute may be assigned to a priority notification attribute class. As mentioned above, priority notification attributes may be treated differently than other attributes. For example, when a particular priority notification attribute reaches a threshold, the IoT hub may pass the value of the attribute to the IoT service, regardless of the current flow control mechanisms being implemented by the IoT hub. In one embodiment, the priority notification attributes may also trigger the IoT service to generate notifications to the user and/or alarm conditions within the user's home or business (e.g., to alert the user of a potentially hazardous condition).

As illustrated in FIG. 31, in one embodiment, the current state of the application attributes 3110, system attributes 3111 and priority notification attributes 3112 are duplicated/mirrored within the device database 2851 on the IoT service 120. For example, when a change in one of the attributes is updated on the IoT device 101, the secure wireless communication module 3118 communicates the change to the device management logic 3021 on the IoT service 120, which responsively updates the value of the attribute within the device database 2851. In addition, when a user updates one of the attributes on the IoT service (e.g., adjusting a current state or condition such as a desired temperature), the attribute change will be transmitted from the device management logic 3021 to the secure wireless communication module 3118 which will then update its local copy of the attribute. In this way, the attributes are maintained in a consistent manner between the IoT device 101 and the IoT service 120. The attributes may also be accessed from the IoT service 120 via a user device with an IoT app or application installed and/or by one or more external services 3170. As mentioned, the IoT service 120 may expose an application programming interface (API) to provide access to the various different classes of attributes.

In addition, in one embodiment, priority notification processing logic 3022 may perform rule-based operations in response to receipt of a notification related to a priority notification attribute 3112. For example, if a priority notification attribute indicates a hazardous condition (e.g., such as an iron or stove being left on by the user), then the priority notification processing logic 3022 may implement a set of rules to attempt to turn off the hazardous device (e.g., sending an "off" command to the device if possible). In one embodiment, the priority notification processing logic 3022 may utilize other related data such as the current location of the user to determine whether to turn off the hazardous device (e.g., if the user is detected leaving the home when the hazardous device in an "on" state). In addition, the priority notification processing logic 3022 may transmit an alert condition to the user's client device to notify the user of the condition. Various other types of rule sets may be implemented by the priority notification processing logic 3022 to attempt to address a potentially hazardous or otherwise undesirable condition.

Also shown in FIG. 31 is a set of BTLE attributes 3105 and an attribute address decoder 3107. In one embodiment, the BTLE attributes 3105 may be used to establish the read and write ports as described above. The attribute address decoder 3107 reads a unique ID code associated with each attribute to determine which attribute is being received/transmitted and process the attribute accordingly (e.g., identify where the attribute is stored within the secure wireless communication module 3118).

Additional Embodiments for Sharing WiFi Credentials

The embodiments described below provide additional details a specific use cases for sharing WiFi credentials and other secure data between two devices. While these embodiments focus on an IoT implementation, the underlying principles of the invention are not limited to IoT devices and IoT hubs.

As described above with respect to FIGS. 24-28, a first device may share a secret with a second device. The first device may then encrypt the WiFi credentials with the secret to generate first-encrypted credentials and then encrypt the first-encrypted credentials with a session secret to generate second-encrypted credentials. It may then transmit the second-encrypted credentials to an Internet service (such as the IoT service 120) which knows the session secret but does not know secret shared directly between the two devices.

For example, in an IoT context, it would be beneficial to securely share a WiFi password stored on a first IoT device to a second IoT device that has just been added to the user's account. The embodiments of the invention do this in a way that the IoT service never has access to the WiFi password (because it does not know the shared secret).

Figure 32:
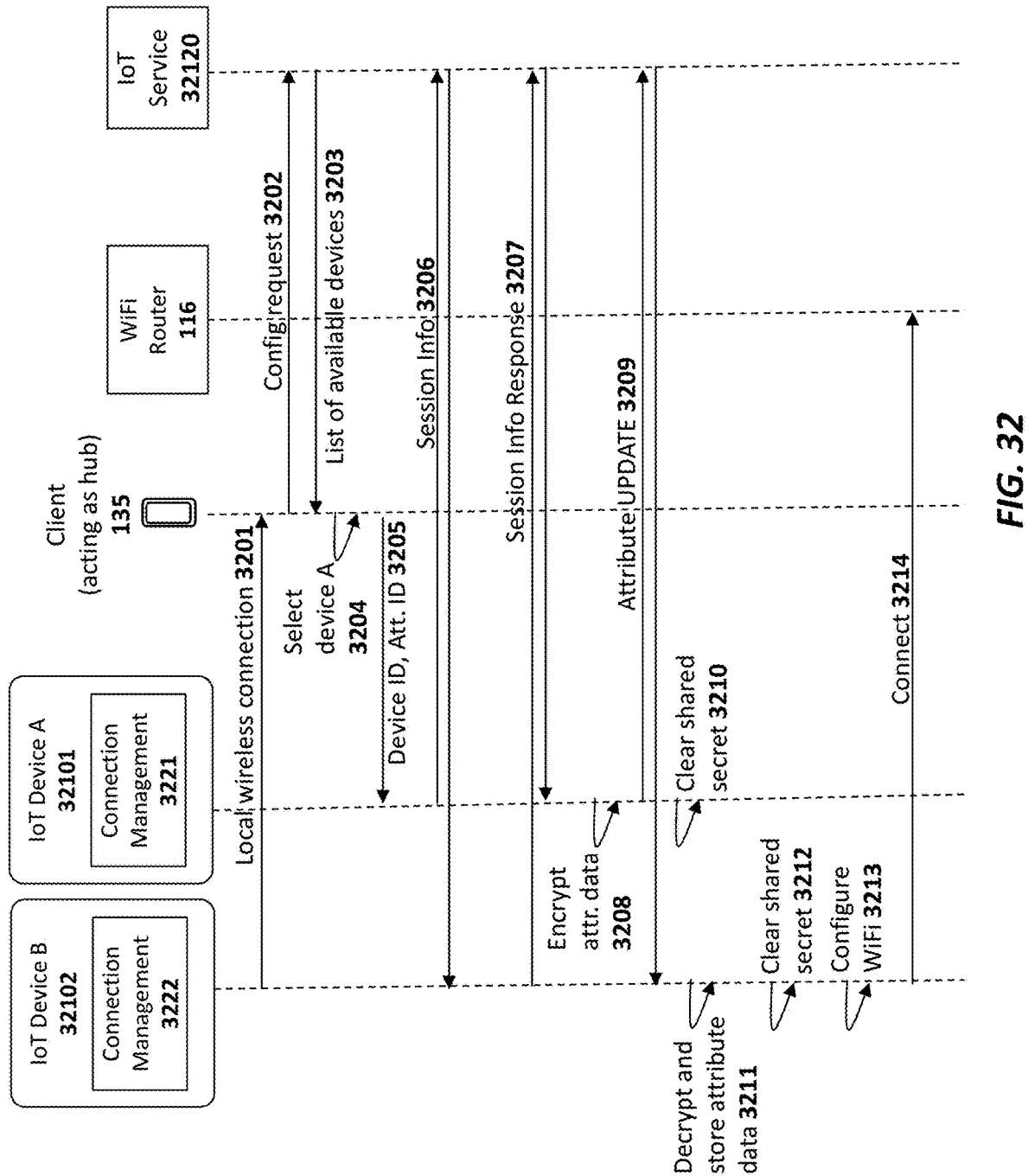
FIG. 32 illustrates one embodiment for securely sharing WiFi credentials.

One embodiment of the invention will be described with respect to FIG. 32, where a user with an existing IoT device A 32101 and account with the IoT service 32120 sets up a new IoT device B 32102. In one embodiment, connection management circuitry/logic 3221 and 3222 on devices A and B, respectively, implement the illustrated transactions. The connection management circuitry/logic 3221-3222 may be implemented in hardware, software, firmware or any combination thereof. Various components previously described, such as Bluetooth and WiFi communication interfaces, are not illustrated in FIG. 32 to avoid obscuring the underlying principles of the invention.

The user's existing device A 32101 includes attribute data needed by device B to connect with a local WiFi router 116 (or WiFi access point). This attribute data may include network credentials such as an SSID name and WiFi password/key of WiFi router 116. In addition, it is assumed that device A 32101 is registered/provisioned with the user's account on the IoT service 32120. For example, the configuration process described herein may have been implemented previously to configure device A.

In one embodiment, connection management circuitry/logic (hereinafter "logic") 3222 establishes a local wireless connection using a low-power short range wireless protocol such as Bluetooth (e.g. BTLE). In the illustrated example, the user's mobile client device 135 (which supports the same local wireless protocol) is running an instance of the IoT service app (previously described) which establishes the connection with IoT device B 32102 and also establishes a remote connection with the IoT service 32120 via the WiFi router 116 or cellular data service, thereby acting as a hub for IoT device B 32102. In an alternate implementation, an IoT hub as described above may provide the local connectivity to IoT device B 32102.

Regardless of how the initial connection is made, a configuration request 3202 is sent from the mobile client 135 to the IoT service 32120 which, in transaction 3203, transmits back a list of available devices which may be used to configure IoT device B 32102. In particular, the list of devices include those devices of the user which are already configured for WiFi and are online. in one embodiment, the SSID of the WiFi router 116 is listed next to the device name to show the user which network it is on. In the illustrated example, the user selects device A 32101 from the list at 3204. In response, a message is sent to device A specifying the device ID of device B 32102 and the attribute ID device A should transmit after linking is complete. In one embodiment, the attribute ID identifies a WiFi credentials attribute which stores the SSID and passcode for WiFi router 116. Referring again to FIG. 31, the WiFi credentials attribute may be a system attribute 3111 on device A 32101.

While transaction 3205 is illustrated directly from the client 135 to IoT device A, this transaction may actually be transmitted to device A via the IoT service 32120. The particular path taken by the transaction message is not relevant to the underlying principles of the invention.

At 3206, the connection management logic 3221 of device A initiates the linking process by sending an "session info" message that contains the source and destination addresses in the form of device IDs (i.e., for devices A and B). Device B receives the message (via the IoT service 32120) and, at 3207, its connection management logic 3222 transmits a "session info response" message 3207 to device A (also via the IoT service 32120) which contains the destination device ID. The data exchanged in the session info and session info response messages is used as a shared secret for subsequent transactions.

At transaction 3208 device A 32101 uses the new shared secret to encrypt the attribute data identified by the attribute ID in transaction 3205. It then transmits the encrypted attribute data (including WiFi credentials) at 3209 (via an attribute UPDATE command as described above) and clears the shared secret at 3210.

At transaction 3211, IoT device B 32102 decrypts and stores the attribute data which, in a WiFi implementation, contains the WiFi SSID and passcode. However, the attribute data may include any type of data needed to allow IoT device B 32102 to connect to the wireless network. Having used the shared secret to decrypt, IoT device B 32102 clears the shared secret at 3212 and configures the WiFi interface at 3213. Using the WiFi credentials, IoT device B 32102 connects to the WiFi router 116 at 3214.

In one embodiment, a complete list of attribute IDs is sent to device B in transaction 3205. Various techniques may be employed to ensure that device B knows when device A is done sending the attributes. For example, the initial data packed may include a value indicating the number of attributes being sent. Alternatively, an end of message encoding (e.g., a specified bit sequence) may be sent to notify device B that the transmission is complete. In any case, once the transmission is complete, device B will delete the shared secret (following decryption).

In addition, in one embodiment, device A and device B may exchange any form of secret to securely transmit the network credentials as described above. This may include, for example, their session public keys, their device keys, and/or a randomly generated key/nonce. The important thing is that devices A and B have a shared secret which they can use to encrypt the network credentials which may be transmitted through the IoT service.

Figure 33:
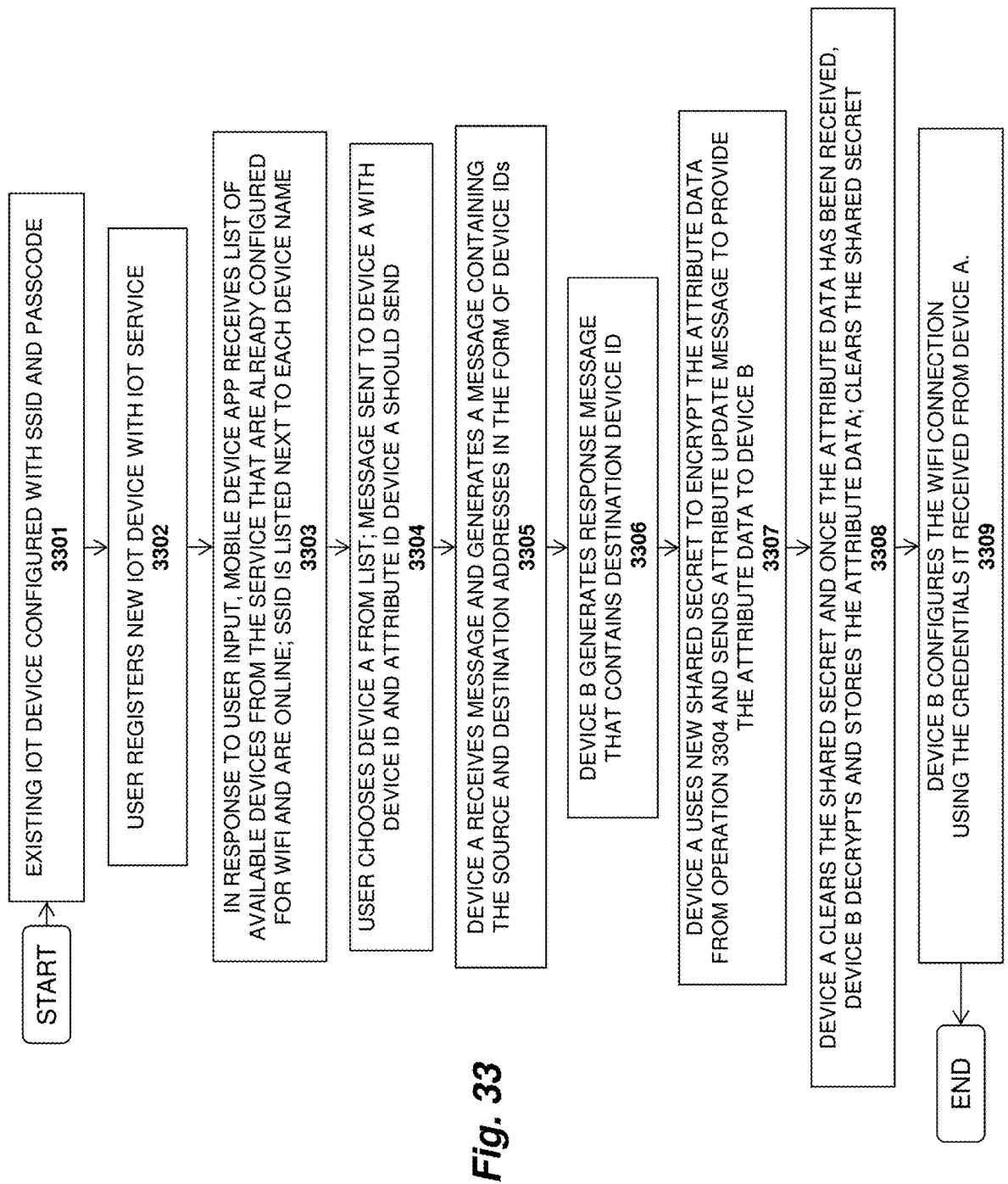
FIG. 33 illustrates a method in accordance with one embodiment of the invention.

One embodiment of a method is illustrated in FIG. 33. The method may be implemented within the context of the system architectures described above, but is not limited to any particular system architecture. For example, the techniques set forth in FIG. 33 may be used to share network credentials with any types of devices (not just IoT devices).

At 3301, a user has an existing WiFi device (device A) on their account configured for their network. The network SSID (potentially a hidden SSID as described above) and password are stored on device A. As described above, the service/cloud (hereinafter "service") does not have access to the password.

At 3302, the user adds a new WiFi device (device B) to their account. This may be accomplished, for example, by scanning a QR code on device B with the mobile device app, which securely transmits the code to the service. In one embodiment, the code comprises an association ID which the service uses to identify the device (i.e., locate a corresponding device ID). The service locates device B in its database (if pre-populated with devices) and associates the new device with the user's account. Device B may initially establish a secure link to the service using the various techniques described herein. For example, in one embodiment, the new device automatically searches for and connects to a hub device and/or a mobile user device via Bluetooth, which communicatively couples device B to the service.

Once device B is linked to the service, at 3303 the user is prompted to configure the device for their network. The user chooses "yes" from the mobile device app which receives a list of available devices from the service that are already configured for WiFi and are online. In one embodiment, the configured SSID is listed next to the device name to show the user which network it is on. In this example, device A is listed with the SSID of the WiFi network to which it is connected (e.g., "ZZ WiFi").

At 3304, the user chooses device A from the list. In response, a message is sent to device A specifying the device ID of the device to link to (i.e., device B) and the attribute ID device A should transmit after linking is complete. At 3305, device A receives the message and begins the linking process by sending a message (e.g., a session info message 3206 as previously described) that contains the source and destination addresses in the form of device IDs. This message may be sent over the standard messaging channel.

At 3306 device B transmits a session info response message that contains the destination device ID. Thus, linking is performed in a similar manner to linking with the service, the primary difference being the new versions of the messages that contain source and destination addresses.

At 3307, device A uses the new shared secret to encrypt the attribute data from operation 3304 and sends an attribute UPDATE message to provide the attribute data to device B (see, e.g., FIGS. 20-21 and associated text). At 3308, once the attribute data has been sent, device A clears the shared secret. Once device B receives the attribute data containing the WiFi credentials, it uses the shared secret to decrypt and store the WiFi credentials. Device B then clears the shared secret.

At 3309, device B configures the WiFi connection using the credentials it received from device A. It then connects to the WiFi network using the credentials.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method comprising:
   establishing a short range local wireless connection between a first Internet of things (IoT) device and a mobile device having an IoT app installed, the mobile device to couple the first IoT device to an IoT service;
   receiving, on the IoT app, a request from a user of the mobile device to configure the first IoT device to connect to a secure network using network credentials;
   transmit the request from the mobile device to the IoT service;
   receiving a list of IoT devices registered with an account of the user on the IoT service, the list comprising one or more IoT devices including a second IoT device that is previously registered with the account of the user on the IoT service and configured to connect to the secure network with the network credentials, the user to selected the second IoT device from the list;
   transmit a network credential request to the second IoT device, the network credential request comprising a device identifier (ID) of the first IoT device and an attribute ID associated with the network credentials;
   establishing a communication channel between the first IoT device and the second IoT device through the mobile device;
   implementing a sequence of security transactions between the first IoT device and second IoT device to determine a shared secret;
   encrypting the network credentials at the second IoT device using the shared secret to generate encrypted network credentials;
   transmitting the encrypted network credentials to the first IoT device over the communication channel;
   decrypting the encrypted network credentials at the first IoT device using the shared secret to generate decrypted network credentials; and using the decrypted network credentials at the first IoT device to securely connect to the secure network.

2. The method of claim 1, wherein the secure network comprises a WiFi network and the network credentials comprise a passcode and a Service Set Identifier (SSID).

3. The method of claim 2, wherein the SSID and passcode are stored in at least one attribute on the second IoT device, the second IoT device to encrypt the at least one attribute and transmit the encrypted attribute to the first IoT device with an attribute UPDATE command.

4. The method of claim 3, wherein the first IoT device is to decrypt the at least one attribute using the shared secret to generate at least one decrypted attribute, the first IoT device to store the at least one decrypted attribute prior to using the SSID and passcode to connect to the WiFi network.

5. The method of claim 4, further comprising:
associating the first IoT device with the user's account on the IoT service.

6. The method of claim 5, further comprising:
clearing the shared secret on the second IoT device after transmitting the encrypted network credentials to the first IoT device.

7. The method of claim 6, further comprising:
clearing the shared secret on the first IoT device after decrypting the encrypted network credentials at the first IoT device using the shared secret.

8. The method of claim 7, wherein the sequence of security transactions between the first IoT device and second IoT device comprise a key exchange protocol usable to determine the shared secret at both the first IoT device and the second IoT device.

9. A non-transitory machine-readable medium having program code stored thereon which, when executed by one or more machines, causes the machines to perform operations of:
establishing a short range local wireless connection between a first Internet of things (IoT) device and a mobile device having an IoT app installed, the mobile device to couple the first IoT device to an IoT service;
receiving, on the IoT app, a request from a user of the mobile device to configure the first IoT device to connect to a secure network using network credentials;
transmit the request from the mobile device to the IoT service;
receiving a list of IoT devices registered with an account of the user on the IoT service, the list comprising one or more IoT devices including a second IoT device that is previously registered with the account of the user on the IoT service and configured to connect to the secure network with the network credentials, the user to selected the second IoT device from the list;
transmit a network credential request to the second IoT device, the network credential request comprising a device identifier (ID) of the first IoT device and an attribute ID associated with the network credentials;
establishing a communication channel between the first IoT device and the second IoT device through the mobile device;
implementing a sequence of security transactions between the first IoT device and second IoT device to determine a shared secret;
encrypting the network credentials at the second IoT device using the shared secret to generate encrypted network credentials;
transmitting the encrypted network credentials to the first IoT device over the communication channel;

decrypting the encrypted network credentials at the first IoT device using the shared secret to generate decrypted network credentials; and
using the decrypted network credentials at the first IoT device to securely connect to the secure network.

10. The machine-readable medium of claim 9, wherein the secure network comprises a WiFi network and the network credentials comprise a passcode and a Service Set Identifier (SSID).

11. The machine-readable medium of claim 10, wherein the SSID and passcode are stored in at least one attribute on the second IoT device, wherein the second IoT device is to encrypt the at least one attribute and transmit the encrypted attribute to the first IoT device with an attribute UPDATE command.

12. The machine-readable medium of claim 11, wherein the first IoT device is to decrypt the at least one attribute using the shared secret to generate at least one decrypted attribute, the first IoT device to store the at least one decrypted attribute prior to using the SSID and passcode to connect to the WiFi network.

13. The machine-readable medium of claim 12, wherein the operations further comprise:
associating the first IoT device with the user's account on the IoT service.

14. The machine-readable medium of claim 13, wherein the operations further comprise:
clearing the shared secret on the second IoT device after transmitting the encrypted network credentials to the first IoT device.

15. The machine-readable medium of claim 14, wherein the operations further comprise:
clearing the shared secret on the first IoT device after decrypting the encrypted network credentials at the first IoT device using the shared secret.

16. The machine-readable medium of claim 9, wherein the sequence of security transactions between the first IoT device and second IoT device comprise a key exchange protocol usable to determine the shared secret at both the first IoT device and the second IoT device.

17. A system including a first Internet of Things (IoT) device, a second IoT device, an IoT service, and an IoT app installed on a mobile device, the system further including circuitry and program code to securely provide network credentials from the second IoT device to the first IoT device, wherein:
the IoT app is to:
receive a request from a user of the mobile device to configure the first IoT device to connect to a secure network using network credentials;
transmit the request from the mobile device to the IoT service;
receive, from the IoT service, a list of IoT devices registered with an account of the user on the IoT service, the list comprising one or more IoT devices including the second IoT device that is previously registered with the account of the user on the IoT service and configured to connect to the secure network with the network credentials, the user to selected, on the IoT app, the second IoT device from the list;
transmit a network credential request to the second device, the network credential request comprising a device identifier (ID) of the first IoT device and an attribute ID associated with the network credentials; and establish a communication channel between the first IoT device and the second IoT device through the mobile device;

connection management logic on the first and second IoT devices is to implement a sequence of security transactions between the first IoT device and second IoT device to determine a shared secret;

the second IoT device is to encrypt the network credentials using the shared secret to generate encrypted network credentials and to transmit the encrypted network credentials to the first IoT device over the communication channel; and the first IoT device is to decrypt the encrypted network credentials using the shared secret to generate decrypted network credentials and to securely connect to the secure network using the decrypted network credentials.

18. The system of claim 17, wherein the secure network comprises a WiFi network and the network credentials comprise a passcode and a Service Set Identifier (SSID).

19. The system of claim 18, wherein the SSID and passcode are stored in at least one attribute on the second IoT device, wherein the second IoT device is to encrypt the at least one attribute and transmit the encrypted attribute to the first IoT device with an attribute UPDATE command.

20. The system of claim 19, wherein the first IoT device is to decrypt the at least one attribute using the shared secret to generate at least one decrypted attribute, the first IoT device to store the at least one decrypted attribute prior to using the SSID and passcode to connect to the WiFi network.

21. The system of claim 20, wherein the IoT service is to associate the first IoT device with the user's account on the IoT service.

22. The system of claim 21, wherein the second IoT device is to clear the shared secret on the second IoT device after transmitting the encrypted network credentials to the first IoT device.

23. The system of claim 22, wherein the first IoT device is to clear the shared secret on the first IoT device after decrypting the encrypted network credentials at the first IoT device using the shared secret.

24. The system of claim 17, wherein the sequence of security transactions between the first IoT device and second IoT device comprise a key exchange protocol usable to determine the shared secret at both the first IoT device and the second IoT device.

* * * * *